United States Patent [19]
Nagata et al.

[11] Patent Number: 5,526,448
[45] Date of Patent: Jun. 11, 1996

[54] OPTICAL WAVEGUIDE MODULATOR HAVING A REDUCED D.C. DRIFT

[75] Inventors: Hirotoshi Nagata; Junichiro Minowa; Manabu Yamada; Junichiro Ichikawa; Jamshid Nayyer; Shinichi Shimotsu; Junichi Ogiwara; Masanobu Kobayashi; Hideki Honda; Kazumasa Kiuchi; Takashi Shinriki; Toshihiro Sakamoto, all of Funabashi, Japan

[73] Assignee: Sumitomo Cement Company, Ltd., Tokyo, Japan

[21] Appl. No.: 315,981

[22] Filed: Sep. 30, 1994

[30] Foreign Application Priority Data

Nov. 1, 1993 [JP] Japan .................... 5-273710
Nov. 30, 1993 [JP] Japan .................... 5-300420
May 26, 1994 [JP] Japan .................... 6-112631
Jul. 29, 1994 [JP] Japan .................... 6-178578
Aug. 9, 1994 [JP] Japan .................... 6-187387

[51] Int. Cl.[6] .................... G02F 1/01; G02B 6/26
[52] U.S. Cl. .................... 385/1; 385/2; 385/14; 385/15; 385/39; 385/40; 385/45; 385/132
[58] Field of Search .................... 385/1, 2, 3, 8, 385/9, 14, 15, 39, 40, 45, 129, 130, 131, 132, 141

[56] References Cited

U.S. PATENT DOCUMENTS

| | | | |
|---|---|---|---|
| 4,206,251 | 6/1980 | Chen | 427/100 |
| 4,704,978 | 12/1987 | Jackel | 385/11 X |
| 4,851,079 | 7/1989 | Booth et al. | 156/643 |
| 5,122,852 | 6/1992 | Chan et al. | 357/30 |
| 5,214,724 | 5/1993 | Seino et al. | 385/2 |
| 5,339,369 | 8/1994 | Hopfer et al. | 385/2 |

FOREIGN PATENT DOCUMENTS

| | | | |
|---|---|---|---|
| 0315350 | 5/1989 | European Pat. Off. | 385/14 X |
| 553568A | 8/1993 | European Pat. Off. | 385/11 X |
| 0553568 | 8/1993 | European Pat. Off. | 385/14 X |
| 0444959 | 9/1994 | European Pat. Off. | 385/14 X |
| 5333296 | 12/1993 | Japan | 385/11 X |

OTHER PUBLICATIONS

Nonsymmetric Mach–Zehnder Interferometers Used as Low–Drive Voltage Modulators, appearing in Journal of Lightwave Tech., vol. 6, No. 8, Aug. 1988, by J. Jackel and J. Johnson.

Temperature dependence of dc drift of Ti:linbO$_3$, etc. appearing in J. Appln. Phys., vol. 73 (1993) pp. 4162–4164, by H. Nagata and K. Kiuchi.

Optical Fiber Communication Conference, 1992 Technical Digest Series, vol. 5, by M. Seino et al.

Publication entitled "Possibility Of dc Drift Reduction of Ti:LiNbO$_3$ Modulators Via Dry O$_2$ Annealing Process", published Mar. 1994 in Applied Physics Letters, vol. 64, No. 10.

*Primary Examiner*—Brian Healy
*Attorney, Agent, or Firm*—Paul & Paul

[57] ABSTRACT

An optical waveguide device usable as an optical wavemodulator and having a reduced DC drift includes a LiNbO$_3$ substrate, an optical waveguide formed in a front surface portion of the substrate, a dielectric layer covering the front surface of the substrate and the optical waveguide surface, and an electrode system arranged on the dielectric layer, the dielectric layer comprising a matrix component consisting of an amorphous SiO$_2$ and a doping element component consisting of Li and/or Nb; and having a refractive index lower than that of the amorphous SiO$_2$ matrix free from the doping element component.

24 Claims, 44 Drawing Sheets

Fig.26-(a)
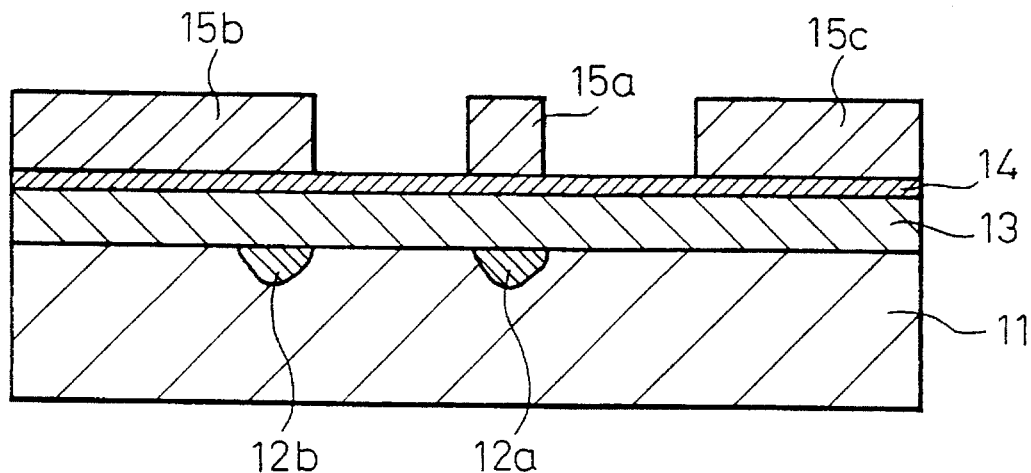
Fig.26-(b)
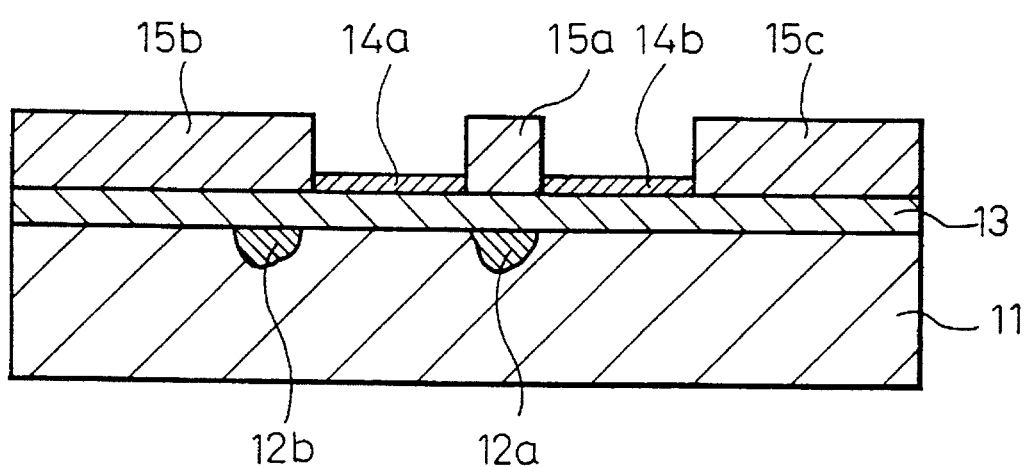

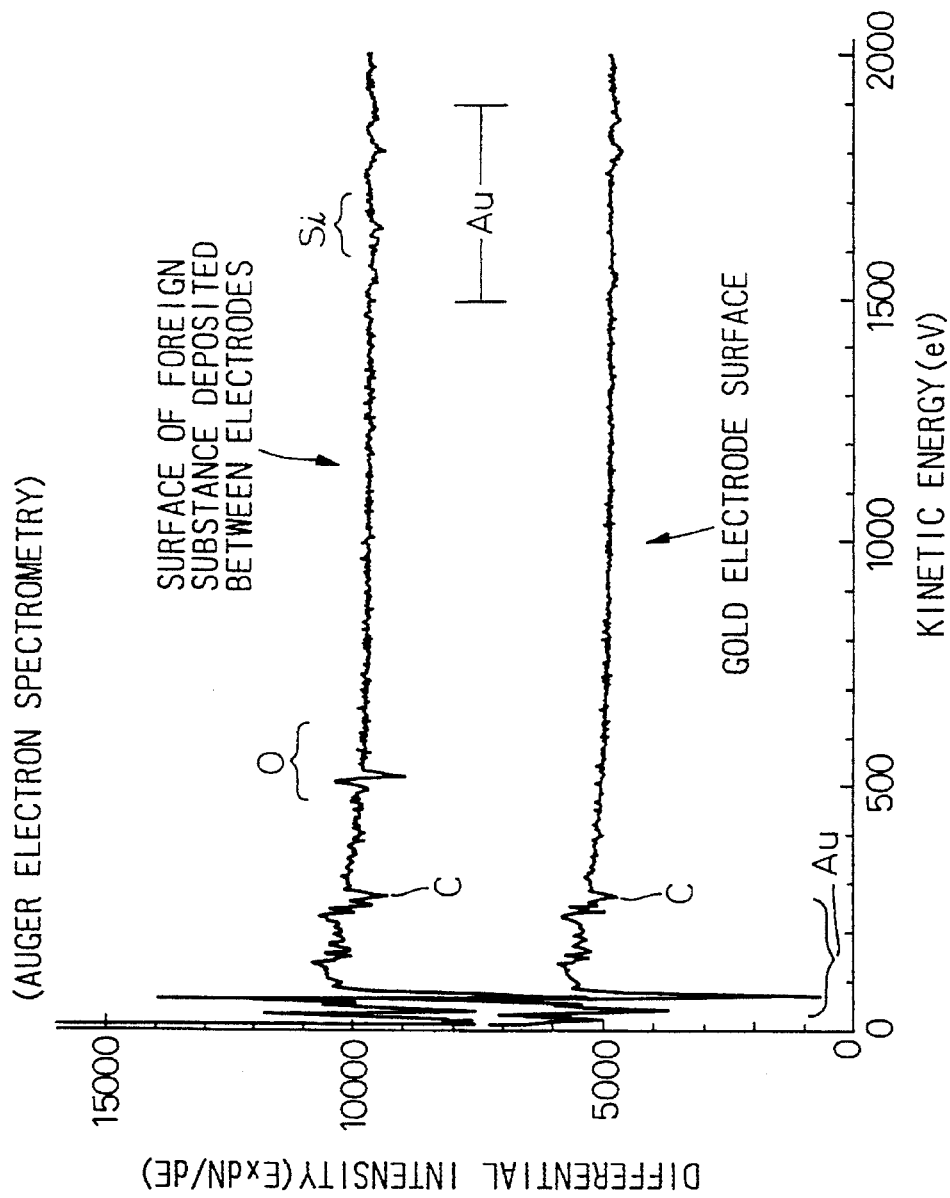

Fig.31-(a)
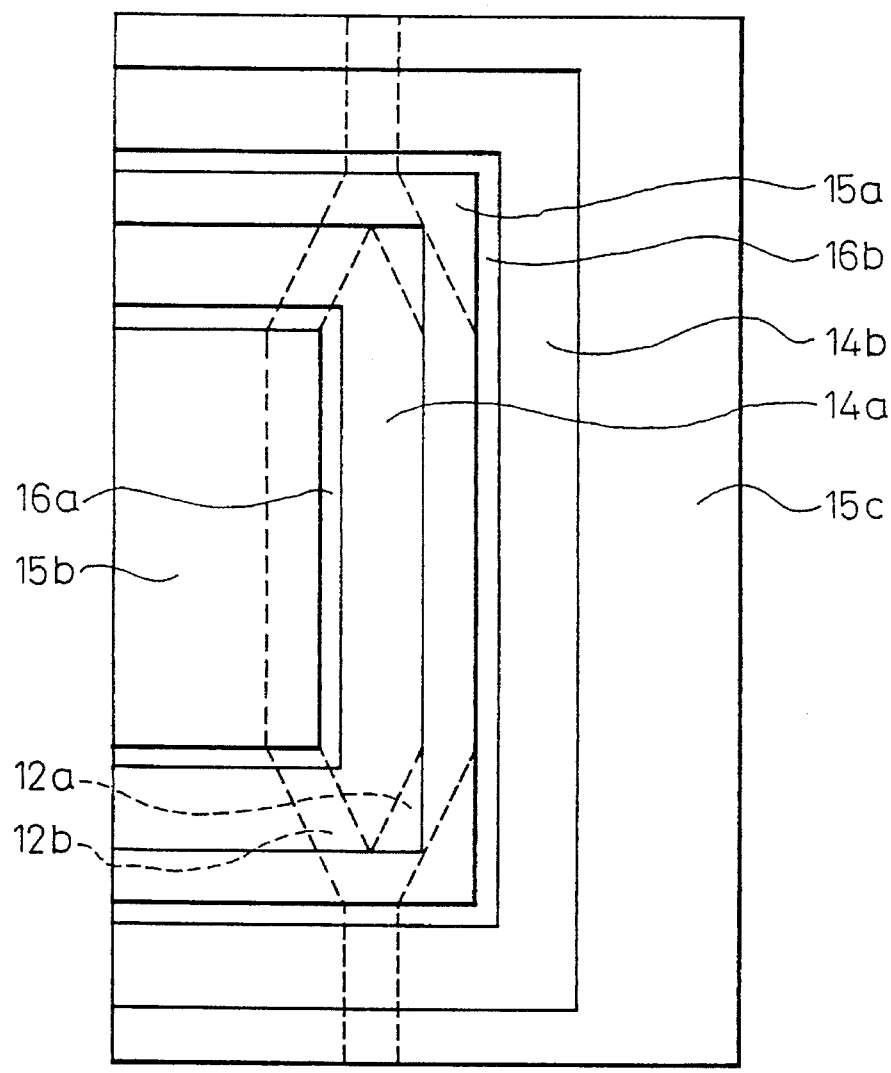
Fig.31-(b)
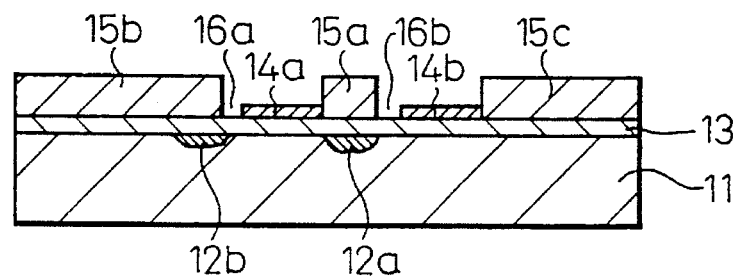

Fig.36-(a)
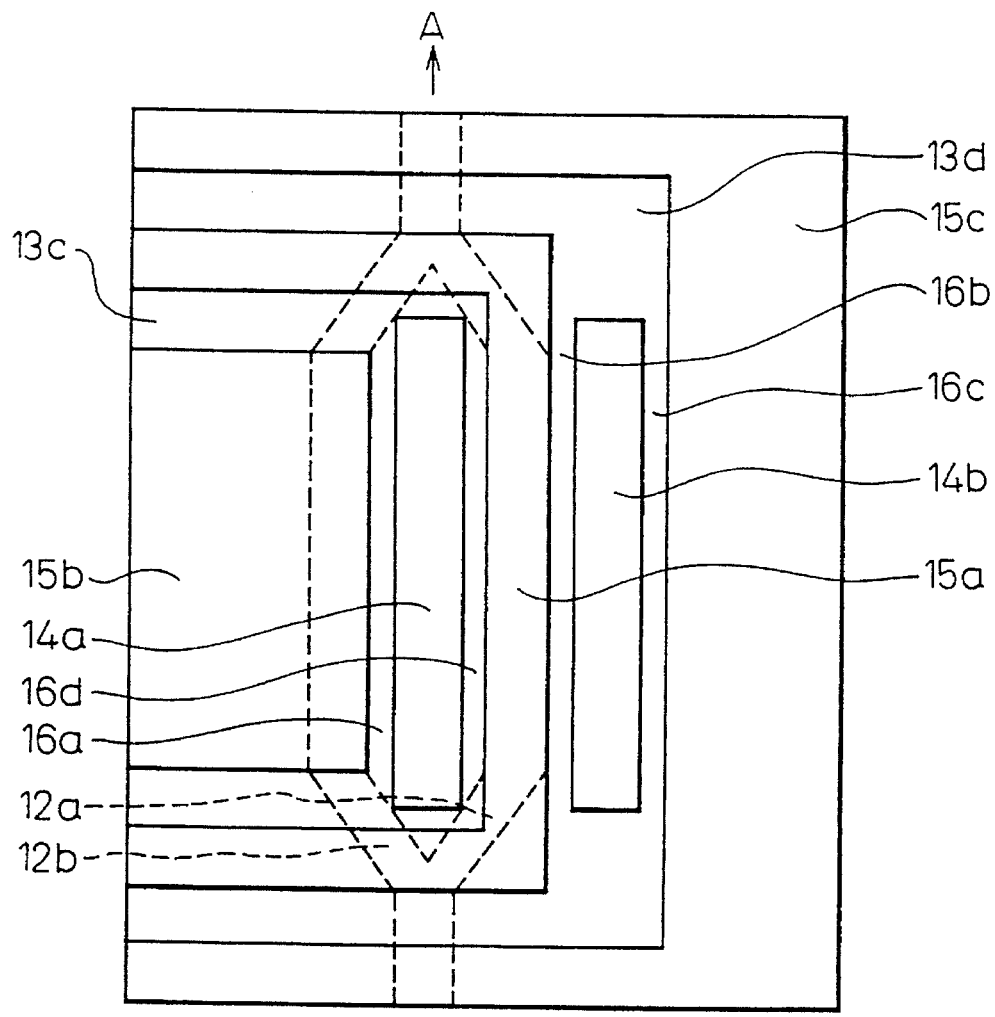
Fig.36-(b)
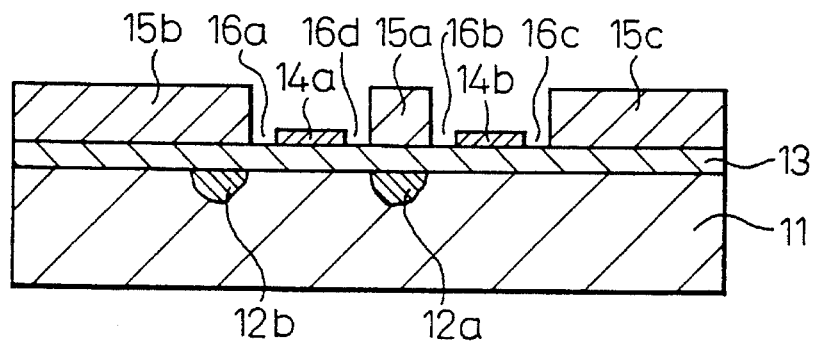

OPTICAL WAVEGUIDE MODULATOR HAVING A REDUCED D.C. DRIFT

BACKGROUND OF THE INVENTION

1. Field of the Invention

The present invention relates to an optical waveguide device. More particularly, the present invention relates to an optical waveguide device having a substrate comprising, as a principal component, lithium niobate, and an optical waveguide, exhibiting a reduced DC drift, and thus useful as an optical wave modulator. The optical waveguide device of the present invention is advantageous in that even under an application of a controlling DC voltage, the device can exhibit a stabilized operating property and is useful as a key element, for example, a high speed optical intensity modulator or a high speed optical switch, of an optical communication system, an optical information treatment system or an optical measurement system.

2. Description of Related Art

In conventional optical waveguide devices having a lithium niobate substrate, a generation of DC drift is a big problem to be solved. It is known that the mechanism of the generation of the DC drift can be explained by using an RC equivalent circuit model, as described in:

S. Yamada and Minakata, Jpn. J. Appl. Phys., Vol. 20 (1981), 733,

C. M. Gee, G. D. Thurmond, H. Blauvetl and H. M. Yen, Appl. Phys. Lett., Vol. 47 (1985), 211, and R. A. Becker, Opt. Lett., Vol. 10 (1985), 417.

Namely, it is known that the amount and direction of the DC drift of an optical element greatly depend on the electric resistance (R) and the electric capacitance (C) of each of the lithium niobate substrate and a dielectric layer formed on the substrate of the optical element, especially on a relaxation time ($\tau$) of the element which is defined as a product (RC) of the electric resistance (R) and the electric capacitance (C).

From the above-mentioned facts, it is understood that the DC drift of the optical element can be controlled by regulating the electric resistance (R), electric capacitances (C) and relaxation times (r) of the substrate and dielectric layer of the optical element.

As particular means for controlling the parameters of the optical element-forming materials, the following techniques have been reported.

According to H. Nagata, J. Ichikawa, M. Kobayashi, J. Hidaka, H. Honda, K. Kiuchi and T. Sugamata, Appl. Phys. Lett., Vol. 64 (1994), 1180, the amount of DC-drift can be restricted by reducing the content of hydrogen in the substrate. Particularly, since hydrogen is introduced into the lithium niobate substrate during a poling treatment of the substrate crystal, the hydrogen content in the substrate can be easily reduced by heat-treating the substrate in a dry atmosphere. The mechanism of the relationship between the hydrogen content of the substrate and the DC drift of the substrate is not fully clear. Nevertheless, it is assumed that since the electric resistance (R) of a low hydrogen content substrate is usually higher than that of a high hydrogen content substrate, this phenomenon probably contributes to the reduction in the DC drift of the low hydrogen content substrate.

Usually, the dielectric layer is formed from silicon dioxide. Also, it is known from, for example, Japanese Unexamined Patent Publication (Kokai) No. 5-257,105 that the DC drift of the dielectric layer can be reduced by doping silicon dioxide with at least one member selected from the elements of the III to VIII groups, Ib group and IIb group of the Periodic Table. This technique appears to correspond to the control of the electric resistance (R), electric capacitance (C) and relaxation time ($\tau$).

From another report, it is known that the DC drift of the lithium niobate substrate can be reduced by surface-modifying the substrate by an ion-injection method prior to the formation of the dielectric layer on the substrate.

In still another report, it is known from, for example, Minakata, Electronic Information Communication Association Theses, Vol. J77-C-1 (1994), 194, that the DC drift of a lithium niobate substrate can be reduced by etching and removing a surface portion of the substrate, in which the composition of the materials from which the substrate is formed, is modified during a step for forming an optical waveguide in the surface portion of the lithium niobate substrate.

As mentioned above, various methods have been attempted to reduce the DC-drift. However, these methods are not satisfactory for practical use. Also, the known methods were experimentally discovered and developed, and thus do not fully correspond in numerical results to the RC equivalent circuit model.

Although the known methods are practically contributory to reduce the DC drift, it is difficult to exactly evaluate the practical usage of the known methods.

However, from the viewpoint of industrial production of the optical device, it is most desirable that the DC-drift-reducing method is as simple as possible and can be easily controlled. For example, with the known method, in which one or more doping elements are forcedly introduced into a dielectric layer, it is difficult to quantitatively control the introduction of the elements with a high reproducibility.

In the production of an optical waveguide device, for example, a Mach Zehnder optical modulator, in a surface portion of a lithium niobate ($LiNbO_3$) substrate, an optical waveguide having a pair of branch portions converged in a Y-shape into an input portion and output portion thereof is formed by a thermal diffusion method of titanium, a dielectric (buffer) layer is formed from a dielectric material on the substrate surface, and an electrode system composed of a plurality of electrodes is arranged on the dielectric layer. This production process is disclosed, for example, by Nishihara, Haruna, and Sumihara, "Optical Integrated Circuits", 1985, Ohmu-Sha. Optionally, for the purpose of evenly dispersing an electric charge generated on the surface of the optical device due to a pyroelectric effect of $LiNbO_3$ when the environmental temperature, at which the optical device is operated, is changed, without allowing the charge to be concentrated under the electrodes, and of reducing a drift in the device properties (operating points of modulated phase), a thin layer having a lower electric resistance than that of the dielectric layer is arranged on or under the dielectric layer, as disclosed in K. Seino, T. Nakazawa, Y. Kubota, M. Doi, T. Yamane and H. Hakogi, 'Proc. OFC' 92, San Jose, Feb. 8 to 11, 1992 (Optical Soc. An. Washington (1992), 332, Jumonji, and Nozawa "Electronic Information Communication Association Theses," C-1, J75-C (1992) 17, and Japanese Unexamined Patent Publication No. 5-66,428.

In the formation of the optical waveguide in the surface portion of the lithium niobate substrate, the thermal diffusion treatment with titanium is carried out at about 1000° C. To reduce or prevent an undesirable out-diffusion of lithium from the substrate at the high temperature to the outside of the substrate, the thermal diffusion treatment is usually carried out in a wetted gas atmosphere provided by flowing the gas through a water bath while bubbling, as disclosed in the abovementioned "Optical Integrated Circuits". In most all of the above-mentioned treatments, the wetted thermal diffusion atmosphere is provided by wetting a pure oxygen gas, an argon-oxygen-mixed gas or air.

The dielectric (buffer) layer, which is an important constituent of the optical element, is formed on the optical waveguide-provided substrate from a dielectric inorganic oxide, for example, $SiO_2$ or $Al_2O_3$, by a vacuum deposition method, ion-assist vacuum deposition method, sputtering method or chemical vapor deposition method, which is a common method of forming a thin film.

The inorganic oxide, for example, $SiO_2$ or $Al_2O_3$ has a high electrically insulating property and exhibits a low dielectric constant (refractive index). Therefore, optical signals being transmitted through the optical waveguides and high frequency electric signals being transmitted through the electrodes can be matched together and retained at a high efficiency. Also, since both the substrate-forming material and the dielectric layer-forming material are inorganic oxides, the interfacial chemical bonding force between the substrate and the dielectric layer is strong thus the dielectric layer can be bonded to the substrate surface with a high stability.

It is known from Japanese Unexamined Patent Publication (Kokai) No. 58-181,318, that after the dielectric layer is formed by the above-mentioned method, for example, a vacuum deposition method or sputtering method, the resultant dielectric layer is heat-treated in an oxidative atmosphere at a temperature of about 600° C., to eliminate an oxygen defects in the dielectric layer. In this thermal treatment, usually a wetted oxygen gas prepared, for example, by bubbling the oxygen gas through a water bath, is employed to reduce the out-diffusion of lithium and to promote the oxidation reaction of the dielectric layer.

The above-mentioned conventional methods including the thermal diffusion step for forming the optical waveguide in a wetted gas atmosphere and the heat treatment step for the dielectric layer in a wetted gas atmosphere, exhibit an unsatisfactory DC drift phenomenon which is a big problem to be solved for the Mach Zehnder optical wave modulator having a lithium niobate substrate.

The term "DC drift phenomenon" is referred to as a phenomenon of changing an adjusted, modulated optical phase of an optical device output and of getting out of the adjusted phase, with a lapse of time due to a DC voltage applied to the device. The DC drift phenomenon is not fully clear and is still under discussion: In one prevailing opinion, it is assumed that the DC drift phenomenon closely relates to electric properties (for example, resistivity and dielectric constant) of the substrate and the dielectric (buffer) layer, and thus it is difficult to completely prevent the DC drift phenomenon of the optical device. (Jumonji and Nozawa, Electronic Information Communication Theses, C-1, J75-C-1 (1972), 17, and Japanese Unexamined Patent Publication (Kokai) Nos. 5-66,428 and 4-346,310)

SUMMARY OF THE INVENTION

An object of the present invention is to provide an optical waveguide device exhibiting a reduced DC drift phenomenon, without the need of the specific treatment and controlling operation.

The above-mentioned object can be attained by the optical waveguide device of the present invention, which comprises:

a substrate comprising lithium niobate;

an optical waveguide formed in a front surface portion of the substrate;

a dielectric layer formed on a front surface of the substrate and covering the surface of the optical waveguide; and an electrode system comprising a plurality of electrodes arranged on the dielectric layer, said dielectric layer comprising a matrix component consisting of an amorphous silicon dioxide and a doping element component comprising at least one member selected from the group consisting of lithium and niobium, and having a refractive index lower than that of the amorphous silicon dioxide matrix free from the doping element component.

In the optical waveguide device of the present invention, the optical waveguide is preferably prepared by thermally diffusing titanium into the surface portion of the lithium niobate substrate in a dry gas atmosphere. Also, the dielectric layer is preferably heat treated in a dry gas atmosphere.

The optical waveguide device of the present invention, preferably exhibits a drift of direct current bias voltage of the device controlled to such an extent that when optical waves are input into the device while maintaining the temperature of the device at a level equal to or higher than room temperature and continuously applying a direct current bias voltage between the electrodes, and a change in the operating point of the optical waves output from the device with time is monitored, the ratio A of a saturated drift voltage amount VC to the applied direct current bias voltage VB is less than 1.

Also, in the optical waveguide device of the present invention, preferably the optical waveguide has two branch portions thereof converged into an input portion and into an output portion thereof and extending in parallel to each other, the electrode system comprises a hot electrode and a pair of ground electrodes arranged on the both sides of the hot electrode and spaced from the hot electrode, one of the branch portions of the optical waveguide faces the hot electrode through the dielectric layer, the other branch portion of the optical waveguide faces one of the ground electrodes through the dielectric layer, and the branch portion of the optical waveguide facing the hot electrode has a width larger than that of the other branch portion of the optical waveguide facing one of the ground electrodes.

Further, in the optical waveguide device of the present invention, preferably the optical waveguide has two branch portions thereof converged into an input portion and into an output portion thereof and extending in parallel to each other, the electrode system comprises a hot electrode facing one of the branch portions of the optical waveguide through the dielectric layer and a pair of ground electrodes one of which faces the other branch portion of the optical waveguide through the dielectric layer, and regions of the dielectric layer surface located between the electrodes adjacent to each other are coated with electroconductive layer in such a manner that at least one portion of each of the dielectric layer surface regions is not coated with the electroconductive layer, and the non-coated portion of each dielectric layer surface region extend along the extending direction of the branch portions of the optical waveguide and expose to the outside of the device, whereby an electrical connection between the electrodes adjacent to each other through the electroconductive layer is at least partially interrupted.

Still further, in the optical waveguide device of the present invention, preferably the substrate and the optical waveguide formed in the surface portion of the substrate are curve-deformed together with the dielectric layer in an arc form curving around a curvature center located on a straight line perpendicular to the substrate surface due to an internal stress effect generated in the dielectric layer, whereby a distortion is generated in the optical waveguide and renders the refractive index of the optical waveguide to be slightly changed, and the slight change in refractive index of the optical waveguide renders, together with a photoelastic effect of the optical waveguide, the phase of the optical waves transmitting through the optical waveguide to be controlled to a desired phase.

BRIEF DESCRIPTION OF THE DRAWINGS

FIG. 2-(b) is a graph showing a result of a secondary ion mass spectroscopy analysis of the same dielectric silicon dioxide layer (SP) as in FIG. 2-(a), after heat treatment;

FIG. 2-(c) is a graph showing a result of a secondary ion mass spectroscopy analysis of an example (VE) of the optical waveguide device of the present invention as shown in FIG. 1, before heat treatment;

FIG. 2-(d) is a graph showing a result of a secondary ion mass spectroscopy analysis of the same optical waveguide device sample (VE) as in FIG. 2-(c), after heat treatment;

FIG. 26-(a) shows an explanatory cross-sectional profile of a conventional optical waveguide device;

FIG. 26-(b) shows an explanatory cross-sectional profile of another conventional optical waveguide device;

FIG. 30 is a graph showing an element analysis results by Auger electron spectroscopy of a reacted product formed between the electrodes and the electrode surface itself;

FIG. 31-(a) shows an explanatory plan view of a preferable embodiment of the optical waveguide devices of the present invention;

FIG. 31-(b) shows an explanatory cross-sectional profile of the optical waveguide device as shown in FIG. 31-(a);

FIG. 36-(a) shows an explanatory plan view of still another preferable embodiment of the optical waveguide devices of the present invention;

FIG. 36-(b) shows an explanatory cross-sectional profile of the optical waveguide device of FIG. 36-(a);

DESCRIPTION OF THE PREFERRED EMBODIMENTS

Figure 1:
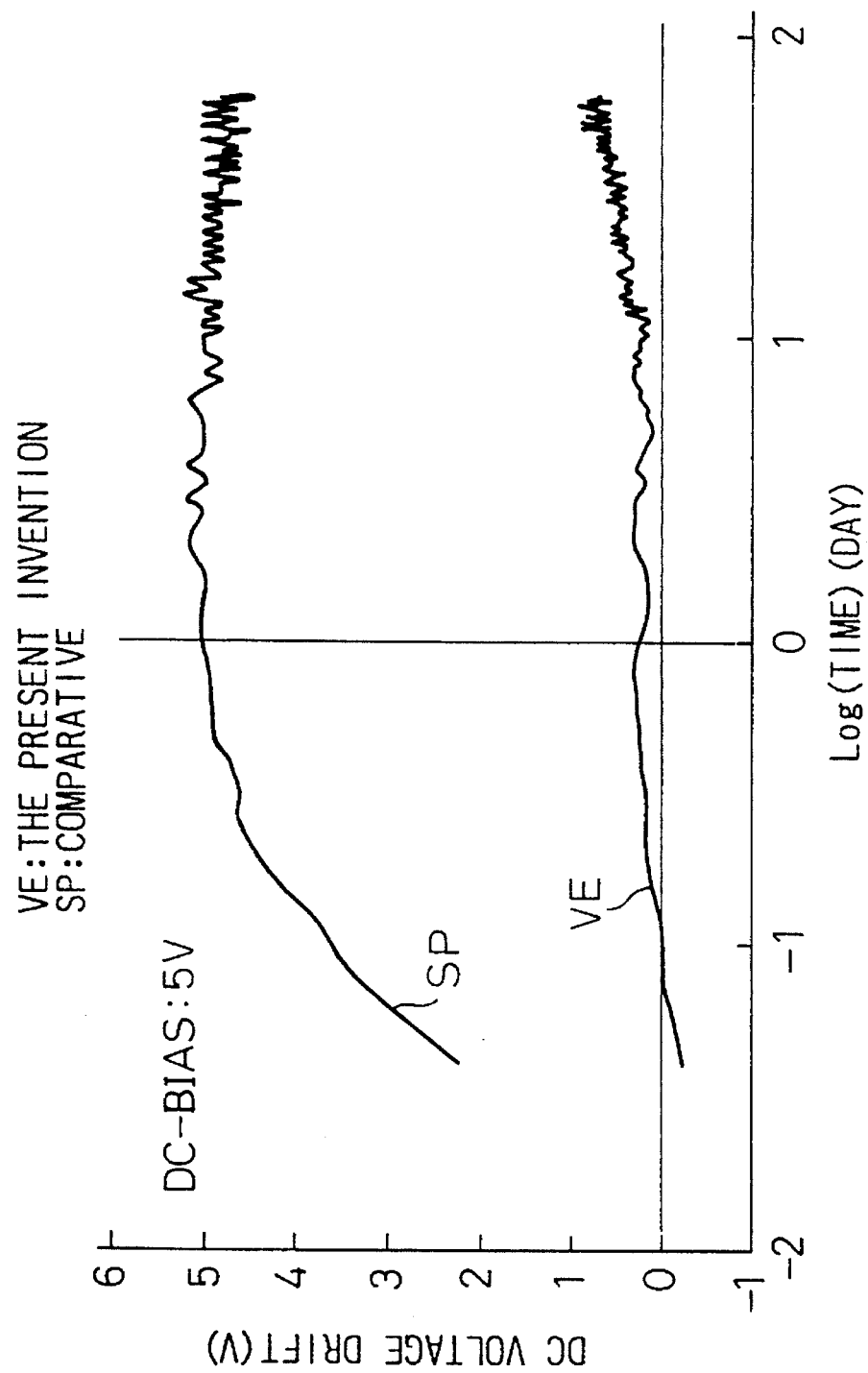
FIG. 1 is a graph showing DC drifts due to dc=5V application of an example (VE) of the optical waveguide device of the present invention and a comparative optical waveguide device (SP), with a lapse of time.

The optical waveguide device of the present invention comprises a substrate comprising lithium niobate ($LiNbO_3$), an optical waveguide formed in a front surface portion of the substrate by, for example, diffusing titanium into the substrate surface portion, a dielectric layer formed on the front surface of the substrate and covering the optical waveguide surface, and an electrode system comprising a plurality of electrodes arranged on the dielectric layer, and is characterized in that the dielectric layer comprises a matrix consisting of an amorphous silicon dioxide and a doping element component comprising at least one member selected from the group consisting of lithium and niobium, and has a refractive index lower than that of the amorphous silicon dioxide matrix free from the doping element component.

In the dielectric layer, the doping element component is preferably in a total amount of $10^{15}$ atoms/cm$^2$ or more but not more than $10^{20}$ atoms/cm$^2$.

Preferably, the dielectric layer of the present invention has a refractive index of 1.44 or less with respect to an optical wave having a wavelength of 0.633 μm, while the amorphous silicon dioxide matrix free from the doping element component has a refractive index of 1.457 with respect to the same optical wave as mentioned above.

Also, the dielectric layer of the present invention optionally further contains a hydrogenated compound or ion.

The hydrogenated compound or ion contained in the dielectric layer of the present invention is in a total amount of $10^{21}$ atoms/cm$^3$ or more, in terms of hydrogen atoms.

Further, at least one member of the doping element component contained in the dielectric layer may be one diffused from the lithium niobate substrate into the dielectric layer.

The optical waveguide device of the present invention exhibits a reduced DC drift with time, while this device does not numerically agree with the RC equivalent circuit model theory. Namely, a significantly low DC drift of the optical waveguide device of the present invention is experimentally confirmed.

In the optical waveguide device of the present invention, the substrate is formed from lithium niobate which exhibits a high electro-optical effect and is practically used as a material for optical devices, for example, a high speed optical intensity modulator. Also, the dielectric layer is usually formed from silicon dioxide which exhibits a low dielectric constant and thus is popularly used as a base material for high frequency waveguide lines. In the present invention, the various specific properties such as electric resistance (R), capacitance (C) and relaxation time (τ) of the dielectric (silicon dioxide) layer formed on the lithium niobate substrate were investigated as major parameters greatly influencing the DC drift of the resultant optical waveguide device. These parameters are greatly influenced by impurity and density of the dielectric silicon dioxide layer. The purity and density of the dielectric layer depend on the method of forming the dielectric layer.

In consideration of the above-mentioned facts, the inventors of the present invention studied the constitution of the silicon dioxide layers of two types of optical waveguide elements significantly different in DC drift behavior from each other, to experimentally discover a contributory material to reduce the DC drift. The present invention was completed on the basis of this discovery.

In the optical waveguide device of the present invention, the substrate and the titanium-diffused optical waveguide are formed by the same procedures as used for the conventional optical waveguide device. However, the dielectric silicon dioxide layer of the present invention is different in that the layer is formed from a matrix component consisting of an amorphous silicon dioxide and a doping element component comprising at least one member selected from the group consisting of lithium and niobium by a vacuum vapor deposition method in which the silicon dioxide matrix component is doped with lithium and/or niobium, and in that the dielectric layer exhibits a lower refractive index than that of the conventional silicon dioxide, from the conventional dielectric layer.

The conditions for forming the dielectric layer by the above-mentioned method are variable depending on the property and quality required for the resultant dielectric layer. Namely, even by the sputtering method, it is possible to obtain a dielectric layer having the same quality and property as those obtained by the vacuum vapor deposition method.

With respect to an optical waveguide device (optical intensity modulator) VE of the present invention and a conventional optical waveguide device (optical intensity modulator) SP, FIG. 1 shows a relationship between logarithmic operating time and DC drift. The measurement of the DC drift was carried out at an operating temperature of 80° C. under a DC bias voltage of 5 V. In the conventional device SP, the dielectric layer was formed from the silicon dioxide material by a sputtering method. Also, in the device VE of the present invention, the dielectric layer was formed by a vacuum vapor deposition method, and consisted of a silicon dioxide layer doped with lithium and niobium and having a low refractive index.

Both the devices were heat treated, after the formation of the dielectric layer, in an oxygen gas stream at a temperature of 600° C. The measurement of the DC drift was carried out at a temperature of 80° C. over about 80 days. FIG. 1 clearly shows that the optical waveguide device VE of the present invention is stable even at the high temperature, and exhibits a significantly low DC drift.

Figure 2:
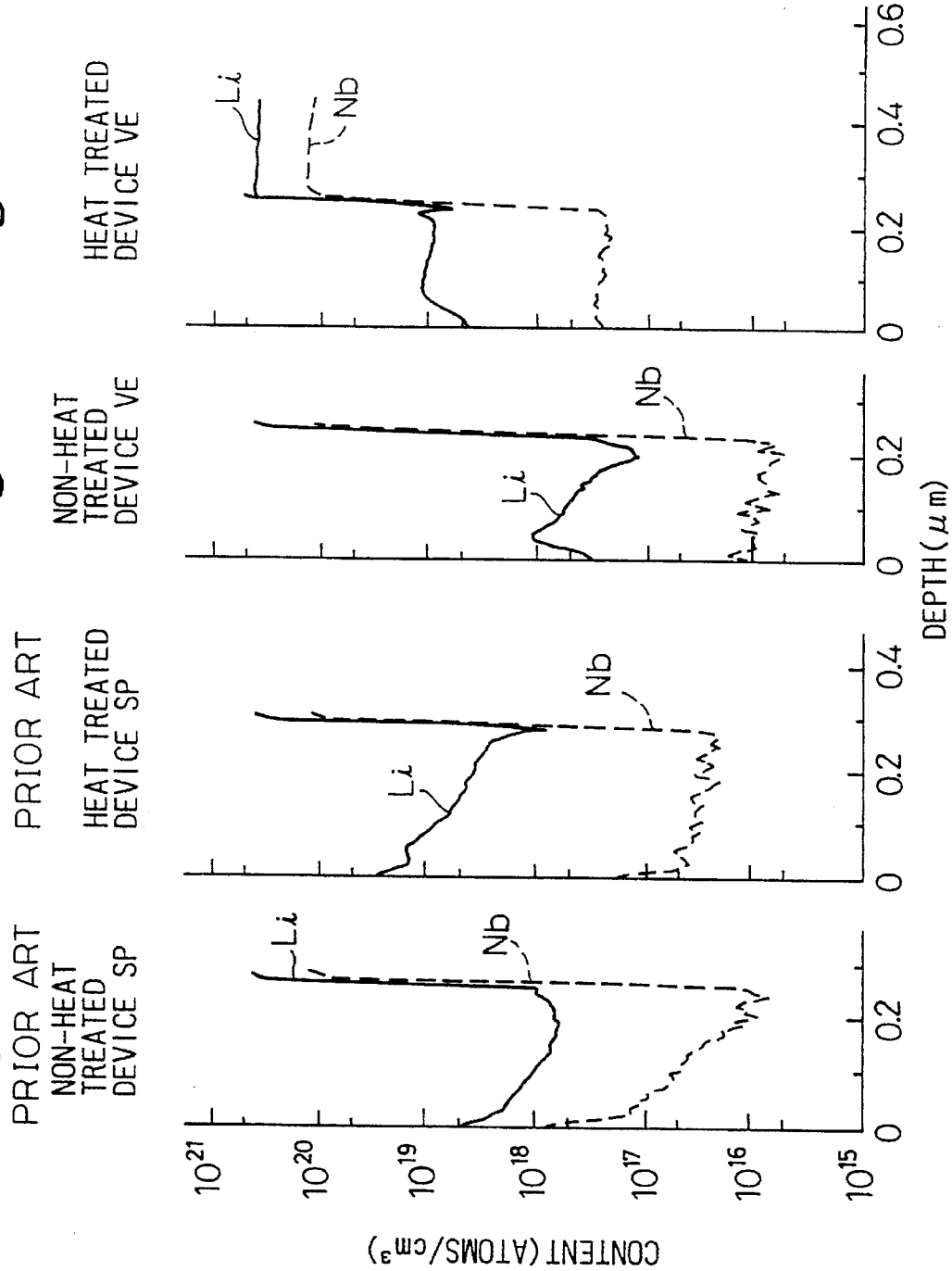
FIG. 2-(a) is a graph showing a result of a secondary ion mass spectroscopy analysis (SIMS) of a dielectric silicon dioxide layer of the comparative optical waveguide device (SP) as shown in FIG. 1, before heat treatment.

FIGS. 2-(a), (b), (c) and (d) show secondary ion mass spectroscopy analysis (SIMS) results of the dielectric silicon dioxide layers of the conventional device SP and the device VE of the present invention, before and after the above-mentioned heat treatment.

FIGS. 2-(a) and (b) concern the dielectric silicon dioxide layer of the conventional device SP, before and after the heat treatment, respectively.

FIGS. 2-(c) and (d) concern the dielectric silicon dioxide layer of the device VE of the present invention, before and after the heat treatment, respectively.

In each of the optical waveguide devices VE and SP, the non-heat treated and heat treated dielectric silicon dioxide layers contained lithium and niobium each in an amount of the order of $10^{15}$ to $10^{19}$ atoms/cm$^3$. This content of lithium and/or niobium in the dielectric silicon dioxide layer is very low and thus the content of lithium and/or niobium can be obtained by diffusion thereof from the lithium niobate substrate during the formation of the dielectric layer and the heat treatment thereof, without forced addition thereof. Practically, the dielectric layer containing lithium and/or niobium can be formed by the film-formation from silicon dioxide having a 4N or 5N grade in purity. A portion of lithium contained in the resultant dielectric layer is derived from an impurity in the silicon dioxide material and almost all of the niobium is derived from the diffusion thereof from the lithium niobate substrate.

The relationship between the doping element component in the dielectric layer and the DC drift of the resultant optical waveguide device is not always clear. Nevertheless, to reduce the DC drift of the optical waveguide device, it is important that the dielectric silicon dioxide layer doped with lithium and/or niobium exhibits a lower refractive index than that of the conventional silicon dioxide matrix.

Figure 3:
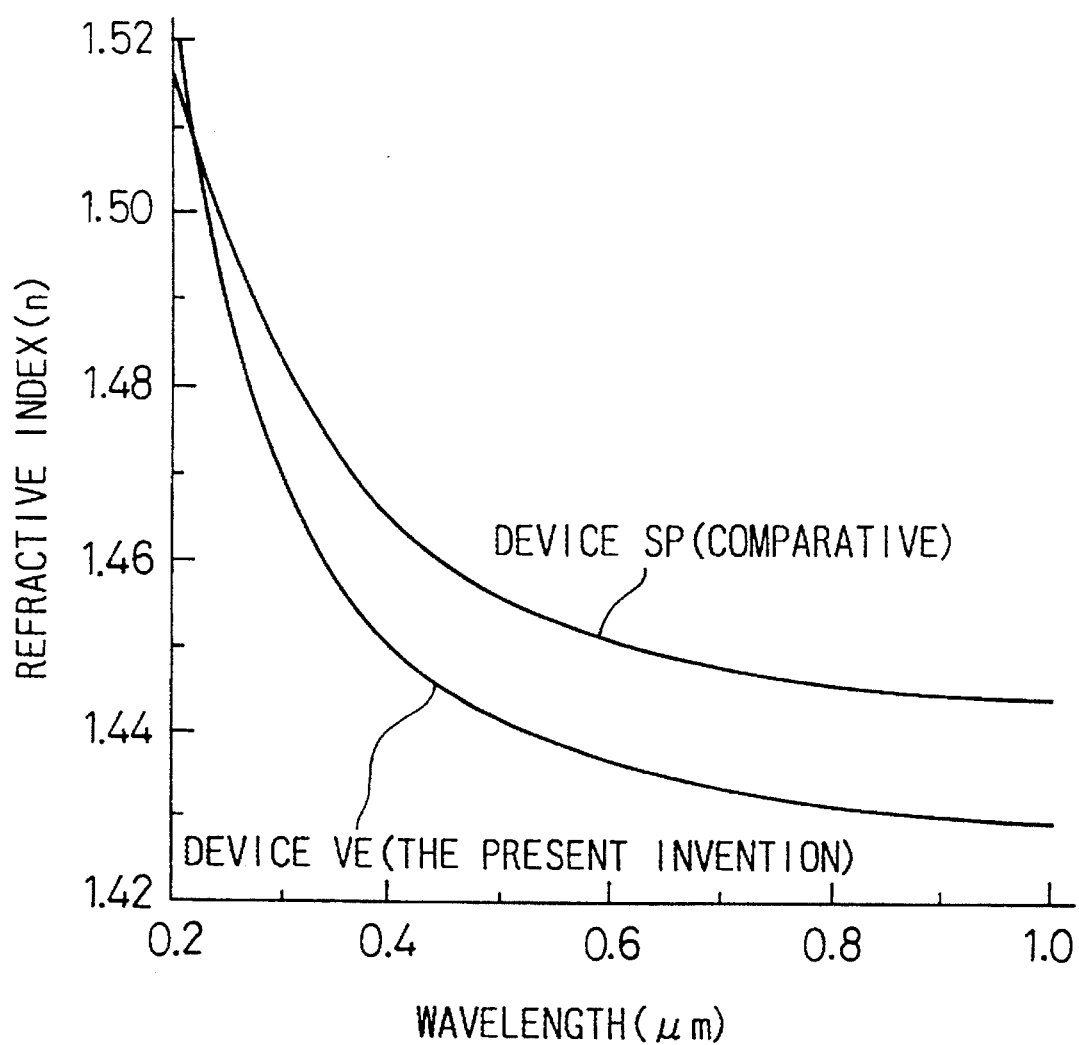
FIG. 3 is a graph showing dependencies of the refractive indexes of the same comparative optical waveguide device (SP) as in FIG. 1 and the same example of the optical waveguide device (VE) as in FIG. 1, on the wavelength, after heat treatment.

FIG. 3 is a graph showing the relevance of the refractive index of the heat-treated dielectric layer of the device VE of the present invention or the comparative device SP and the wavelength. The measurement of the refractive index was carried out by using an Ellipsometer.

Referring to FIG. 3, it is clear that the dielectric layer of the device VE of the present invention exhibits a refractive index significantly different from that of the dielectric layer of the comparative device SP. In the device VE having the lower DC voltage drift, the refractive index of the dielectric layer is significantly lower than that of a typical pure amorphous silicon dioxide. For example, the dielectric layer of the present invention has a refractive index of 1.44 or less with respect to an optical wave having a wavelength of 0.633 µm. This refractive index is clearly lower than the refractive index of 1.457 of the non-doped amorphous silicon dioxide at the same wavelength as mentioned above.

The difference in the refractive index between two dielectric layers depends on the density of the dielectric layers, unless these dielectric layers have significant defects, for example, oxygen defects. Therefore, the dielectric layer of the device VE of the present invention has a lower density than that of the comparative device SP. Namely, since the quantitative determination of the density of the thin dielectric layer is difficult, the refractive index is utilized as a parameter of the dielectric layer.

Figure 4:
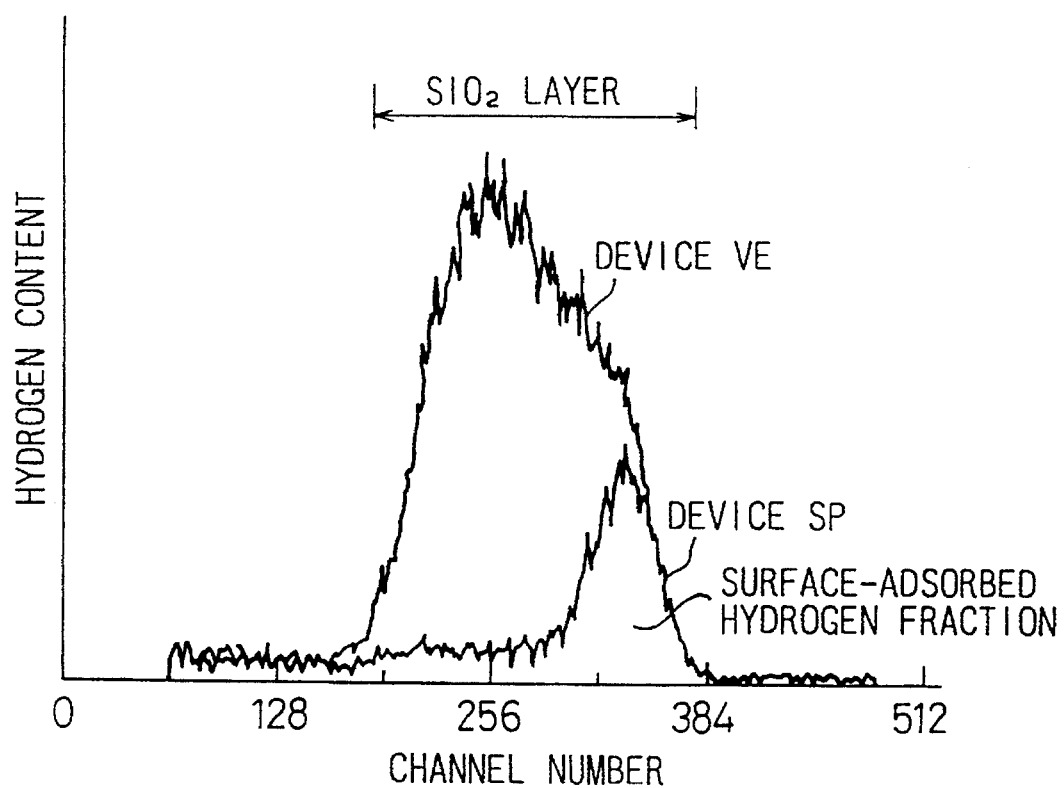
FIG. 4 is a graph showing contents of hydrogen in the dielectric silicon dioxide layers of the same comparative optical waveguide device (SP) as in FIG. 1 and the same example (VE) of the optical waveguide device as in FIG. 2, measured by a hydrogen forward scattering method (HFS)

In this connection, the dielectric layer of the device VE of the present invention exhibits a higher content of hydrogen than that of the comparative device SP, as shown in FIG. 4. Namely, referring to FIG. 4, the dielectric layer of the device VE of the present invention had a content of hydrogenated compound or ion of $10^{21}$ atoms/cm$^3$ or more, in terms of hydrogen atom. The measurement of hydrogen was carried out by a hydrogen forward scattering (HFS) method. It is not clear in what form the hydrogenated compound or ion is contained in the dielectric layer. Nevertheless, it is assumed that the hydrogen is adsorbed in the form of $H_2O$ or OH in voids formed in the amorphous silicon dioxide layer.

Also, it is assumed that the relatively low density of the dielectric layer and the adsorption of hydrogen in the form of $H_2O$ or OH in the dielectric layer are contributory to the electrical performance, especially capacitance (C), of the dielectric layer and thus to the reduction in the DC voltage drift of the resultant optical waveguide device VE of the present invention.

Namely, the specific dielectric amorphous silicon dioxide layer doped with lithium and/or niobium and having a lower refractive index than that of the non-doped amorphous silicon dioxide matrix effectively causes the resultant optical waveguide device to exhibit a reduced DC drift.

The optical waveguide device of the present invention can be produced by a process comprising the steps of:

forming an optical waveguide with a desired form and dimensions by thermally diffusing titanium into a front surface portion of a lithium niobate substrate, forming a dielectric layer on the front surface of substrate so as to cover the optical waveguide, by depositing a dielectric material thereon; and arranging an electrode system comprising a plurality of electrodes on the dielectric layer.

In the above-mentioned process, the formation of the optical waveguide by heat-diffusing titanium into the surface portion of the lithium niobate substrate is preferably carried out in a dry gas atmosphere.

Also, it is preferable that the dielectric layer is further heat treated in a dry gas atmosphere.

In the above-mentioned preferable process, the dry gas atmosphere preferably contains at least oxygen, because the substrate and dielectric layer are made from oxides.

In the formation of the optical waveguide, the thermal diffusing step of titanium is carried out in a dry gas atmosphere at a temperature of 900° C. to 1000° C. The dry gas atmosphere is formed from oxygen gas, a mixed gas of argon with oxygen, or air, which contain at least oxygen. Generally, the oxygen gas is preferably used for the dry gas atmosphere. Also, it is preferable that the dry gas atmosphere contain water vapor in an amount corresponding to a dew point of 0° C. or lower, more preferably −70° C. or lower.

The dielectric layer is formed from $SiO_2$ by a vacuum vapor deposition method or RF-sputtering method, and is preferably heat treated in a dry gas atmosphere at a temperature of 400° C. to 800° C., more preferably about 600° C. The dry gas atmosphere is provided from oxygen gas, a mixed gas of argon with oxygen or air, which contain at least oxygen. Generally, the oxygen gas is preferably employed for the dry gas atmosphere. Also, it is preferable that the dry gas atmosphere contains water vapor in a restricted amount corresponding to a dew point of 0° C. or lower, more preferably −70° C. or lower.

The electrode system comprising a plurality of electrodes is arranged on the dielectric layer, to control the optical properties of the optical waves being transmitted through the optical waveguide. The arrangement of the electrodes is carried out, for example, by forming precursory Au electrodes each with desired form and dimensions (including a thickness in the order of 100 nm) by a photolithographic technique and thin film deposition technique, and increasing the thickness of the precursory Au electrodes to a level of several μm by an Au-plating technique.

Figure 5:
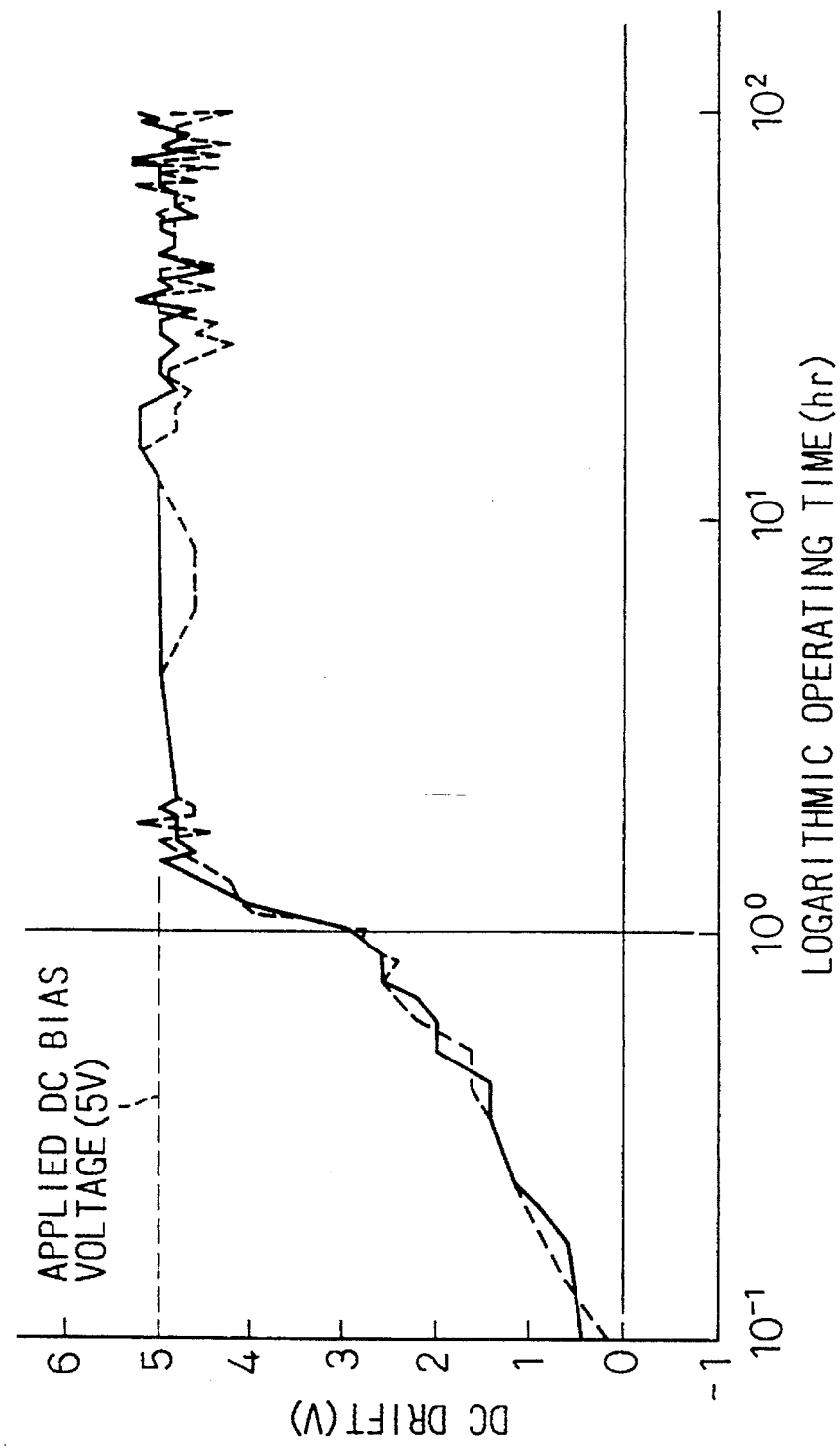
FIG. 5 is a graph showing a relationship between DC drift and operating time, of an example of conventional titanium-diffused LiNbO₃ optical waveguide modulators.

FIG. 5 shows changing of DC drifts of two different conventional optical Ti-$LiNbO_3$ type waveguide devices produced by using wetted gas, in relation to logarithmic operating time.

One of the conventional devices is indicated by a solid line and another one is indicated by a broken line in FIG. 5.

The conventional devices (Mach Zehnder type optical intensity modulators) were produced by forming the titanium-indiffused optical waveguide at a temperature of 980° C. in a wetted synthetic air atmosphere prepared by bubbling air through a super pure water at room temperature and containing water vapor in an amount corresponding to a final dew point of about 40° C. after being introduced into a titanium thermal diffusing oven; forming a dielectric silicon dioxide layer by a sputtering method; and heat treating the dielectric layer at a temperature of 600° C. in a wetted oxygen gas stream having a water vapor content corresponding to a dew point of about 40° C.

The dielectric layer of the conventional device indicated by a solid line in FIG. 5 had a refractive index of about 1.452 at a wavelength of 0.633 μm (see FIG. 3), while the non-doped dielectric matrix had a refractive index of 1.457 at the same wavelength.

Also, the dielectric layer of the conventional device indicated by a broken line in FIG. 5 had a refractive index of about 1.452 at a wavelength of 0.633 μm (see FIG. 3), while the corresponding non-doped dielectric matrix had a refractive index of 1.457 at the above-mentioned wavelength.

To measure the DC drift of each optical waveguide device, a DC bias voltage of 5 V was applied to the device at a temperature of 80° C., and an AC voltage of ±10 V was applied in addition to the DC bias voltage to the device. Then, the modulated optical wave output from the device was observed on an oscilloscope, to measure the changing in the optical intensity peak point with time, of the device.

The DC drift phenomenon is accelerated with an increase in temperature. Therefore, the drift speed at 80° C. is about 1000 times that at room temperature (25° C.). FIG. 5 shows that the conventional optical waveguide modulator exhibited a drift at a level corresponding to the applied DC bias voltage of 5 V several hours after the start of the operation.

Figure 6:
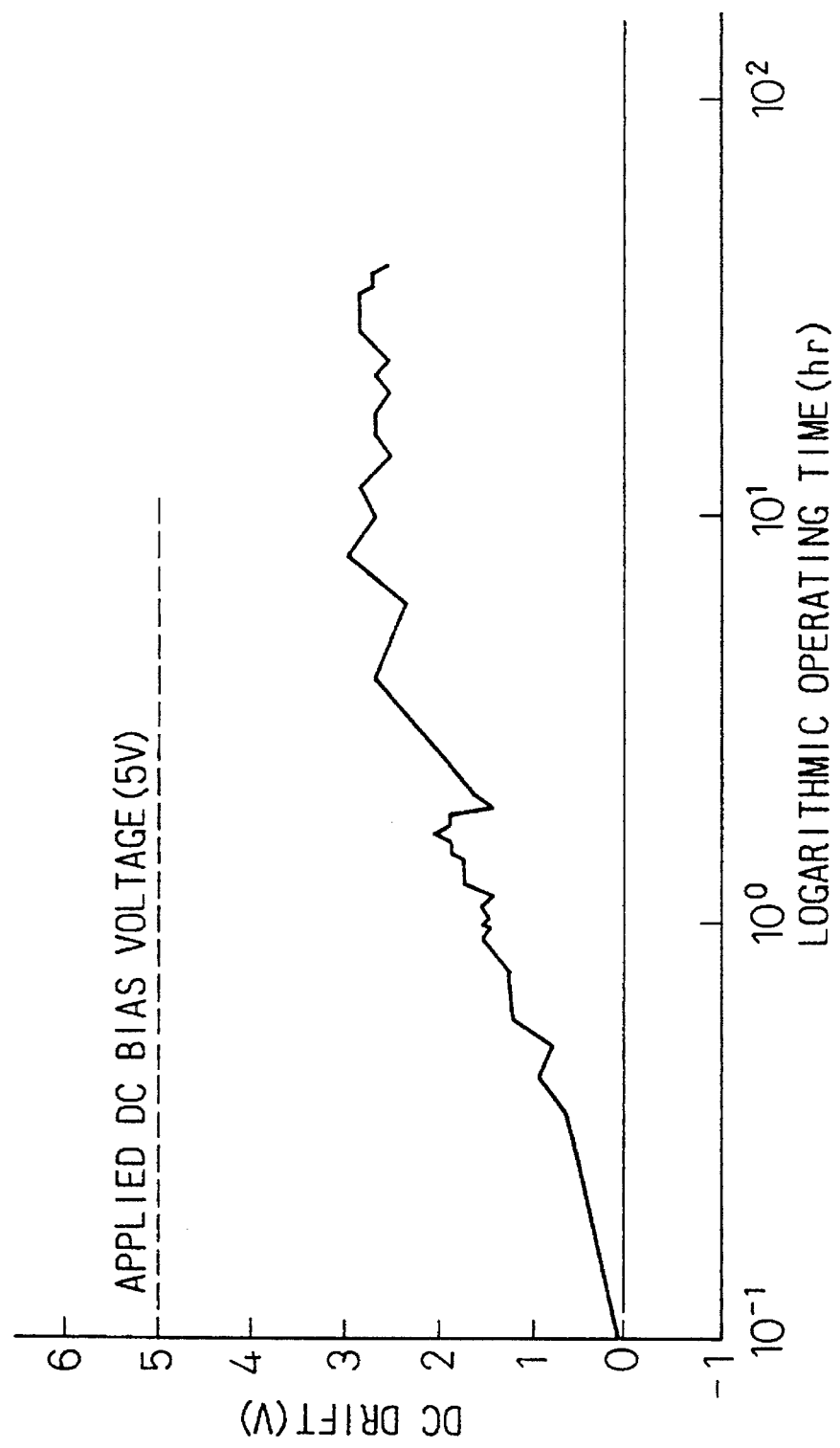
FIG. 6 is a graph showing a relationship between DC drift and operating time, of an example of the titanium-diffused LiNbO₃ optical waveguide modulator of the present invention.

FIG. 6 shows a DC drift of an optical waveguide device of the present invention in relation to operating time. In the production of this device, a titanium thermal diffusion step for forming the optical waveguide was applied to a Z-cut $LiNbO_3$ substrate at a temperature of 980° C. using a dry oxygen gas atmosphere having a water vapor content corresponding to a dew point of −70° C., a dielectric $SiO_2$ layer was formed on the front surface of the substrate including the optical waveguide by a sputtering method, and then the heat treatment of the dielectric layer was carried out at a temperature of 600° C. in a wetted oxygen gas stream having a dew point of about 40° C. The DC drift was measured at a temperature of 80° C. under a DC bias voltage of 5 V.

This device had a dielectric layer having a refractive index of about 1.44 at a wavelength of 0.633 μm, while the corresponding non-doped dielectric matrix exhibited a refractive index of 1.457 at the above-mentioned wavelength.

FIG. 6 clearly shows that the optical waveguide drift of the present invention exhibited a small DC drift of about 2 to about 3 V which is about half that of the conventional devices as shown in FIG. 5. Another optical waveguide device of the present invention was produced by the same process as mentioned above except that the heat treatment of the dielectric layer was carried out using a dry oxygen atmosphere having a water vapor content corresponding to a dew point of −70° C. at a temperature of 600° C.

The dielectric layer of the device had a refractive index of about 1.44 at a wavelength of 0.633 μm, while the corresponding non-doped dielectric matrix had a refractive index of 1.457 at the above-mentioned wavelength.

Figure 7:
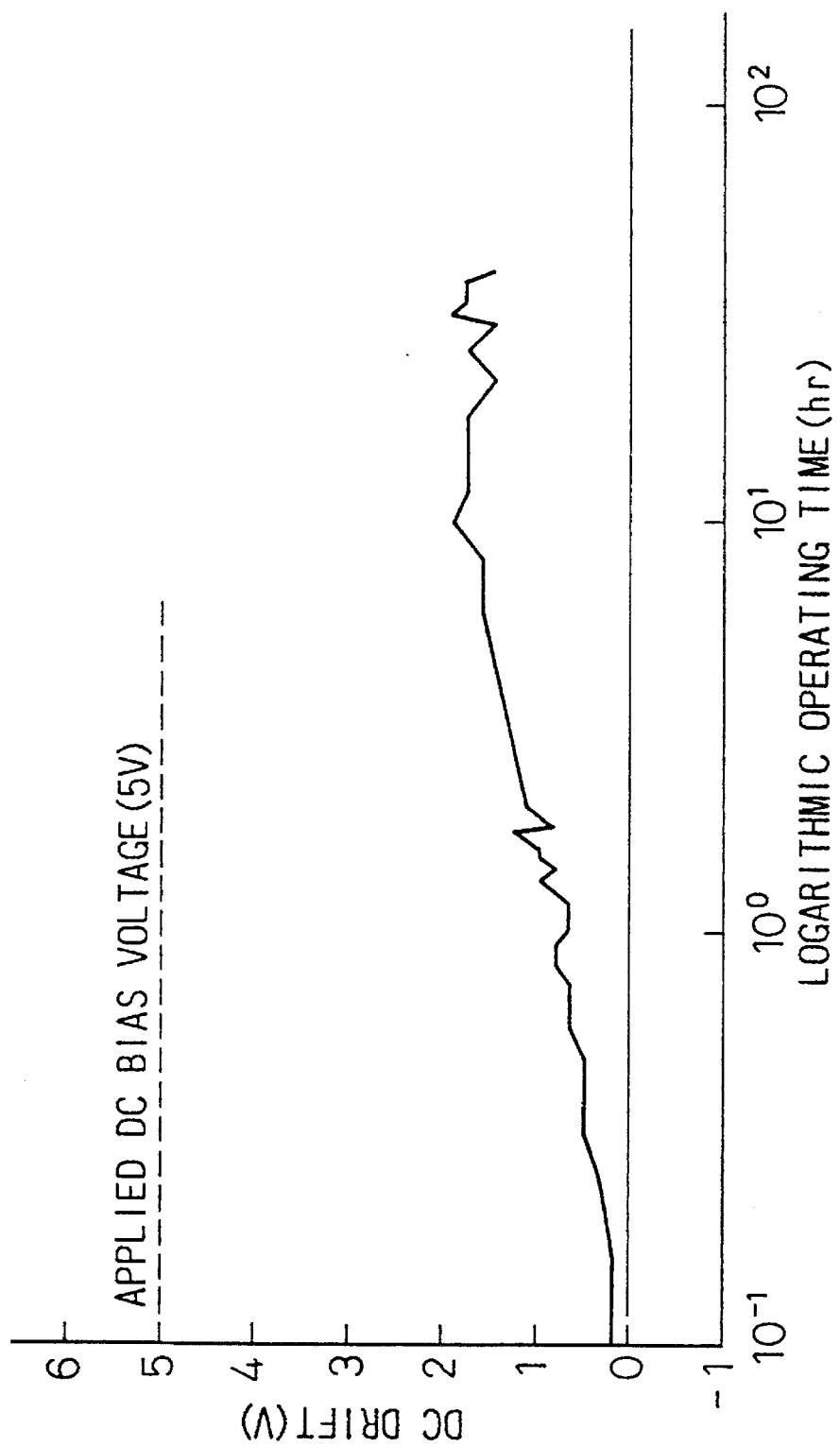
FIG. 7 is a graph showing a relationship between DC drift and operating time, of another example of the titanium-diffused LiNbO₃ waveguide modulators of the present invention.

The resultant device exhibited a DC voltage drift of about 2 V as shown in FIG. 7.

Optical waveguide devices of the present invention similar to those mentioned above were produced from Z-cut $LiNbO_3$ substrates which were different from each other, and subjected to the DC drift measurement.

From the results of the measurement, it was confirmed that the resultant optical waveguide devices having a $LiNbO_3$ substrate exhibited a significantly reduced DC drift. In an example, a Mach Zehnder type optical modulator was produced by forming an optical waveguide in a surface portion of a Z-cut $LiNbO_3$ substrate by thermally diffusing titanium at a temperature of 980° C. using a dry oxygen stream having a dew point of −70° C., forming a dielectric $SiO_2$ layer on the front surface of the substrate including the optical waveguide by a sputtering method and heat treating the dielectric layer at a temperature of 600° C. using a dry oxygen atmosphere having a dew point of −70° C. The dielectric layer had a refractive index of about 1.44 at 0.633 μm.

The resultant device exhibited a DC drift with time as shown in FIG. 7, under the above-mentioned measurement conditions. This DC drift is significantly low and about half that indicated in FIG. 5.

In another example, an optical waveguide device was produced by the same procedures as mentioned above, except that the Z-cut LiNbO$_3$ substrate was one produced by a producer, other than that shown in FIG. 6, and the heat treatment of the dielectric layer was carried out in a wetted oxygen atmosphere having a dew point of about 40° C.

The resultant dielectric layer had a refractive index of about 1.44 at 0.633 μm wavelength.

Figure 8:
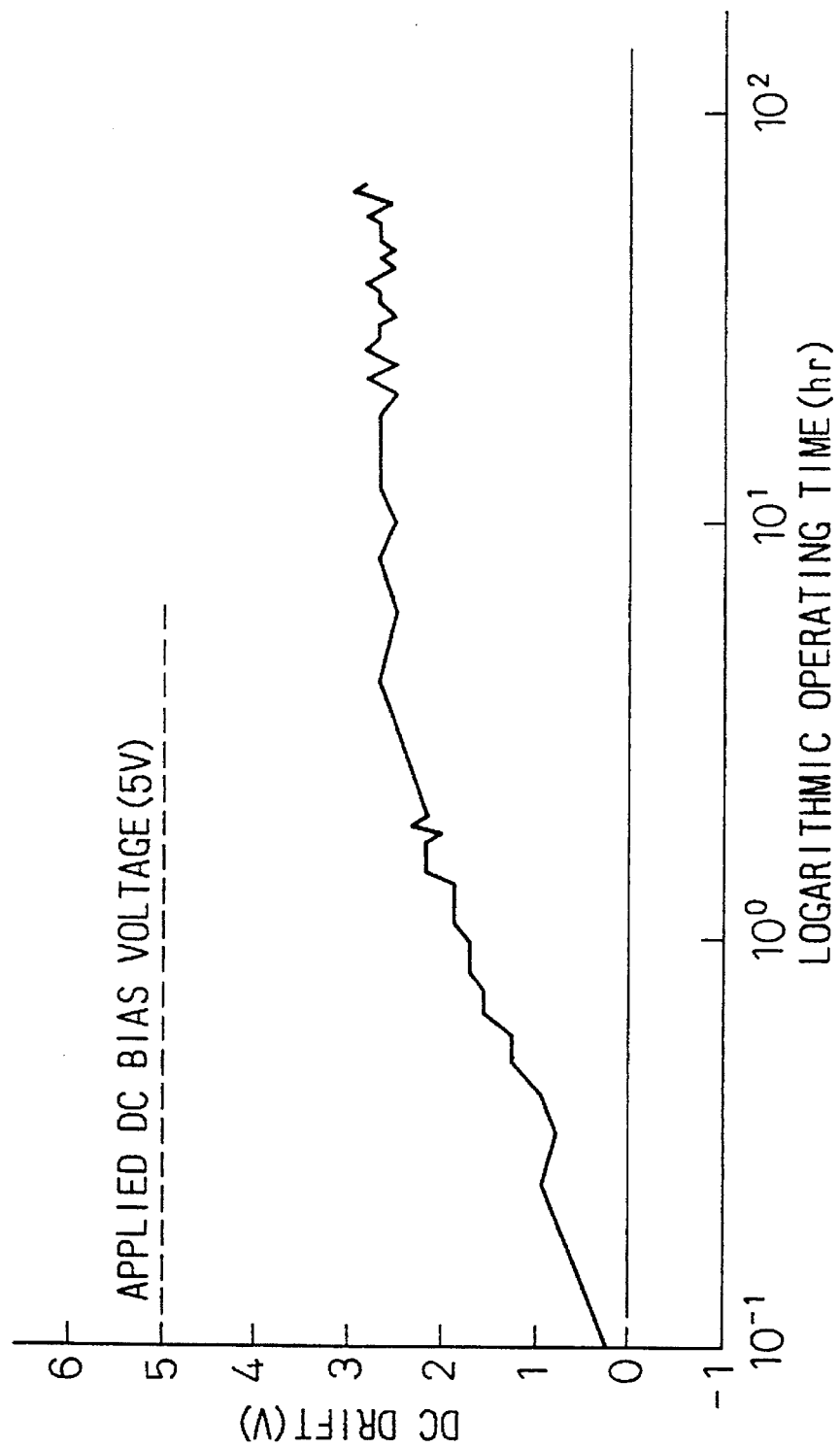
FIG. 8 is a graph showing a relationship between DC drift and time, of still another example of the titanium-diffused LiNbO₃ waveguide modulators of the present invention.

The resultant optical waveguide device exhibited the significantly reduced DC drift with time as shown in FIG. 8.

In still another example, an optical waveguide device was produced by the same procedures as that in FIG. 7, except that the Z-cut LiNbO$_3$ substrate was produced by a producer other than that in FIG. 7. The resultant dielectric layer had a refractive index of about 1.44 at 0.633 μm wavelength.

Figure 9:
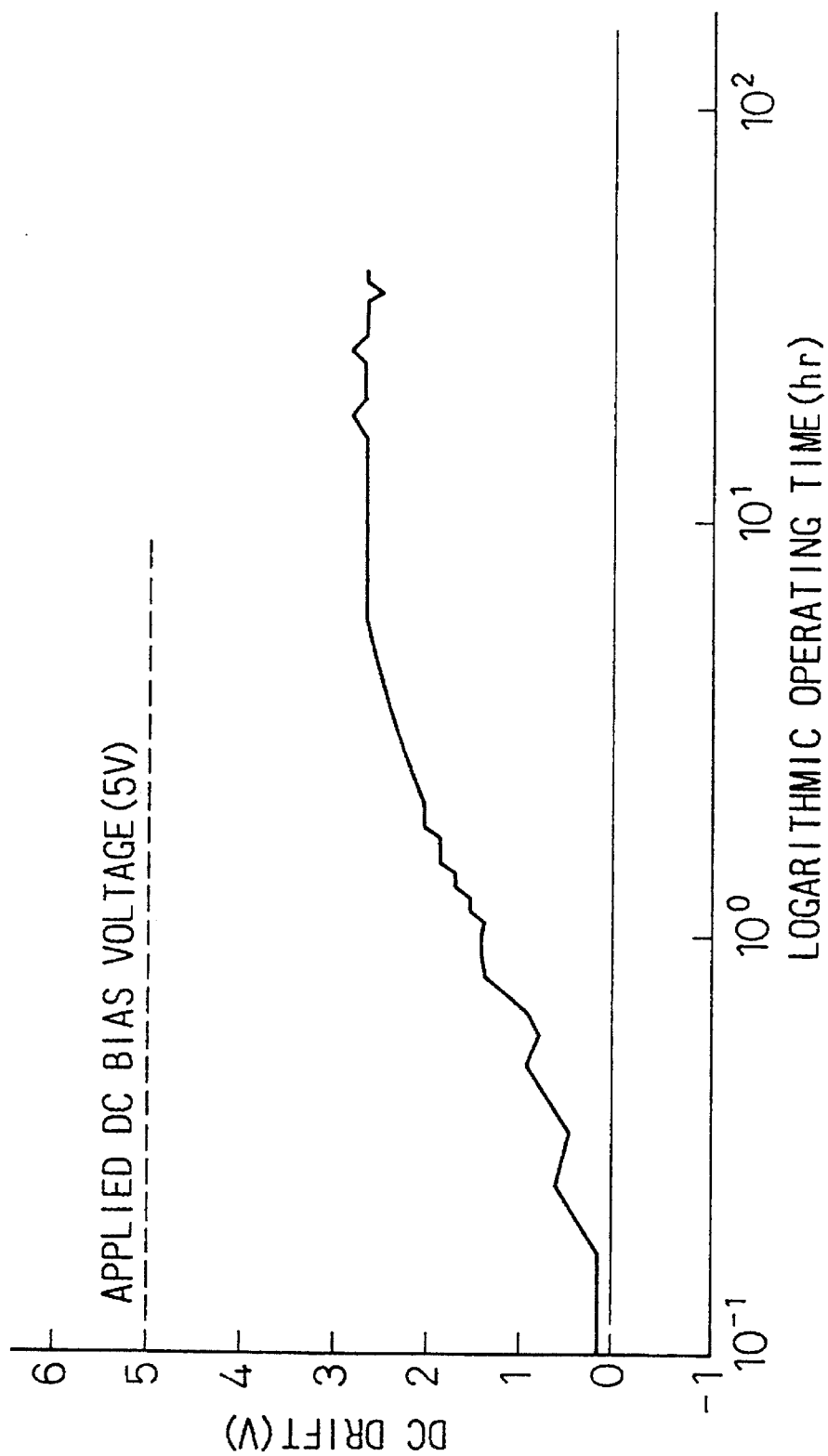
FIG. 9 is a graph showing a relationship between DC drift and operating time, of still another example of the titanium-diffused LiNbO₃ waveguide modulators of the present invention.

The resultant optical waveguide device exhibited a significantly reduced DC drift as shown in FIG. 9.

We believe that the same advantages as in the present invention can be expected in other optical waveguide devices having a substrate made from another electro-optical crystal, for example, LiTaO$_3$ crystal, having a similar crystal structure to that of LiNbO$_3$ crystal.

The reasons for the specific effect of the optical waveguide device of the present invention have not yet been made clear. Nevertheless, it is known from related experimental results that the hydrogen content in the optical device, especially in the LiNbO$_3$ substrate, is changed with a variation in heat-treatment atmosphere, as reported by L. Kovacs, M. Wohlecke, A. Jovanovic, K. Polgar and S. Kapphan, "Infrared Absorption Study of the OH Vibrational Band in LiNbO$_3$ Crystal", J. Phys. Chem. Solids, Vol. 52 (1991), 797–803.

The relative change in hydrogen content derived from variation in heat treatment atmosphere was measured in terms of OH vibrational mode absorption coefficient by the same Fourier transform infrared (IR) absorption method as described in the above-mentioned report. The results are shown in Table 1.

Table 1 clearly shows that the optical waveguide devices, especially the LiNbO$_3$ substrate type device, of the present invention had a significantly reduced hydrogen (OH) content in comparison with that of the conventional optical waveguide devices.

This significantly reduced hydrogen content is greatly contributory to reducing the DC drift of the devices.

In the optical waveguide device of the present invention, it is preferable that when optical waves are input into the device, while maintaining the temperature of the device at a level equal to or higher than room temperature and continuously applying a direct current bias voltage to the electrode system, and a change in the operating point of the optical waves output from the device with time due to the application of the direct current bias voltage being monitored, the ratio A of the saturated drift voltage VC to the applied direct current bias voltage VB is less than 1.

More preferably the ratio A=VC/VB is 0.5 or less.

Also, the optical waveguide device having a reduced DC drift with time is preferably selected from those having a ratio VC/VB of less than 1, more preferably 0.5 or less, as defined above. Where the ratio VC/VB is 0.5 or less, the DC control voltage can be set forth at a low level.

The DC voltage drift-measurement temperature is room temperature or higher, preferably 30° C. or more, more preferably 30° C. to 100° C. The operating point of output optical waves refers to, for example, a peak point of intensity of modulated optical waves.

As mentioned above, the DC voltage drift phenomenon can be accelerated by raising the temperature of the optical waveguide device so as to shorten the necessary time for the measurement. However, the high temperature causes the bonding material or another material used for the production of the optical waveguide device to be deteriorated. Therefore, the accelerated measurement of the DC voltage drift is preferably carried out at a temperature not lower than room temperature and not higher than 100° C. When the measurement temperature is set forth at 80° C., the necessary time for determining the ratio VC/VC is about one day to about several tens of hours.

Figure 10:
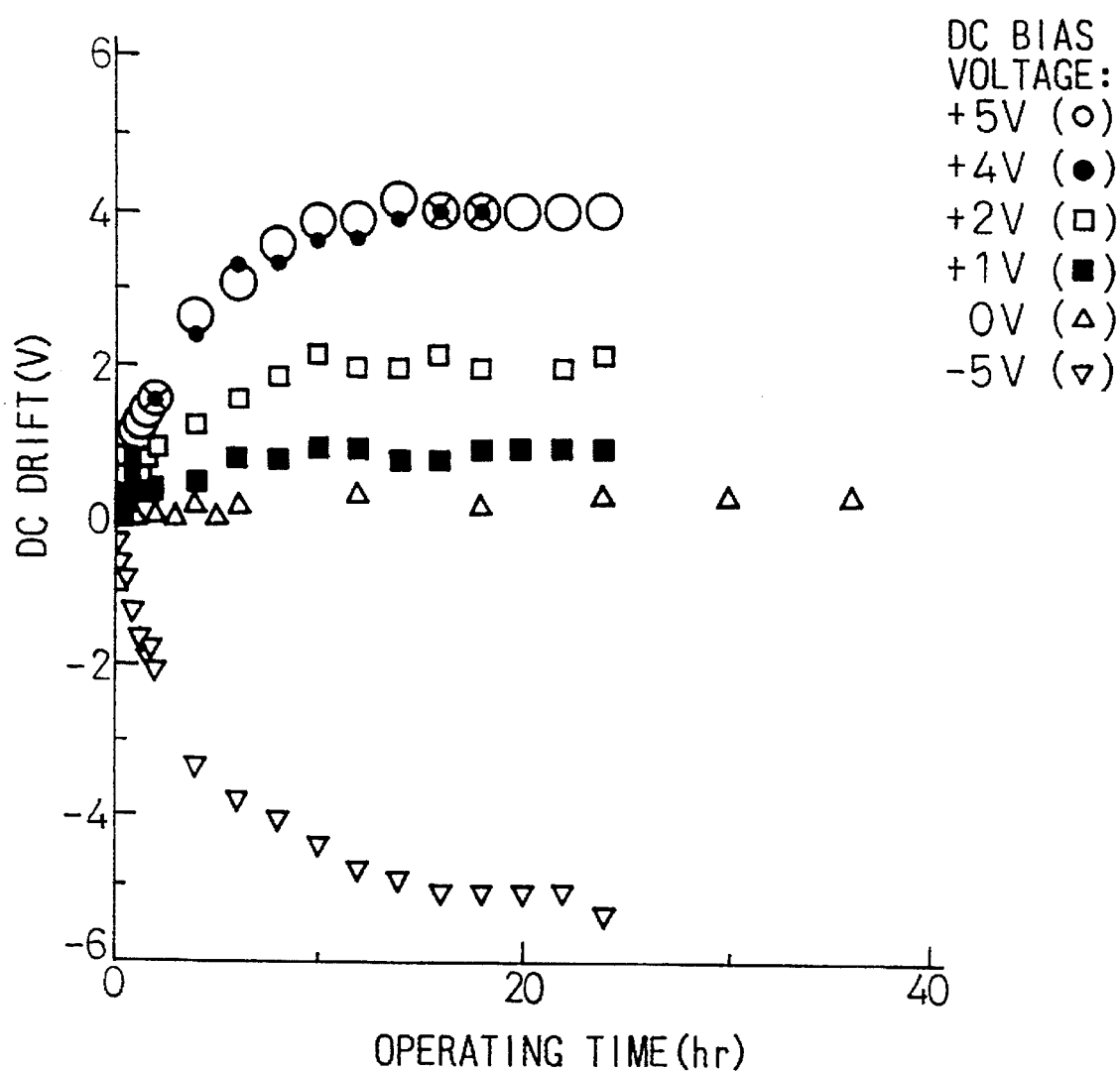
FIG. 10 is a graph showing a relationship between DC drift and operating time, of an example of conventional Ti:LiNbO₃ waveguide Mach Zehnder modulators, measured in a fixed bias continuous voltage application system.

FIG. 10 shows various relationships between DC drift and operating time of a Ti: LiNbO$_3$ optical waveguide device when a fixed DC bias voltage is continuously applied at six levels of −5 V, 0 V, +1 V, +2 V, 4 V and 5 V at a constant temperature of 60° C. The conventional optical waveguide device (Mach Zehnder optical intensity modulator) used is one produced by forming an optical waveguide in desired form and dimensions by thermally diffusing titanium into a front surface portion of a Z-cut LiNbO$_3$ substrate at a temperature of 980° C. in a wetted oxygen gas atmosphere having a dew point of about 40° C., forming a dielectric SiO$_2$ layer usually having a thickness of 500 nm to 1 μm by a sputtering method and heat treating the dielectric layer at a temperature of 600° C. in wetted oxygen gas atmosphere having a dew point of about 40° C. The electrode system is

TABLE 1

|  | Gas atmosphere in optical waveguide forming step | Gas atmosphere in dielectric layer heat treatment step | Refractive index of dielectric layer at 0.633 μm (*)$_3$ | IR absorption due to OH vibration | |
|---|---|---|---|---|---|
|  |  |  |  | Substrate | Substrate and dielectric layer |
| Comparative | WET(*)$_1$ | WET(*)$_1$ | 21.45 | 2.5748 | 2.4812 |
|  | WET(*)$_1$ | DRY(*)$_2$ |  | 1.7954 | 2.0127 |
| The present invention | DRY(*)$_2$ | WET(*)$_1$ | 1.43–1.44 | 0.7509 | 0.7699 |
|  | DRY(*)$_2$ | DRY(*)$_2$ |  | 0.7052 | 0.7188 |

Note: (*)$_1$An oxygen gas bubbled through super pure water at room temperature.
(*)$_2$An oxygen gas had a dew point of −70° C.
(*)$_3$Corresponding non-doped dielectric matrix had a refractive index of 1.457 at a wavelength of 0.633 μm.

formed on the dielectric layer by a metal (Au) vapor deposition and plating method. One end of the optical waveguide is connected to an optical fiber through a thin mulilayered film type polarizer, by an ultraviolet ray-curable, low refractive index epoxy bonding material. Also, the input and output ends of the electrodes are bonded to high frequency wave connectors for electrodes.

In the experiments relating to FIG. 10 for the measurement of DC voltage drift, to the optical waveguide device, optical waves having a wavelength of 1.55 µm were input, while applying each of the above-mentioned fixed DC bias voltages together with a ±20 V AC voltage at 1 kHz, and the intensity of the modulated optical waves output from the device was monitored on an oscilloscope, so as to measure changes, with time, of a specific peak point of the output optical wave intensity. The unit of the changing is in volt (V). The specific peak point was one located closest to the zero volt line of the applied voltage on the abscissas axis of the oscilloscope.

In FIG. 10, the change with time in the DC voltage drift from an initial state is indicated as a DC drift. A similar drift measurement can be carried out by applying only the fixed DC bias voltage without applying the AC voltage. In this case, the DC drift is measured as a change in output optical wave intensity. When an initial operating point and half wave voltage of the device are known, the measured intensity change value can be easily converted to DC drift value in the units of volts.

Figure 11:
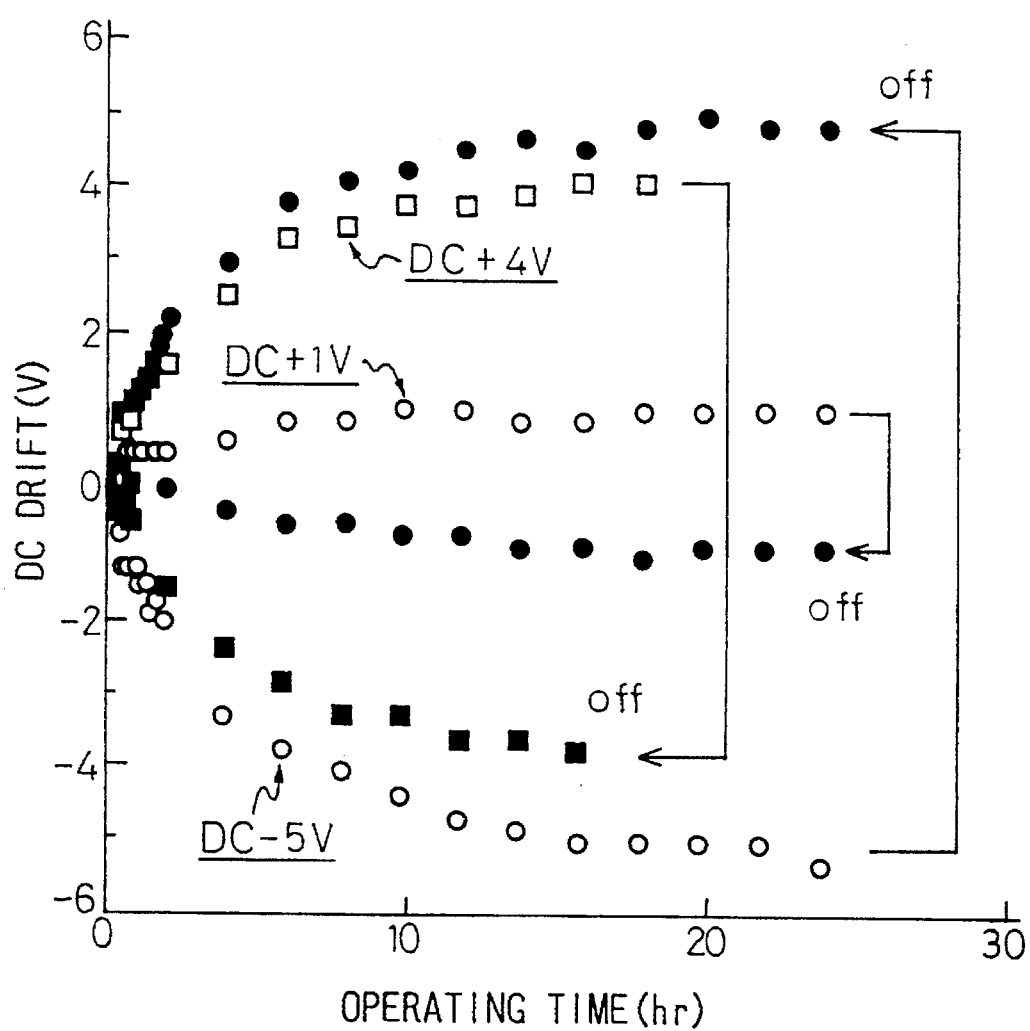
FIG. 11 is a graph showing a relationship between DC drift and operating time, of an optical waveguide device of FIG. 10, when a fixed DC bias voltage (−5, 1 or 4 V shown by ○ or □) is continuously applied, or when the fixed DC bias voltage is released after the DC drift is substantially saturated.

In the experiment shown in FIG. 11, a fixed DC bias voltage of −5 V, +1 V or +4 V was continuously applied to an optical waveguide device at a temperature of 70° C., and the change in DC drift with time was plotted with open circle or square marks (i.e., ○ or □). After the DC voltage become substantially saturated, the applied DC bias voltage was set to be zero, and the change in DC drift with time was plotted with solid circle or square marks (i.e., ● or ■).

FIG. 11 shows that after the DC bias voltage is released, the DC drift generated by the application of the DC bias voltage returns back to zero in substantially the same period of time as the DC bias voltage application time.

The phenomena as indicated in FIGS. 10 and 11 are analogous to a polarization phenomenon of a dielectric material under an electric bias field, especially an orientation polarization phenomenon having a relatively long orientation time, or an ion polarization phenomenon. The observed DC drift is not always caused by the polarization. However, in consideration of the facts that the optical device is constituted from a dielectric oxide material and a ferroelectric material, and that the drift phenomenon needs a long time of several hours, it is assumed that the long-term DC drift phenomenon is not derived from movement of electrons through the optical device and is influenced by at least movement or migration of ions through the optical device.

Also, in consideration of the facts that the DC drift depends on the direction of the bias voltage and that the drift can be recovered by releasing the bias voltage, it is assumed that the drift phenomenon is greatly influenced by the movement of ions or ion pairs, namely a polarization phenomenon, rather than an ion transfer phenomenon.

In other words, it is assumed that when a DC bias voltage is applied, a polarization is created in a direction in which the electrical bias field is released, with a time lag (relaxation time), the DC bias voltage effectively applied to the optical device is gradually reduced, and this gradual reduction appears as a DC drift phenomenon of the optical device. The mechanism of polarization is not fully clear in the present stage. Nevertheless, it is assumed that the polarization occurs on the dielectric material-forming ions per se, or −OH groups derived from hydrogen contained, as an impurity, in the oxide material, or water molecules contained, as an impurity, in the optical device.

Accordingly, the DC voltage drift phenomenon with time lag, which is observed in the case that a single, constant DC bias voltage is continuously applied, as shown in FIGS. 1 and 2, can be represented by the general equation (0) relating to relaxation phenomenon:

$$V(t)=V(\infty)\{1-\exp(-t/\tau)\} \qquad (0)$$

wherein t represents a time, τ represents a relaxation time, $V(\infty)$ represents an apparent saturated DC drift voltage and $V(t)$ represents a DC drift voltage at a time (t).

Figure 12:
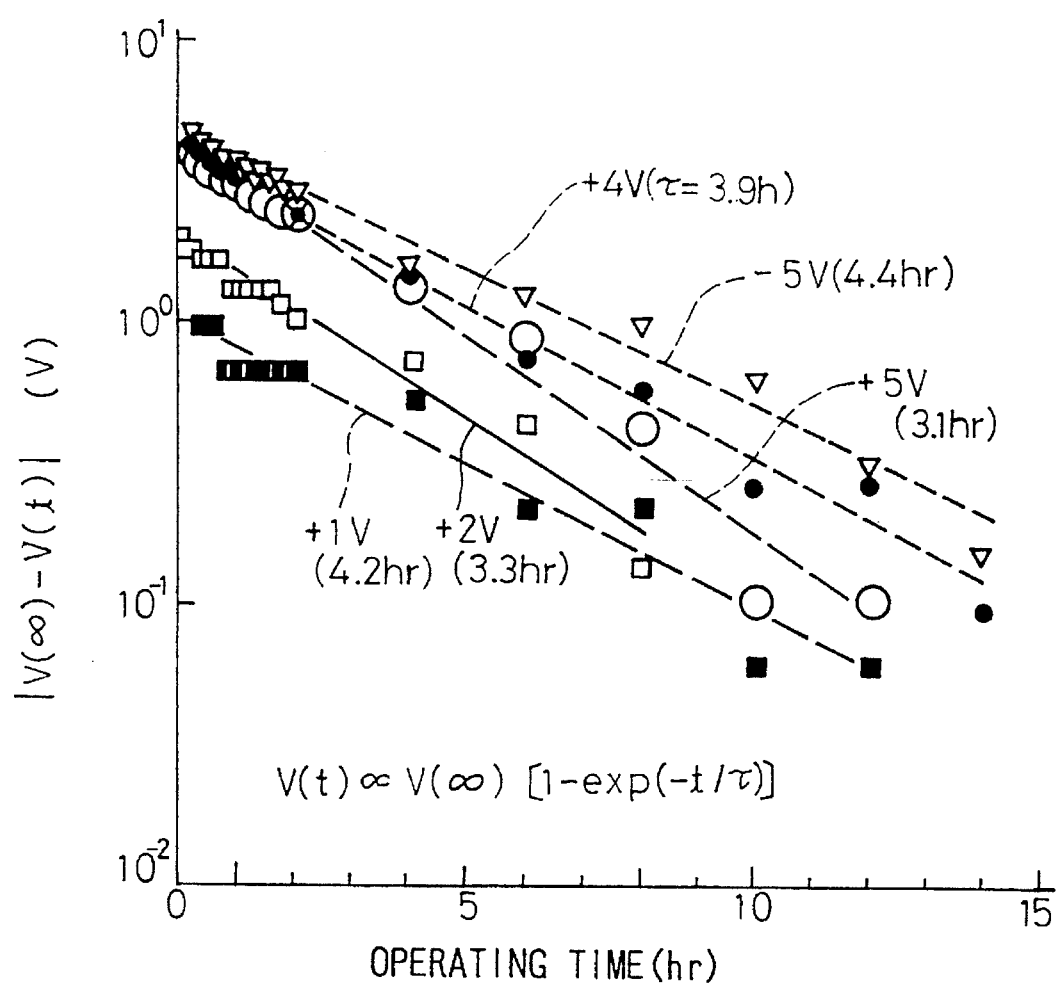
FIG. 12 is a graph showing a relationship of log(V(∞)−V(t)) and operating time, calculated from the data of FIG. 10.

To confirm this, the data in FIG. 10 were converted to data showing a relationship between the operating time and $\log(V(\infty)-V(t))$, and the converted relationship is indicated in FIG. 12. From FIG. 12, it is confirmed that the DC drift phenomenon appearing in a fixed DC bias voltage-application system can be represented by the equation (0). Also, it is understood that the relaxation time at a temperature of 70° C. is about 4 hours, as indicated in parentheses in FIG. 12.

Based on the above-mentioned investigation concerning the DC drift phenomenon observed in a fixed DC bias voltage-application system, it was attempted to link the measured data in the fixed DC bias voltage-application system to DC controled voltage drift in a practical optical waveguide device operation system. In practical operation of an optical waveguide device, an initial bias voltage is applied to the device to adjust the operating point of the device to an optimum voltage position. Due to the DC voltage application a drift V(Δt) is generated a time Δt after the start of the voltage application, and then an additional voltage equal to the drift voltage V(Δt) is added to the intial DC bias voltage. By repeating the above-mentioned operations, the operating point (modulated condition) of the output optical waves can be maintained in the same condition as the initial condition.

A relationship between the DC drift value measured under a fixed DC bias voltage and the DC controlled voltage drift value measured in the practical operation of the optical waveguide device in a follow up control system is assumed from the equation (1):

$$V(t)=AV_B(1-e^{-t/\tau}) \qquad (1)$$

wherein $V_B$ represents a DC bias voltage applied to the device at an initial stage (time t=0) at a constant ambient temperature, V(t) represents a DC drift of the device at a time stage t at the constant ambient temperature, A represents a constant ($V(\infty)=AV_B$) and τ represents a relaxation time.

Where the applied DC bias voltage $V_B'$ changes with time, it is supposed that the total voltage drift V(t) can be given by the sum of the resultant drifts from the additional bias voltages.

From this supposition, where an initial DC bias voltage $V_o$ is applied to the device, the value of an additional DC bias voltage B(nΔt) necessary to maintain the operating point of optical waves output from the device at a time stage t=nΔt in the same condition as that of the initial operating point, can be obtained.

Figure 13:
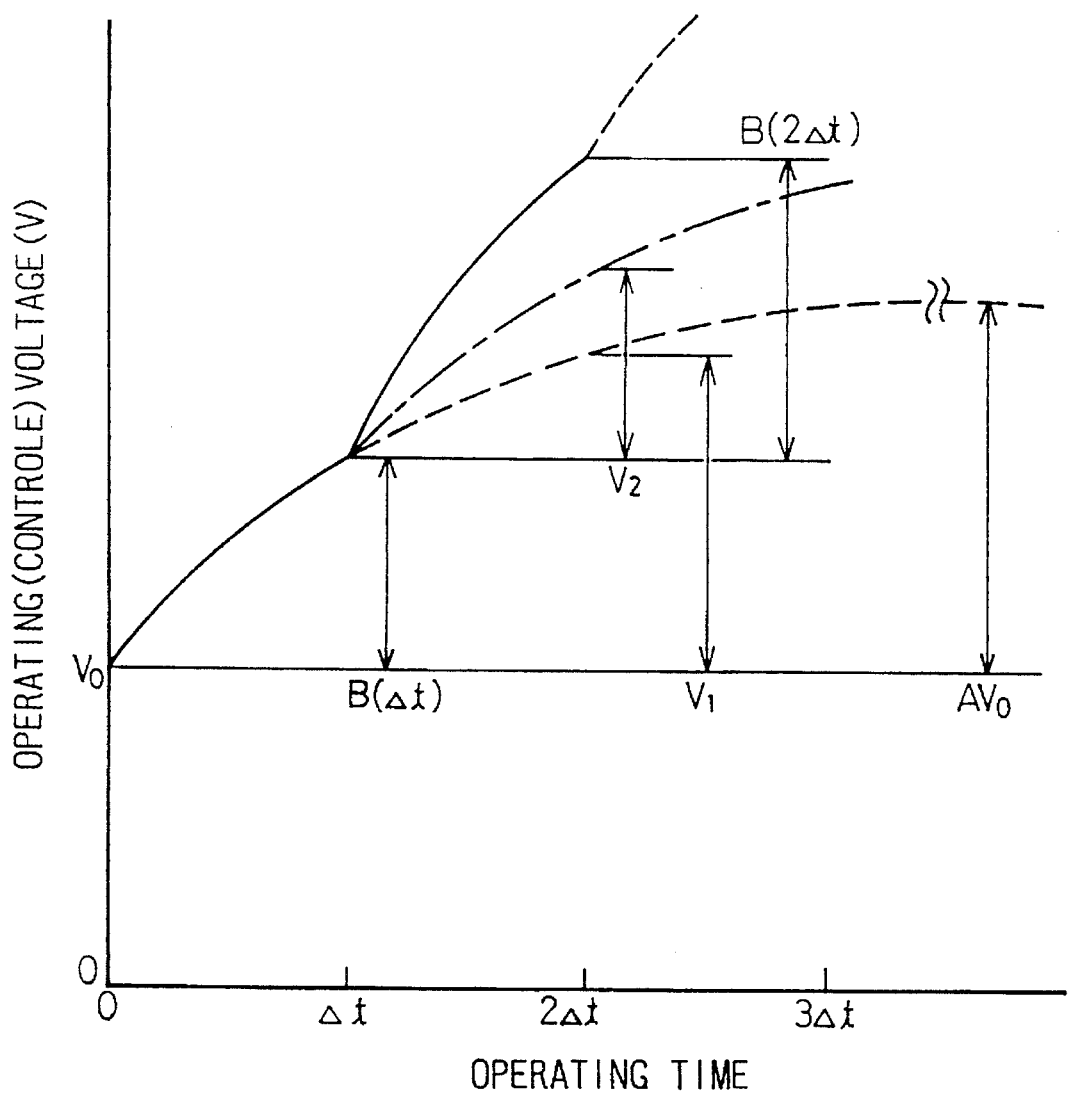
FIG. 13 is a graph showing a relevancy between a drift phenomenon observed in a fixed DC bias voltage operation and a drift phenomenon in a controled voltage operation in a practical control of an optical waveguide device.

Referring to FIG. 13, where an initial voltage $V_o$ is applied to the device at a time stage t=0, the DC voltage drift $V(\Delta t)$ of the device at a time stage $t=\Delta t$ is calculated in accordance with the following equation:

$$V(\Delta t) = AV_o(1-e^{-\Delta t/\tau}) \quad (5)$$

Also, where at a time stage $t=\Delta t$, an additional DC bias voltage $B(\Delta t)=V(\Delta t)$ is further applied to the device, the DC voltage drift value $V(2\Delta t)$ of the device at a time stage $t=2\Delta t$ as indicated in FIG. 13 can be calculated in accordance with the following equation:

$$\begin{aligned}V(2\Delta t) &= AV_o(1-e^{-2\Delta t/\tau}) + AV(\Delta t)(1-e^{-\Delta t/\tau}) \\ &= AV_o(1-e^{-2\Delta t/\tau}) + \\ &\quad A^2V_o(1-e^{-\Delta t/\tau})(1-e^{-\Delta t/\tau})\end{aligned}$$

Further, the additional DC bias voltage $B(2\Delta t)$ at a time stage $t=2\Delta t$, as shown in FIG. 13, can be calculated in accordance with the following equation:

$$\begin{aligned}B(2\Delta t) &= V(2\Delta t) - B(\Delta t) \\ &= AV_o(1-e^{-2\Delta t/\tau}) + A^2V_o(1-e^{-\Delta t/\tau})^2 - \\ &\quad AV_o(1-e^{-\Delta t/\tau}) \\ &= AV_o(1-e^{-\Delta t/\tau})e^{-\Delta t/\tau} + \\ &\quad A^2V_o(1-e^{-\Delta t/\tau})^2\end{aligned}$$

Still further, the additional DC bias voltages $B(3\Delta t)$ and $B(4\Delta t)$ at time stages $t=3\Delta t$ and $t=4\Delta t$ are respectively calculated in accordance with the following equations:

$$B(3\Delta t)=AV_o(1-e^{-\Delta t/\tau})e^{-2\Delta t/\tau}+2A^2V_o(1-e^{-\Delta t/\tau})^2 e^{-\Delta t/\tau}+A^3V_o(1-e^{-\Delta t/\tau})^3$$

and $$B(4\Delta t)=AV_o(1-e^{-\Delta t/\tau})e^{-3\Delta t/\tau}e^{-3\Delta t/\tau}+3A^2V_o(1-e^{-\Delta t/\tau})^2 e^{-2\Delta t/\tau}+3A^3V_o(1-e^{-\Delta t/\tau})e^{-3\Delta t/\tau}+A^4V_o(1-e^{-\Delta t/\tau})^4$$

Accordingly, the additional DC bias voltage $B(n\Delta t)$ at a time stage $t=n\Delta t$ can be calculated in accordance with equation (2):

$$B(n\Delta t) = \sum_{i=1}^{n} \frac{(n-1)!}{(i-1)!(n-i)!} A^i V_o (1-e^{-\Delta t/\tau})^i e^{-(n-i)\Delta t/\tau} \quad (2)$$

The DC control voltage drift value $V(n\Delta t)$ at a time stage $t=n\Delta t$ can be calculated in accordance with equation (3) based on equation (2):

$$\begin{aligned}V(n\Delta t) &= \sum_{k=i}^{n}\sum_{i=1}^{k} B(k\Delta t) \quad (3)\\ &= \sum_{k=i}^{n}\sum_{i=1}^{k} \frac{(k-1)!}{(i-1)!(k-i)!} A^i V_o(1-e^{-\Delta t/\tau})^i e^{-(k-i)\Delta t/\tau}\end{aligned}$$

To converge the value of $V(n\Delta t)$, the inequality (4) must be obtained.

$$B(n\Delta t) < B((n-1)\Delta t) \quad (4)$$

The difference between the values of $B(n\Delta t)$ and $B((n-1)\Delta t)$ is calculated from equation (5):

$$B(n\Delta t) - B((n-1)\Delta t) \quad (5)$$

$$= \sum_{i=1}^{n} \frac{(n-1)!}{(i-1)!(n-i)!} A^i V_o(1-e^{-\Delta t/\tau})^i e^{-(n-i)\Delta t/\tau}$$

$$= \sum_{i=1}^{n=i} \frac{(n-2)!}{(i-1)!(n-1-i)!} A^i V_o(1-e^{-\Delta t/\tau})^i e^{-(n-1-i)\Delta t/\tau}$$

$$= \sum_{i=1}^{n=i} \frac{(n-2)!}{(i-1)!(n-1-i)!} A^i(1-A)V_o(1-e^{-\Delta t/\tau})^{i+1} e^{-(n-1-i)\Delta t/\tau}$$

In equation (5), when A is less than 1, the equation (4) is duly concluded and the $V(n\Delta t)$ value converges.

Also, when A is equal to 1, from equation (5)

$$B(n\Delta t)=B((n-1)\Delta t),$$

and therefore the $V(n\Delta t)$ value linearly diverges.

In view of equation (3), it is understood that the convergence of the $V(n\Delta t)$ value depends on the parameters A, $\Delta t$ and $\tau$.

Namely, in view of equation (3), the DC control voltage drift amount at a certain stage depends on the time interval $\Delta t$ of the control operations, the relaxation time $\tau$ measured in a fixed DC bias voltage application system, and a ratio A of apparent saturated drift amount (unit:volt) to applied DC bias voltage. In view of equation (5), the necessary condition for causing the control voltage drift to converge but not diverge, are that the ratio A is less than 1 (A<1), namely the apparent saturated drift amount (VC) obtained in a fixed DC bias voltage-application system is less than the applied bias voltage (VB). $\Delta t$ is a parameter variable depending on the system. r is a parameter variable depending on temperature. If a temperature acceleration coefficient is known, the drift amount at a certain temperature can be estimated by a product of the r value measured in an accelerated condition at a high temperature, and the temperature acceleration coefficient.

As mentioned above, the A value may be a parameter for selecting the drift property of the optical device. Also, it is known that the larger the r value, the lower the drift amount. Therefore, the r value can be also utilized as a parameter for selecting the optical device.

Figure 14:
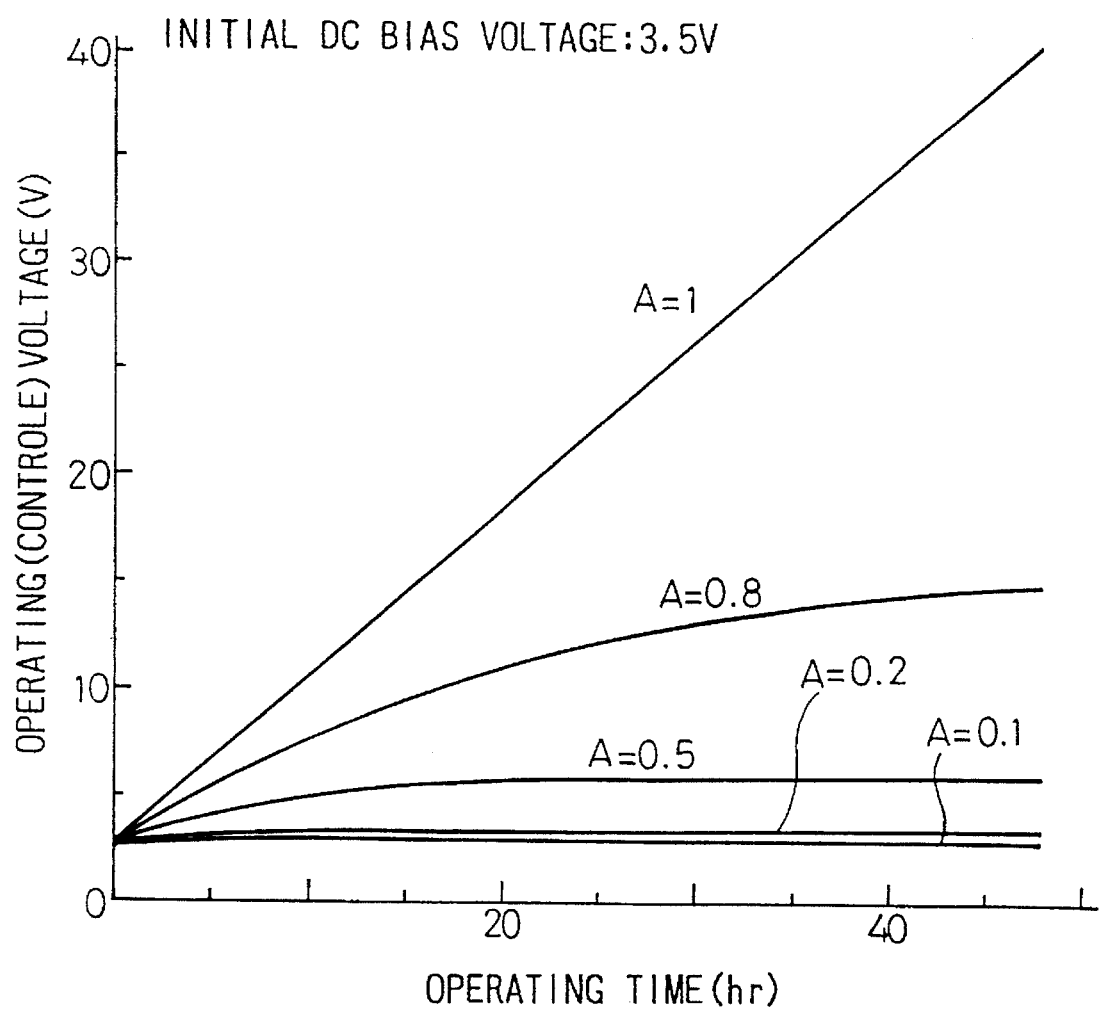
FIG. 14 is a graph showing a relationship between operating time and operating voltage calculated from the equation (3) which will be indicated hereinafter, and practical data.

FIG. 14 shows a plurality of relationships between operating time and operating (control) voltage calculated in accordance with equation (3). In the measurement, the $\tau$ value was 4 hours, which is the same as in FIGS. 10 and 12, the initial bias voltage was 3.5 V which corresponded to a half wave voltage of the optical device, $\Delta t$ was set to 1 hour for reasons of convenience, and A=1.0, 0.8, 0.5, 0.2 or 0.1. If A=1, in view of equation (5), the necessary control voltage VB linearly increases and diverges with the lapse of operating time.

Figure 15:
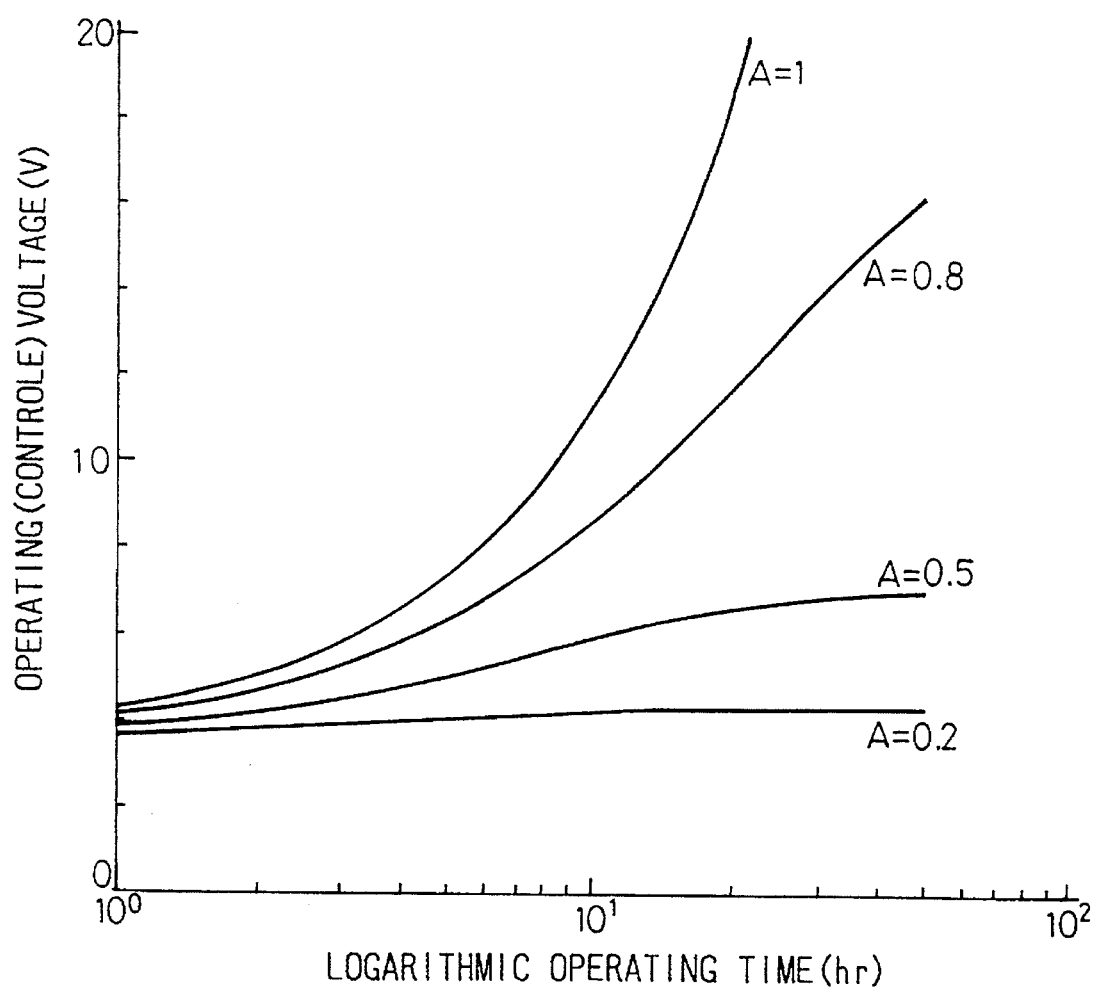
FIG. 15 is a graph showing the same relationship between operating time and operating voltage as in FIG. 14 except that the operating time is indicated in a logarithmic scale.

In FIG. 15, the relationships shown in FIG. 14 are indicated in a logarithmic scale of the operating time. In view of FIGS. 14 and 15, when A<1, the control voltage does not diverge. To allow the optical device to be operated in a range of relatively low control voltage including the initial bias voltage, especially under 10 V or less, it is preferable that $A \leq 0.5$.

Figure 16:
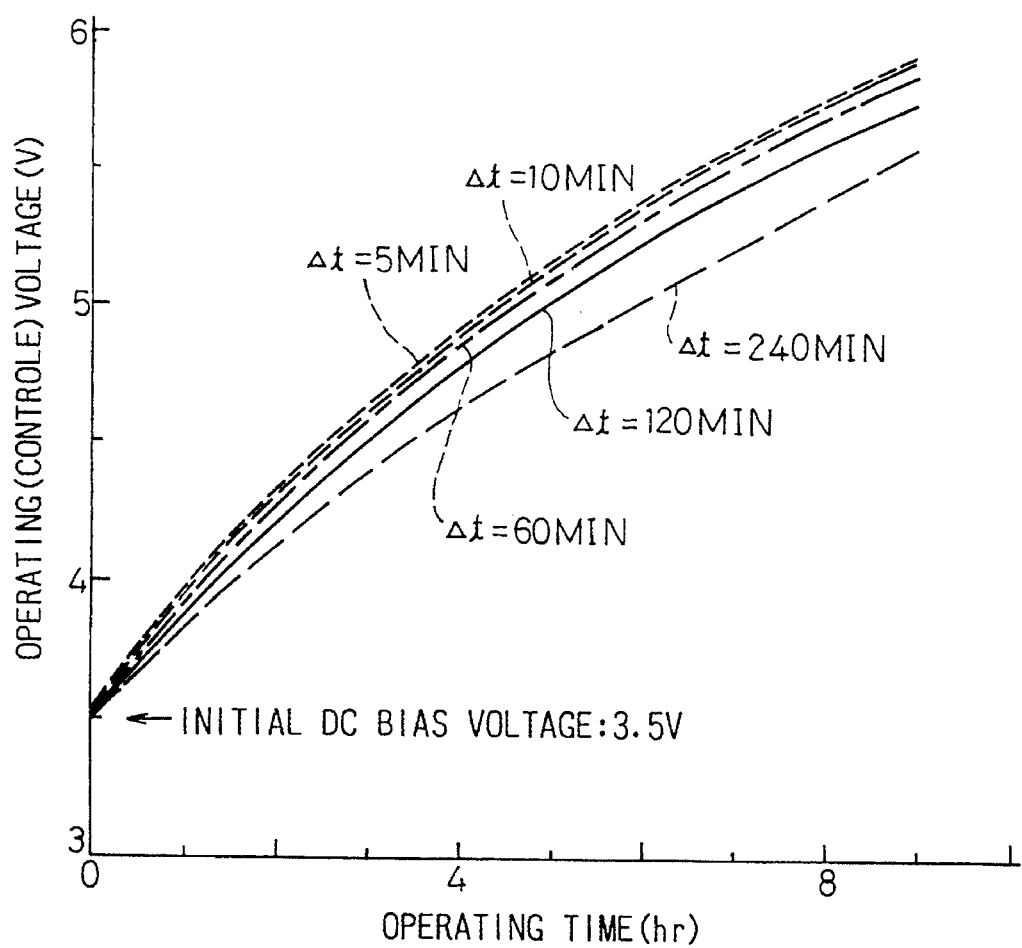
FIG. 16 is a graph showing a relationship between operating time and operating voltage, calculated by changing Δt value in the range of from 5 to 240 minutes under conditions of an initial bias voltage of 3.5 V, a relaxation time of 4 hours, and A=0.5.

FIG. 16 shows a plurality of relations between operating time and operating (control) voltage when an optical waveguide device is operated under an initial DC bias voltage of 3.5 V, at a relaxation time of 4 hours, at A=0.5, when the $\Delta t$ value is changed in the range of from 5 to 240 minutes. FIG. 16 shows that the drift voltage value at least initial stage reduces with an increase in the value of $\Delta t$. Accordingly, when the absolute value of the control voltage drift is estimated in accordance with equation (3), the value of $\Delta t$ is preferably set as small as possible. Otherwise, the equation (3) may be integrated provided that $\Delta t \to 0$, to convert to a general equation or an approximation.

In an example, the correspondence between the practical measurement results and the equation (3) was checked. The optical waveguide devices used in the preparation of FIG. 10 exhibited a diverging DC voltage drift because A is about 1. Therefore, an optical waveguide device having a value of A less than (A<1), by forming the dielectric $SiO_2$ layer by a vacuum vapor deposition method in place of the sputtering method. The dielectric $SiO_2$ layer had a refractive index of about 1.44 at a wavelength of 0.633 μm.

Figure 17:
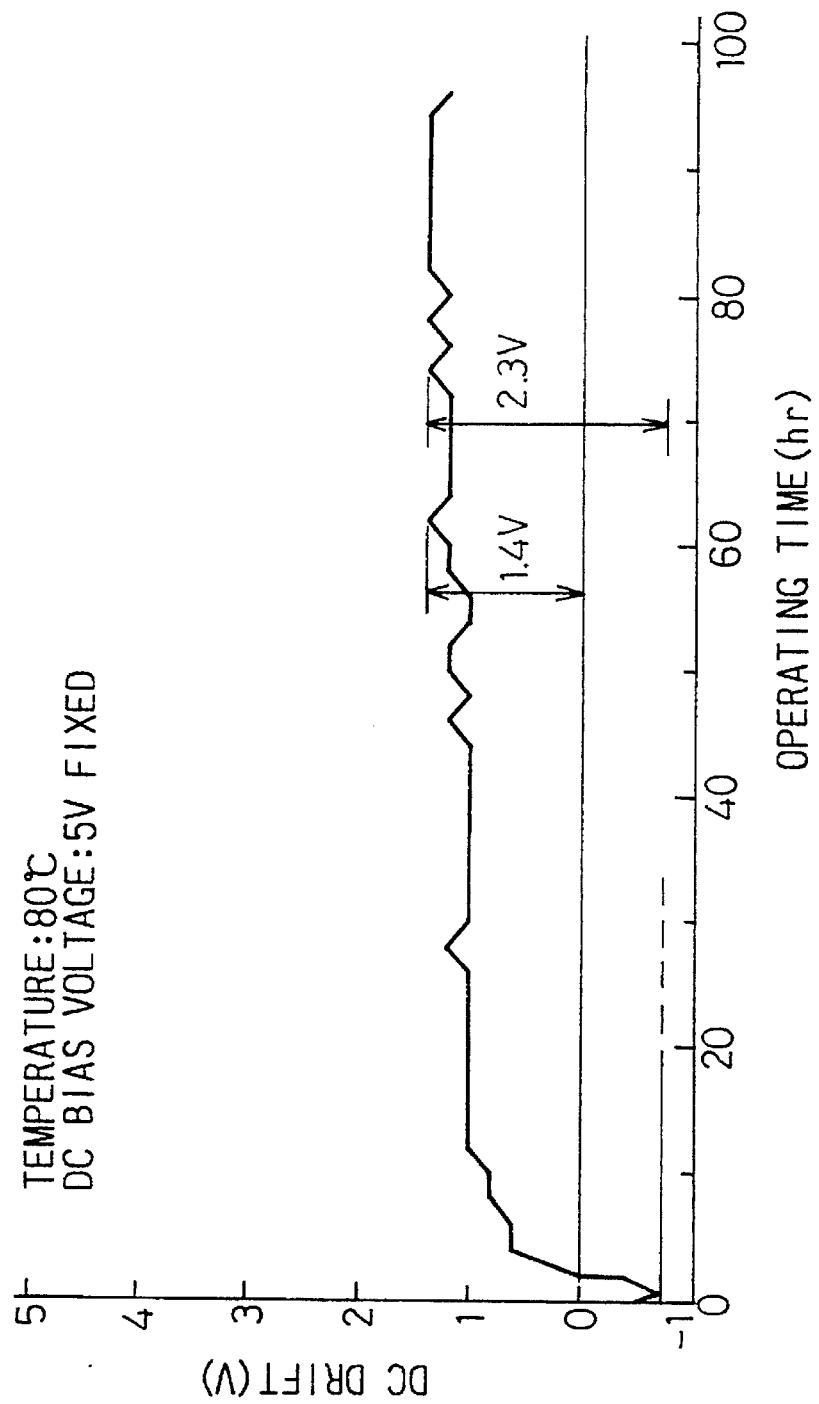
FIG. 17 is a graph showing a relationship between operating time and DC drift of the device of the present invention measured at an atmosphere temperature of 80° C. at a bias voltage of 5 V in a fixed bias voltage system.

The DC voltage drift of this optical waveguide device was measured in a fixed DC bias voltage application system under a bias voltage of 5 V at an ambient temperature of 80° C. FIG. 17 shows the measurement result. Referring to FIG. 17, the DC drift appeared in a negative (minus) direction in an initial stage, and then in a position (plus) direction. The reasons for the drift in the negative direction in the initial stage are not clear. However, in almost all of the measurement period, the drift was produced in the positive direction, possibly due to the polarization phenomenon. The correspondence of the measurement results and equation (3) was checked. Since the initial drift is created in the negative direction, the apparent saturated drift value appeared at two levels of 1.4 V (A=0.28) and 2.3 V (A=0.46).

Figure 18:
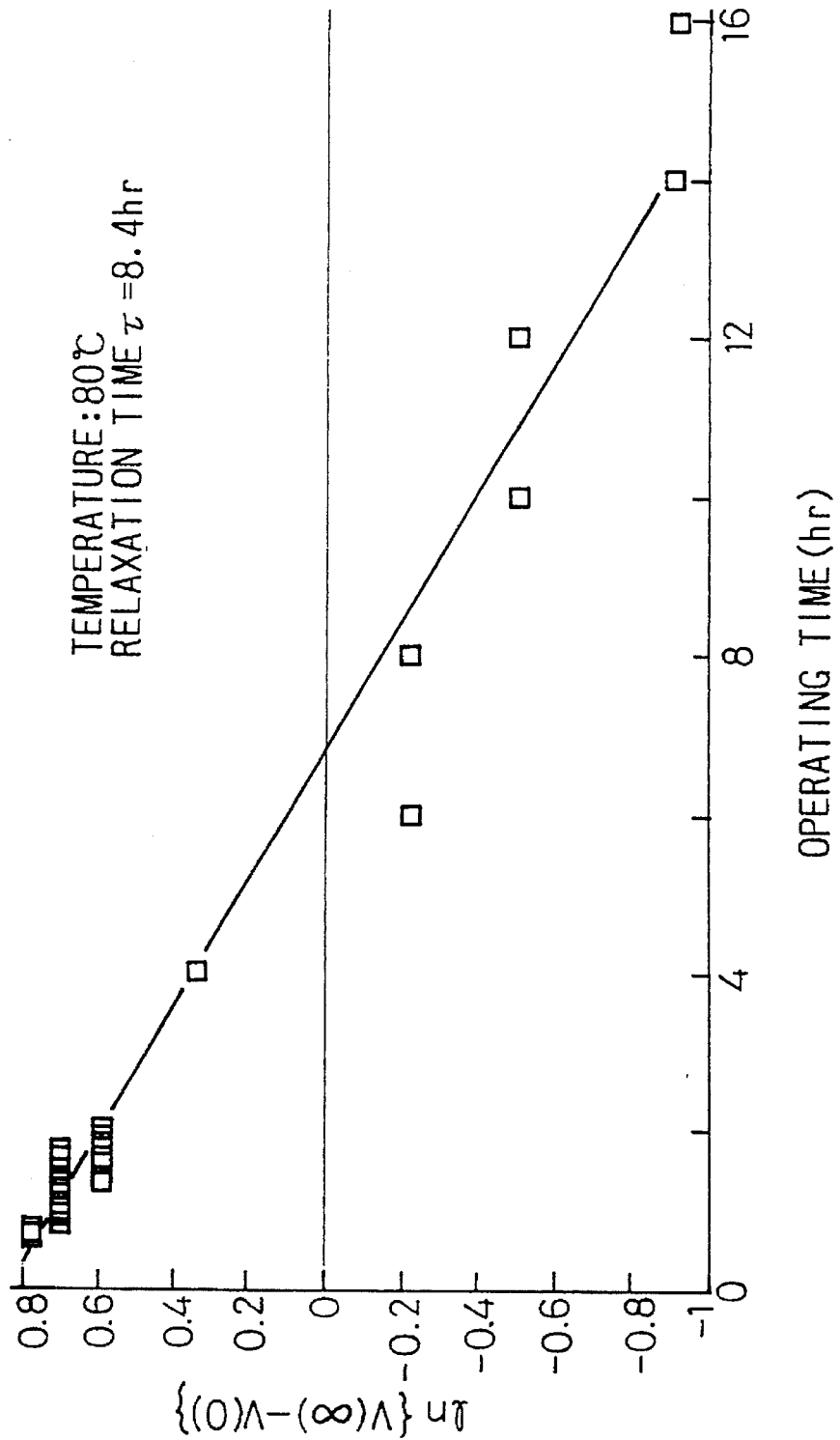
FIG. 18 is a graph showing a relationship between operating time and ln{V(∞)−V(0)} for determining the relaxation time for DC drift data of FIG. 17.

The drift relaxation time of the device was 8.4 hours as shown in FIG. 18. The relaxation time is represented by a reciprocal of the inclination of the operation time-$\ln\{V(\infty)-V(0)\}$ rotation line.

Figure 19:
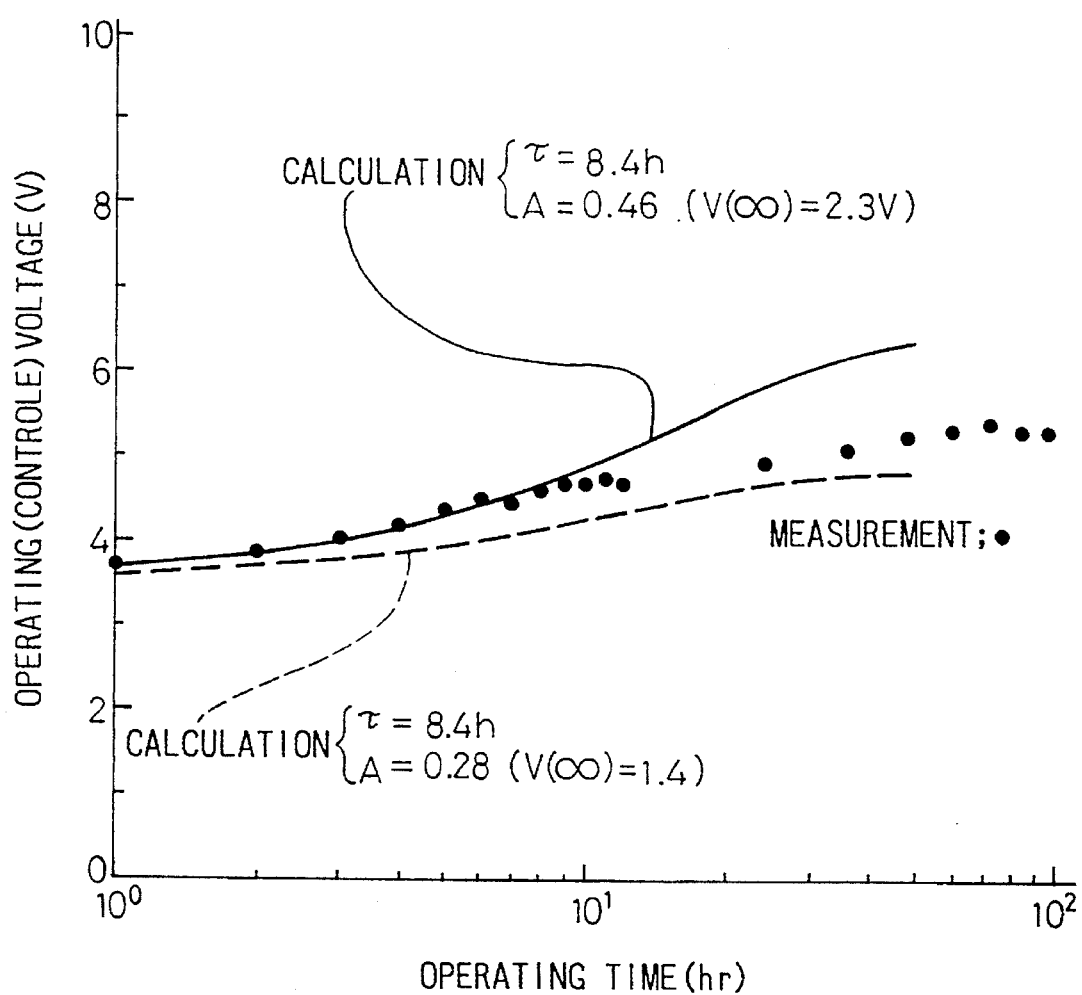
FIG. 19 is a graph showing a relationship between operating time and operating voltage, which relationship shows a correspondence of the control voltage drift measured in such a manner that an optical waveguide device of the present invention is operated under practical conditions by occasionally controlling the bias voltage at time intervals of 5 minutes to compensate a phase change due to the DC drift, and the results calculated in accordance with equation (3)

A correspondence between a DC controlled voltage drift value measured in a system in which the bias voltage was optionally controlled at time intervals of 5 minutes to compensate the change of the operating point due to the DC drift, this system being close to the practical operating system, and the calculation results from equation (3) were checked. The results are shown in FIG. 19. In FIG. 19, the solid line indicates a calculation result where relaxation time=8.4 hours, and A=0.46, and the broken line indicates another calculation result where relaxation time=8.4 hours and A=0.28, and in each case $\Delta t=1$ hour. The initial bias voltage was set to 3.5 V in each of the practical measurement and the calculations. The calculation results indicated by the broken line are similar to a relatively high degree to the measurement results, even in consideration of the fact that the equation (3) is a primary approximation formed under some assumptions.

In the case where the A value can be set forth in two different ways, some provisional measurements are preferably carried out, to determine a threshold value for the selection of the optical waveguide devices under conditions in which an upper limit of the control voltage is set.

In an embodiment of the optical waveguide device of the present invention, the optical waveguide has two branch portions thereof converged into an input portion and into an output portion thereof and extending in parallel to each other, the electrode system comprises a hot electrode and a pair of ground electrodes arranged on the both sides of the hot electrode and spaced from the hot electrode, one of the branch portions of the optical waveguide faces the hot electrode through the dielectric layer, the other branch portion of the optical waveguide faces one of the ground electrodes through the dielectric layer, and the branch portion of the optical waveguide facing the hot electrode has a width larger than that of the other branch portion of the optical waveguide facing one of the ground electrodes.

The optical waveguides are formed on a front surface portion of a substrate made from a lithium niobate having an electro-optical effect.

Preferably, the substrate is formed from a Z cut lithium niobate crystal, the optical waveguide is an asymmetric Mach Zehnder type optical waveguide produced by diffusing titanium into a front surface portion of the substrate, in a desired form and dimensions.

The above-mentioned embodiment of the optical waveguide device, for example, an asymmetric Mach Zehnder type waveguide modulater, is advantageous in that an operating (control) voltage drift of the device is low even if the operating temperature changes, and thus the device has a high reliability.

In a preferred example, the branch portion of the optical waveguide facing the hot electrode has a width of about 7 μm, and the other branch portion of the optical waveguide facing one of the ground electrodes has a width of about 6 μm. Namely, the width difference between the branch portions of the optical waveguide is about 1 μm. Usually, to prevent the optical waveguide from exhibiting a multimode performance, the branch portions of the the waveguide need to have a width of about 7 μm. Accordingly, the widths of the pair of the branch portions of the optical waveguide are preferably in a combination of 7 μm with 6 μm or 7.5 μm with 6.5 μm.

In the conventional optical waveguide device, for example, a Mach Zehnder type optical wave modulator, the branch portions of the optical waveguide are arranged symmetrically with respect to a center line between the branch portions, and the electrodes of the electrode system are arranged asymmetrically with respect to the optical waveguide. Accordingly, an interaction between the electric field generated due to a pyroelectric effect evenly dispersed on the modulator surface due to a semiconductive (substrate) layer over the dielectric layer of the device, and the optical waveguide is different in practical effect between the branch portions of the optical waveguide.

Figure 20:
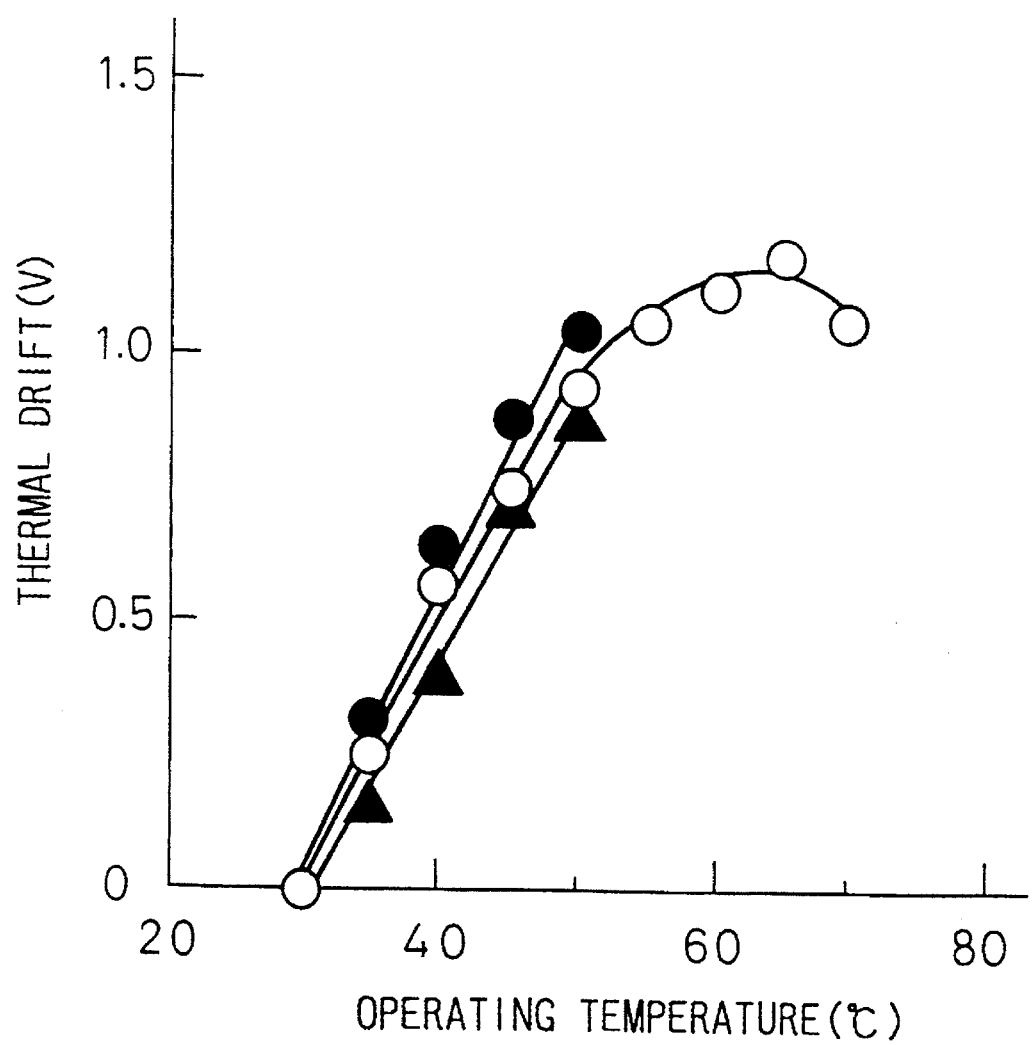
FIG. 20 is a graph showing a relationship between operating temperature and thermal drift, of a conventional optical waveguide modulator.

Due to the above-mentioned difference in the interaction between the electric field and the optical waveguide the drift of the DC operating (control)-voltage applied to the electrodes to control the operating point of the device, increases with an increase in the operating temperature, as shown in FIG. 20.

Such thermal drift of the optical waveguide device, which is variable depending on the operating temperature, is derived from the following phenomena:

(1) a large pyroelectric effect of the Z-cut $LiNbO_3$ crystal in the substrate, (2) a change in the refractive index of the optical waveguide due to a thermal stress generated in the device, and (3) a change in the half wavelength voltage of the device due to the change in the operating temperature.

Under usual operating conditions, the influence of the phenomena (2) and (3) is small enough to be negligible. To prevent the phenomenon (1), it has been attempted to coat the surface of the optical waveguide device with a thin semiconductor layer to shield electrons generated due to a pyroelectric effect of the semiconductor layer and to prevent a local generation of an unstable electric field in locations around the electrodes. This attempt can effectively reduce the thermal drift of the Z cut $LiNbO_3$ modulator due to the operating temperature changes. Also, the drift can be further reduced by arranging the electrodes symmetrically with respect to the center line between the branch portions of the optical waveguide. However, in the usual optical waveguide device, for example a high speed modulator, a plurality of electrodes are arranged asymmetrically. In the asymmetric electrode system, even if the device surface is coated with the semiconductor layer, the operating voltage of the resultant device increases with an increase in of the operating temperature, as indicated in FIG. 20.

It was found by the inventors of the present invention for the first time that the thermal drift depending on the operating temperature changes can be prevented or reduced by setting the width of the branch portion of the optical waveguide facing the hot electrode larger than that of the other branch portion of the optical waveguide facing one of the ground electrodes.

Figure 21:
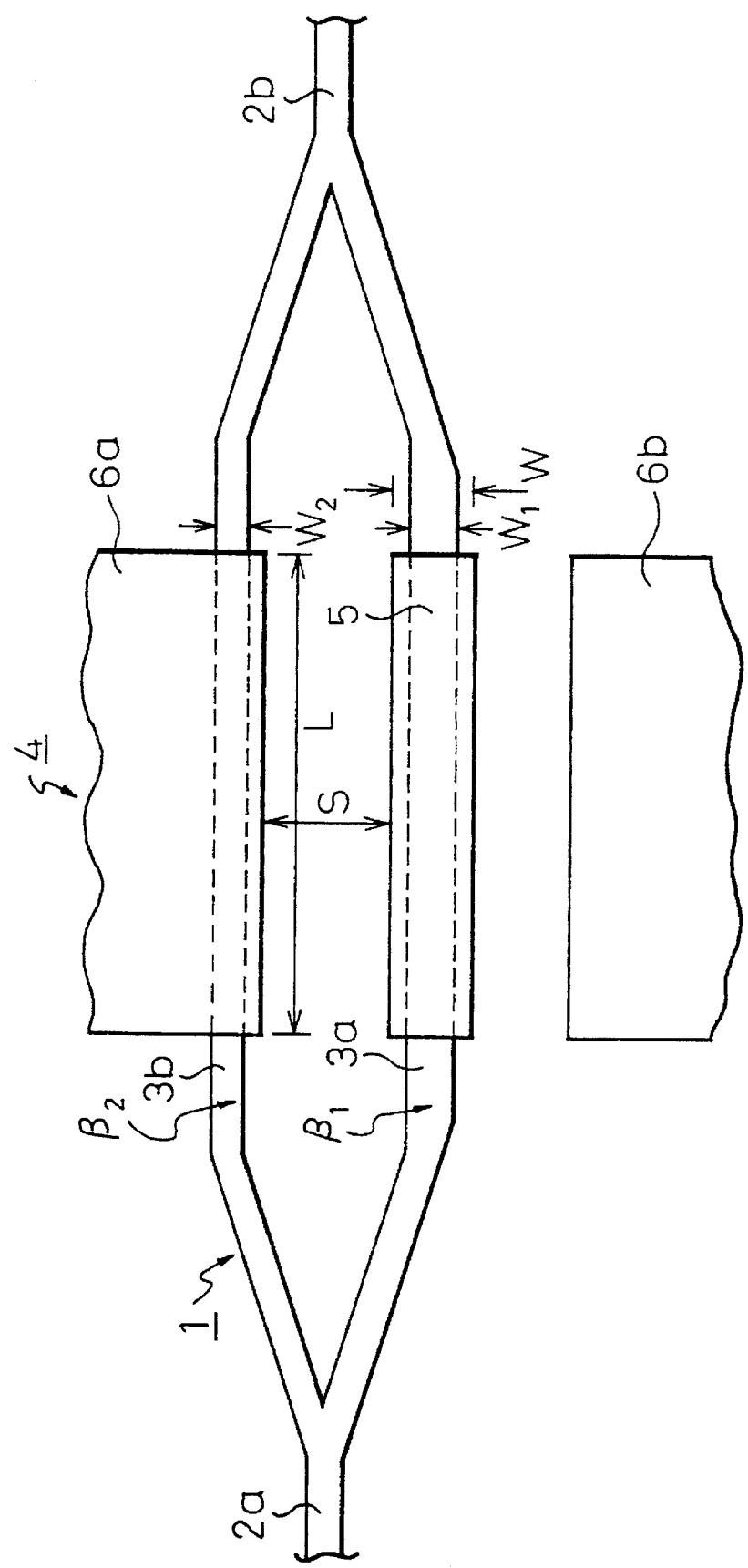
FIG. 21 shows an explanatory plan view of an arrangement of an optical waveguide and an electrode system of a preferable embodiment of the optical waveguide modulators of the present invention.

In the optical waveguide device of the present invention as shown in FIG. 21, an optical waveguide 1 is composed of an input portion 2a, an output portion 2b and a pair of branch portions 3a and 3b converged to the input and output portions 2a and 2b. The branch portions 3a and 3b are, in the middle portions thereof, in parallel to each other. Also, the electrode system 4 is composed of a hot electrode 5 and a pair of ground electrodes 6a and 6b. The branch portion 3a of the optical waveguide 1 extends under the hot electrode 5, and the other branch portion 3b of the optical waveguide 1 extends under a ground electrode 6a. The other ground electrode 6b are arranged on the opposite side of the hot electrode 5 with respect to the ground electrode 6a, as indicated in FIG. 21.

In FIG. 21, the width $W_1$ of the branch portion 3a of the optical waveguide 1 is larger than the width $W_2$ of the other branch portion 3b.

Figure 22:
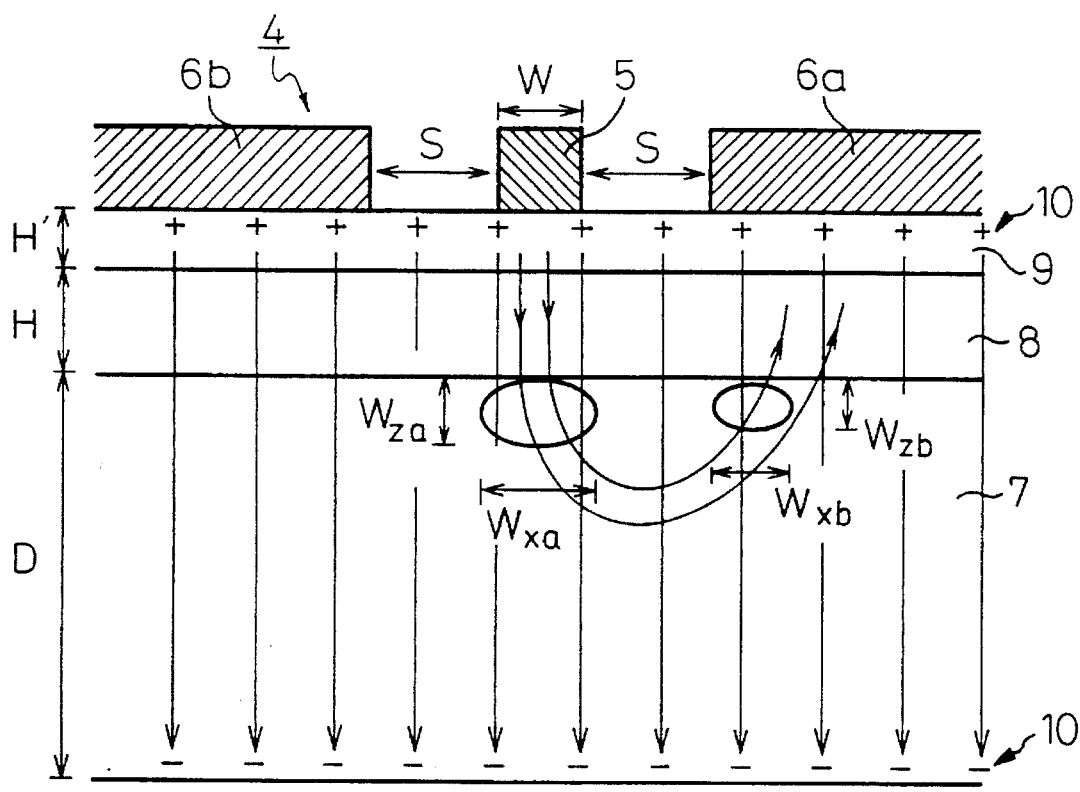
FIG. 22 shows an explanatory front cross-sectional profile of a preferable embodiment of the optical waveguide modulator of the present invention.

Referring to FIG. 22, on a substrate 7 consisting essentially of, for example, $LiNbO_3$ single crystal, a dielectric layer 8 is formed from, for example, $SiO_2$, and a semiconductor layer 9 is formed from, for example, Si, on the dielectric layer 8, and an electrode system 4 composed of a hot electrode 5 and a pair of ground electrodes 6a and 6b is arranged on the semiconductor layer 9. The electrodes 5, 6a and 6b have a thickness of, for example, about 10 μm and are made from gold (Au).

In the surface portion of the optical waveguide device, for example, a–Z surface of a $LiNbO_3$ substrate, an increase in temperature causes a pyroelectric effect to be generated and thus a positive electric charge is generated on the device surface. When a thin semiconductor layer is arranged under the electrode system, the positive electric charge is substantially evenly dispersed due to the effect of the semiconductor layer. However, since the materials constituting the device are dielectric, the positive electric charge is maintained on the surface without disappearing instantaneously. Accordingly, the amount of the positive electric charge accumulated on the device surface increases with an increase in the operating temperature of the device.

When the positive electric charge is accumulated, an electric field due to a pyroelectric effect is generated in addition to the electric field applied between the hot electrode 5 and the ground electrodes 6a and 6b, as shown in FIG. 22. Accordingly, in an asymmetric Mach Zehnder type optical waveguide, phase changes $\phi_1$ and $\phi_2$ of the optical waves being transmitted through the branch portions 3a and 3b of the optical waveguide 1 as shown in FIG. 21, are represented by the equations (6) and (7), respectively.

$$\phi_1 = (\beta_1 + k_0 \Delta n_1) L \quad (6)$$

$$\phi_2 = (\beta_2 + k_0 \Delta n_2) L \quad (7)$$

wherein $\beta_1$ and $\beta_2$ respectively represent an optical transmission constant of the branch portion 3a of the optical waveguide 1 facing the hot electrode 5 and the other branch portion 3b of the optical waveguide 1 facing the ground electrode 6a, L represents a length of the electrodes 5, 6a and 6b, and $\Delta n_1$ and $\Delta n_2$ are respectively defined by the equations (8) and (9):

$$\Delta n_1 = \Delta n_h + \Delta n_p(T) \quad (8)$$

$$\Delta n_2 = \Delta n_g - \Delta n_p(T) \quad (9)$$

wherein $\Delta n_h$ and $\Delta n_g$ respectively represent a change amount in refractive index of the optical waveguide branch portions 3a and 3b located below the hot electrode 5 and the ground electrode 6a, derived from the electric field applied to the electrodes, $\Delta n_p(T)$ represents a change amount in refractive index of the optical waveguide branch portions 3a and 3b, due to the electric field generated by the pyroelectric effect at the operating temperature T. The directions of the electric fields generated below the hot electrode 5 and the ground electrode 6a are the same as each other. However, since the electric field direction on the ground electrode 6a side is opposite to the direction of the electric field generated due to the operating (control) voltage application, as shown in FIG. 22, the $\Delta n_p(T)$ in the equation (9) has a minus sign.

In a Mach Zehnder type optical waveguide, an electric field (E) of the optical waves output from the waveguide is represented by the equation (10):

$$E = E_0 \cos\{(\beta_1 - \beta_2)L/2 + k_0(L/2)[\Delta n_h - \Delta n_g + 2\Delta n_p(T)]\} \times \exp\{-j[\beta_1 + \beta_2)L/2 + k_0(L/2)(\Delta n_h + \Delta n_g]\} \quad (10)$$

wherein $E_0$ represents an electric field of the optical waves input into the waveguide and L represents the length of the electrodes.

Therefore, the power P of the output optical waves is represented by equation (11).

$$P = r^2(T) \exp[-2js(T)] \quad (11)$$

wherein r(T) and s(T) are respectively defined by equations (12) and (13):

$$r(T) = E_0 \cos\{(\beta_1 - \beta_2)L/2 + k_0(L/2)[\Delta n_h - \Delta n_g + \Delta n_p(T)]\} \quad (12)$$

$$s(T) = [(\beta_1 + \beta_2)L/2 + k_0(L/2)(\Delta n_h + \Delta n_g) \quad (13)$$

The refractive index change $\Delta n_h$ and $\Delta n_g$ of the branch portions 3a and 3b of the optical waveguide 1 located below the hot electrode 5 and the ground electrode 6a due to the electro-optical effect thereof are variable depending on the operating temperature. However, this refractive index change is significantly small in comparison with that due to the pyroelectric effect. Therefore, the phase of the output optical waves represented by equation (13) is substantially not influenced by the operating temperature. However, in view of equation (12), it is clear that the intensity of the output optical waves varies periodically depending on the operating temperature in a cosine manner. Also, it is understood from equation (12), that by controlling the transmission constants $\beta_1$ and $\beta_2$, and the refractive indexes $\Delta n_1$ and $\Delta n_2$ of the optical waveguide branched portions 3a and 3b, the change in r(T) value can be made larger or smaller with respect to a change in the operating temperature (T) and therefore, with respect to a change in the refractive index $\Delta n_p(T)$.

In other words, by shifting the initial operating point to about a minimum point or maximum point of a cosine curve drawn as a function of the operating temperature T, the thermal drift depending on the operating temperature can be made small.

As mentioned above, in the embodiment, the optical waveguide branched portion 3a has a width $W_1$ larger than a width $W_2$ of the other branch portion 3b. Also, preferably $W_1 \approx 7$ µm and $W_2 \approx 6$ µm.

The larger the waveguide width, the higher the optical confinement effect of the optical waves being transmitted through the waveguide, as indicated in Table 1 below.

Therefore, the thermal drift can be reduced by adjusting the content of titanium in the optical waveguide branch portion 3a facing the hot electrode 5 to a level higher than that in the other branch portion 3b facing the ground electrode 6a.

In an example, an optical waveguide having a branch portion facing a hot electrode and having a width of 7 µm and another branch portion facing one of a pair of ground electrodes and having a width of 6 µm, was produced by thermally diffusing titanium into a front surface portion of a Z cut LiNbO$_3$ substrate at a temperature of 980° C. in an oxygen atmosphere. The front surface of the substrate including the optical waveguide surface was coated with a dielectric SiO$_2$ layer by a vacuum evaporation method and heat-treated at a temperature in an oxygen atmosphere.

An optical waveguide device A was obtained.

Another optical waveguide device B (comparative) was prepared by the same procedures as mentioned above, except that the optical waveguide branched portion facing the hot electrode had a width of 6 µm and the other branched portion facing the ground electrode had a width of 7 µm.

The particulars of the optical waveguide devices A and B were as shown in Table 1.

TABLE 1

| Parameter | Unit | Optical waveguide device A | Optical waveguide device B |
|---|---|---|---|
| Hot electrode width (W) | µm | 7 | 7 |
| Distance (S) between hot and ground electrodes | µm | 15 | 15 |
| Length (L) of hot and ground electrodes | mm | 40 | 40 |
| Thickness (D) of substrate | mm | 0.5 | 0.5 |
| Thickness (H) of dielectric layer | µm | 1 | 1 |
| Thickness (H') of semiconductor layer | µm | 0.1 | 0.1 |
| Diameter (Wxa, Wza) of optical field under hot electrode | µm | 10.78, 8.19 | 11.32, 9.0 |
| Diameter (Wxb, Wzb) of optical field under ground electrode | µm | 11.32, 9.0 | 10.78, 8.19 |

The devices A and B were subjected to a measurement of the AC voltage drift in which change in peak point of the output optical wave intensity was measured at an optical wavelength of 1.55 µm under a AC voltage of 1 kHz, Vp-p=20 V, and at various operating temperatures.

Figure 23:
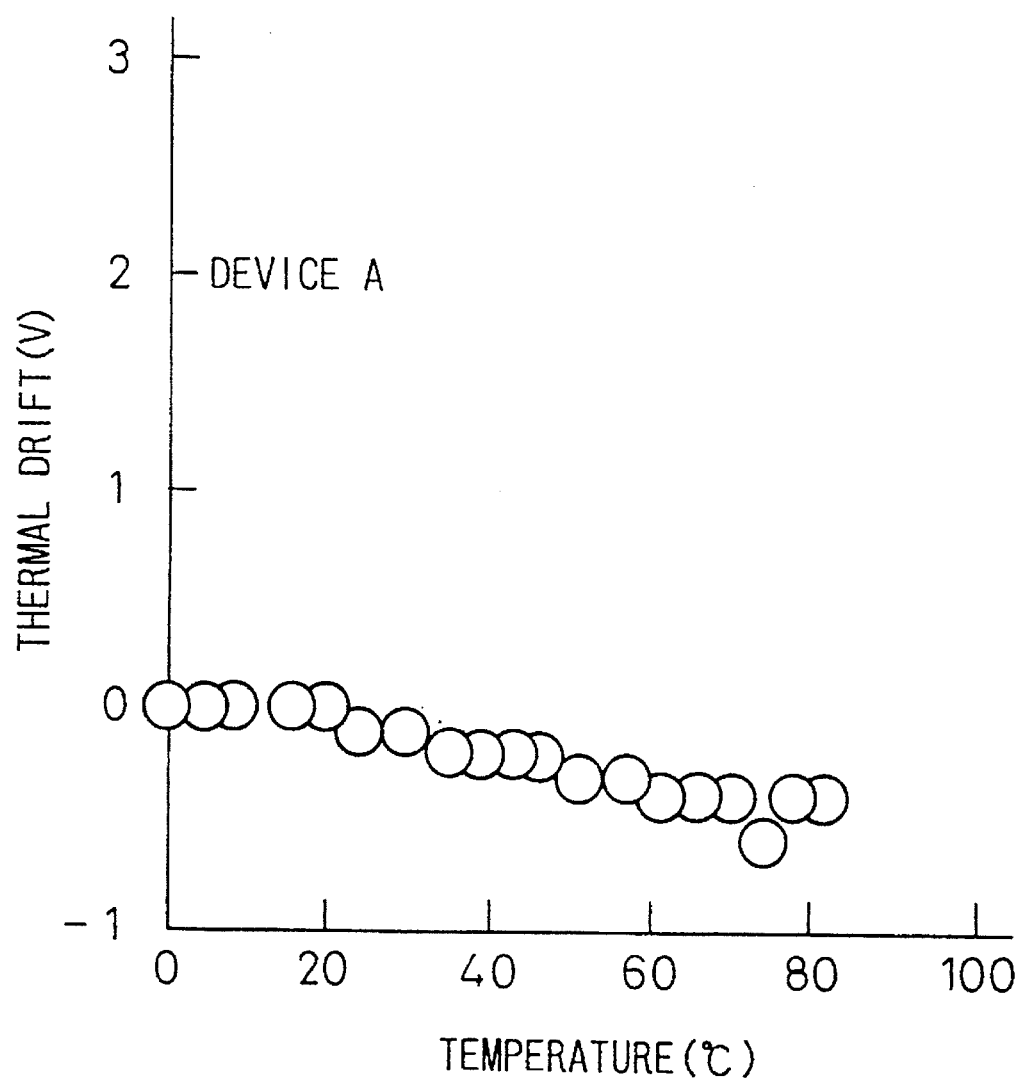
FIG. 23 is a graph showing a relationship between operating temperature and thermal drift, of a preferable embodiment of the optical waveguide modulators of the present invention.
Figure 24:
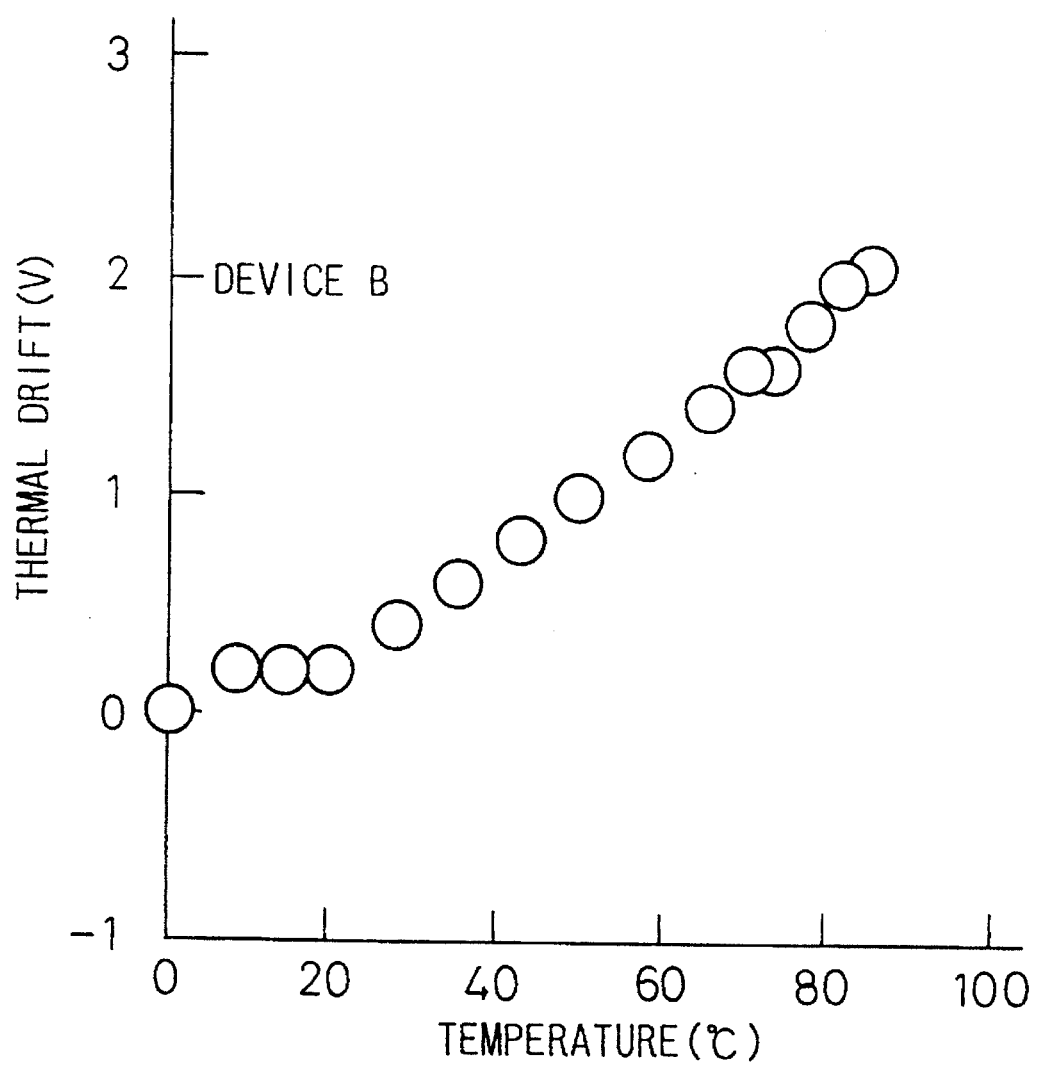
FIG. 24 is a graph showing a relationship between operating temperature and thermal drift, of comparative optical waveguide modulator.

FIG. 23 shows the measurement result of the device A and FIG. 24 shows the measurement result of the device B. In a comparison of FIG. 23 to FIG. 24, it is clear that the change of the voltage drift of the device A with an increase in the operating temperature is smaller than that of the device B.

This phenomenon can be explained as follows.

Figure 25:
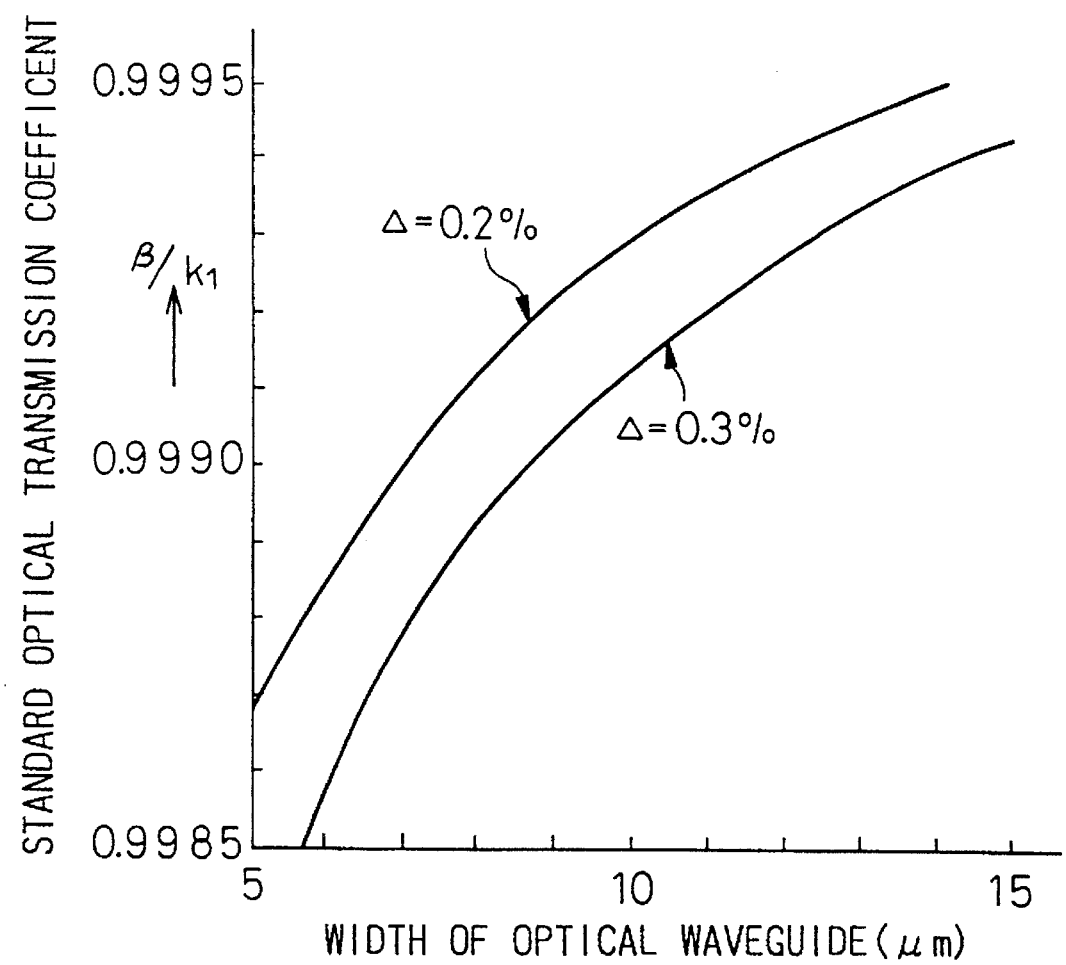
FIG. 25 is a graph showing a relationship between the width of an optical waveguide and a standard optical wave transmission coefficient.

In equation (12), the difference in the optical transmission constant $(\beta_1 - \beta_2)$ between the branched portion facing the hot electrode and the other branched portion facing the ground electrode of the device A is positive (plus), whereas that of the device B is negative (minus). The difference $(\beta_1 - \beta_2)$ in optical transmission constant between the branched portion having a width of 7 µm and the other branched portion having a width of 6 µm is in the order of $10^{-4}$ µm$^{-1}$, as shown in FIG. 25, and thus is from $|\beta_1 - \beta_2|L/2$ to 1.0.

In equation (12), the term "$k_o(L/2)(\Delta n_h - \Delta n_g)$" is always positive (plus) in either of the devices A and B.

In view of the parameters shown in Table 1, the applied electric field overlap integral $\Gamma h - \Gamma g$ is $5.71 \times 10^4$ m$^{-1}$ for the device A and $5.48 \times 10^4$ m$^{-1}$ for the device B. Namely, in equation (12), the difference in this item between the devices (A) and (B) is very small. The result of equation (12) for the device (A) is similar to that for the device (B).

Due to the differences in the above-mentioned items, especially, whether the deference $(\beta_1 - \beta_2)$ is positive or negative, in the device A, the initial operating point (in FIG. 22, a point at a temperature of 0° C.) is controlled within an initial downward sloping region from a maximum point of the cosine curve (equation (12)), in which the operating temperature is a variable parameter. Compared with this, in the device B, as shown in FIG. 24, the initial operating point is controlled within an initial upward sloping region having a positive high inclination. Accordingly, the voltage drift of the device A due to raising of the operation temperature is smaller than that of the device B.

In another embodiment of the optical waveguide device of the present invention, the optical waveguide has two branch portions thereof converged into an input portion and into an output portion thereof and extending in parallel to each other, the electrode system comprises a hot electrode facing one of the branch portions of the optical waveguide through the dielectric layer and a pair of ground electrodes one of which faces the other branch portion of the optical waveguide through the dielectric layer, and regions of the dielectric layer surface located between the electrodes adjacent to each other are coated with electroconductive layers in such a manner that at least one portion of each of the dielectric layer surface regions is not coated with the electroconductive layer, and the non-coated portion of each dielectric layer surface region extends along the extending direction of the branch portions of the optical waveguide and expose to the outside of the device, whereby an electrical connection between the electrodes adjacent to each other through the electroconductive layer is at least partially interrupted.

It is known in the conventional devices that as shown in FIG. 26-(a), in a front surface portion of a substrate 11 made from a lithium niobate single crystal, an optical waveguide having a pair of branch portions 12a and 12b are formed, and a dielectric layer 13 is formed on the substrate 11 and the waveguide 12a, 12b in the manner mentioned above. The dielectric layer is made from silicon dioxide. Further, on the dielectric layer 13, an electroconductive (or semiconductive) layer 14 is formed from, for example, silicon (Si).

The optical waveguide branched portion 12a faces a hot (signal) electrode 15a via the dielectric layer 13 and the electroconductive layer 14, the other optical waveguide branch portion 12b faces a ground electrode 15b via the dielectric layer 13 and the electroconductive layer 14, and another electrode 15c is arranged on the electroconductive layer 14, on the opposite side of the hot electrode 15a to the ground electrode 15b and apart from the hot electrode 15a. Those electrodes are generally formed from gold.

Between each of the electrodes 15a, 15b and 15c and the electroconductive layer 14, a thin intermediate layer comprising titanium may be inserted to reinforce the bonding strength between the electrodes and the electroconductive layer.

Generally, the electroconductive silicon layer can be easily formed by conventional sputtering and CVD methods, and exhibits a high adhesive strength to the dielectric silicon dioxide layer and a high chemical stability.

Another conventional optical waveguide device shown in FIG. 26-(b) has a similar constitution to that in FIG. 26-(a), except that, the electrodes 15a, 15b, and 15c are formed directly on the dielectric layer 13, and the surface portions of the dielectric layer 13 located between the electrodes 15a, 15b and 15c are coated by the electroconductive layers 14a and 14b.

In the optical waveguide devices of FIGS. 26-(a) and 26-(b), the electroconductive layers 14, 14a and 14b effectively and evenly disperse the electric charge generated due to the pyroelectric effect of the substrate 11, to prevent the generation of local electric fields and thus to prevent the operating voltage drift of the device due to the temperature changes.

Figure 27:
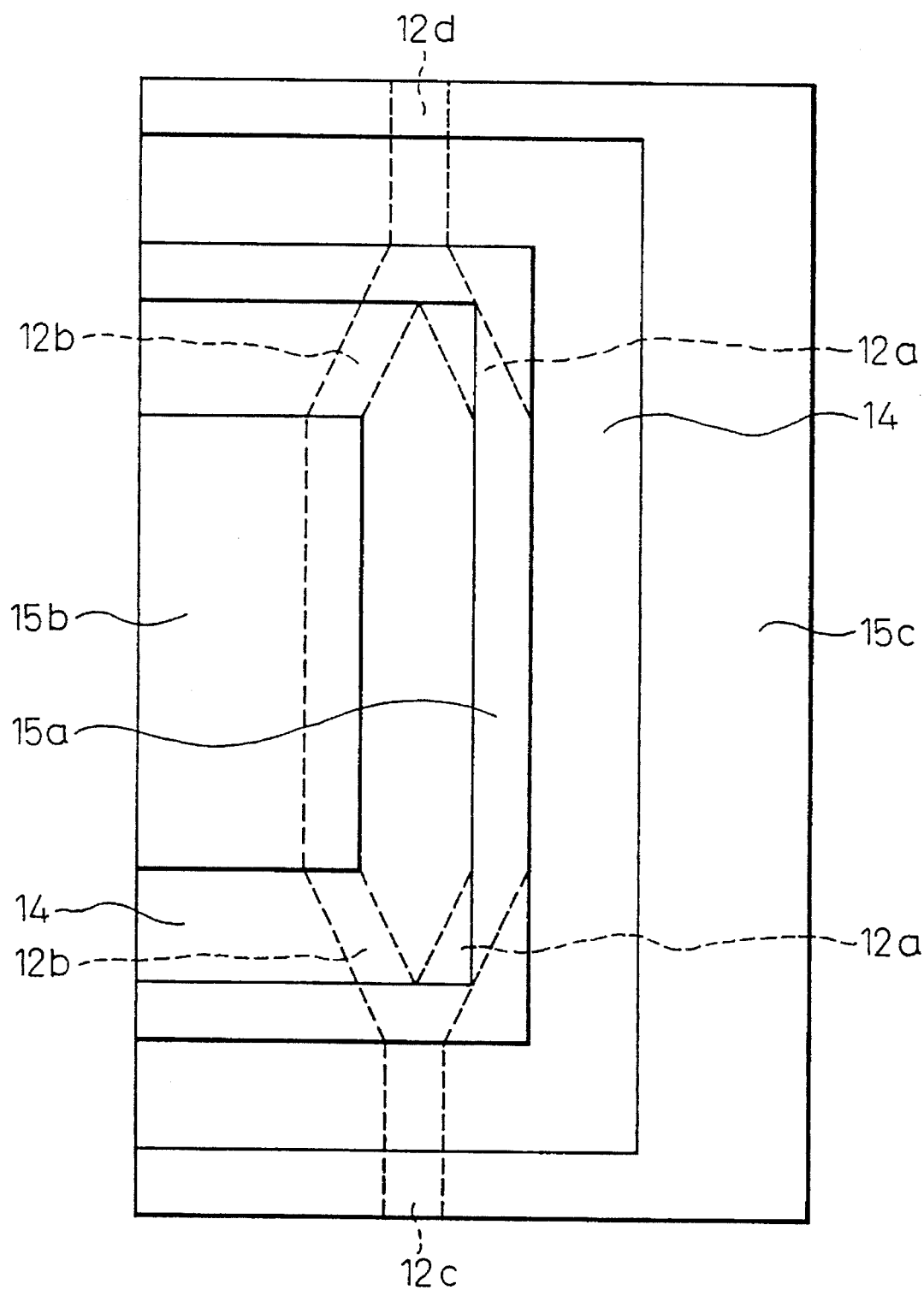
FIG. 27 shows an explanatory plan view of the optical waveguide devices of FIG. 26-(a) or 26-(b)

FIG. 27 shows a plan view of the devices of FIGS. 26-(a) and 26-(b). In FIG. 27, the electrodes 15a, 15b, and 15c are connected to a signal inputting means (not indicated in FIG. 27) and the branched portions 12a and 12b of the optical waveguide are converged into an input portion 12c and into an output portion 12d, and the input and output portions 12c and 12d are connected to an optical wave inputting means and outputing means (not shown in FIG. 27), respectively.

The dependency of the thermal drift of the optical waveguide device can be reduced by the arrangement of the electroconductive layer or layers, and the resultant device is practically usable. However, if the device is operated under high temperature and/or high humidity circumstances, sometimes the electroconductive layer reacts with the electrodes to produce a certain reaction product, and the reaction product causes the electrodes adjacent to each other to short circuit with each other. Namely, the reaction product causes the electrical resistance between the adjacent electrodes to be reduced from the order of kΩ or MΩ to the order of hundreds of Ω.

This phenomenon will be further explained with respect to an optical waveguide device having an electroconductive layer consisting of silicon and electrodes consisting of gold.

Figure 28:
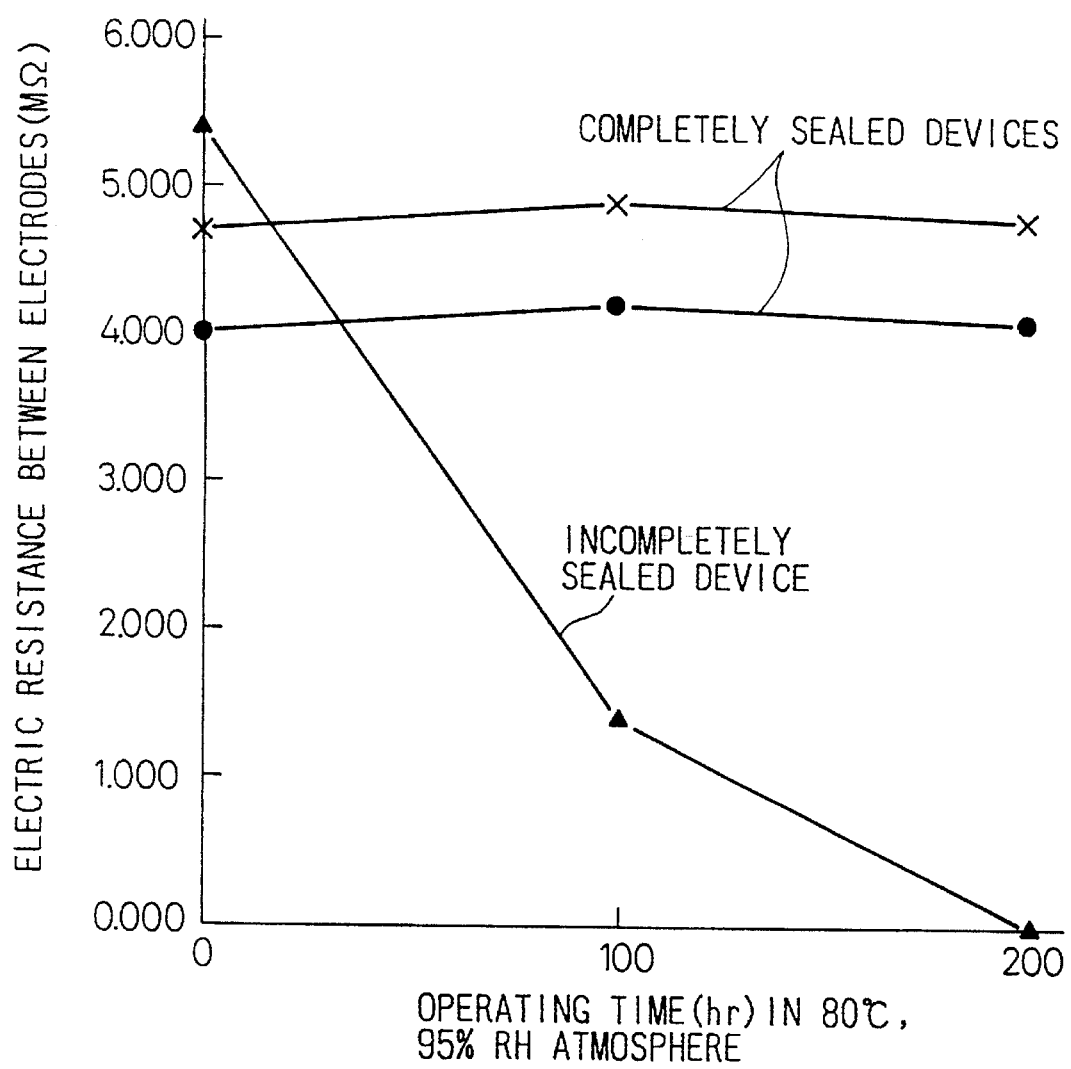
FIG. 28 is a graph showing a relationship between operating time (voltage-applying time) and electric resistance between electrodes adjacent to each other, of completely sealed and incompleted sealed optical waveguide devices under high temperature and high humidity conditions.

When the optical waveguide device having the electroconductive silicon layer and the gold electrodes is operated by applying a DC bias voltage in a high humidity atmosphere, the gold and silicon electrochemically react with each other with the aid of water to produce a reaction product between the adjacent electrodes. FIG. 28 shows a relationship between operating time of two optical waveguide modulators packed and sealed in a case with no leak, at a temperature of 80° C. at a relative humidity (RH) of 95%, and an electrical resistance between a hot electrode and a ground electrode under a continuous DC bias voltage of 5 V. These modulators will be referred to as completely sealed devices. FIG. 28 also shows a relationship between operating time and electrical resistance measured under the same conduction as mentioned above, except that the optical waveguide modulator is packed in the case with a slight leak. This modulator will be referred to as an incompletely sealed device. In the completely (normal) and incompletely (abnormal) selected devices, the electroconductive silicon layer had a thickness of about 100 nm, and the electrodes had a length of 40 mm. The electrical resistance was measured at stages of zero, 100 hours and 200 hours after the start of the operation under humid conditions mentioned above, at a temperature of 25° C., at a relative humidity (RH) of 40%.

FIG. 28 shows that when the optical waveguide device is exposed to a high temperature high humidity atmosphere, the electric resistance between the electrodes is significantly reduces.

Figure 29:
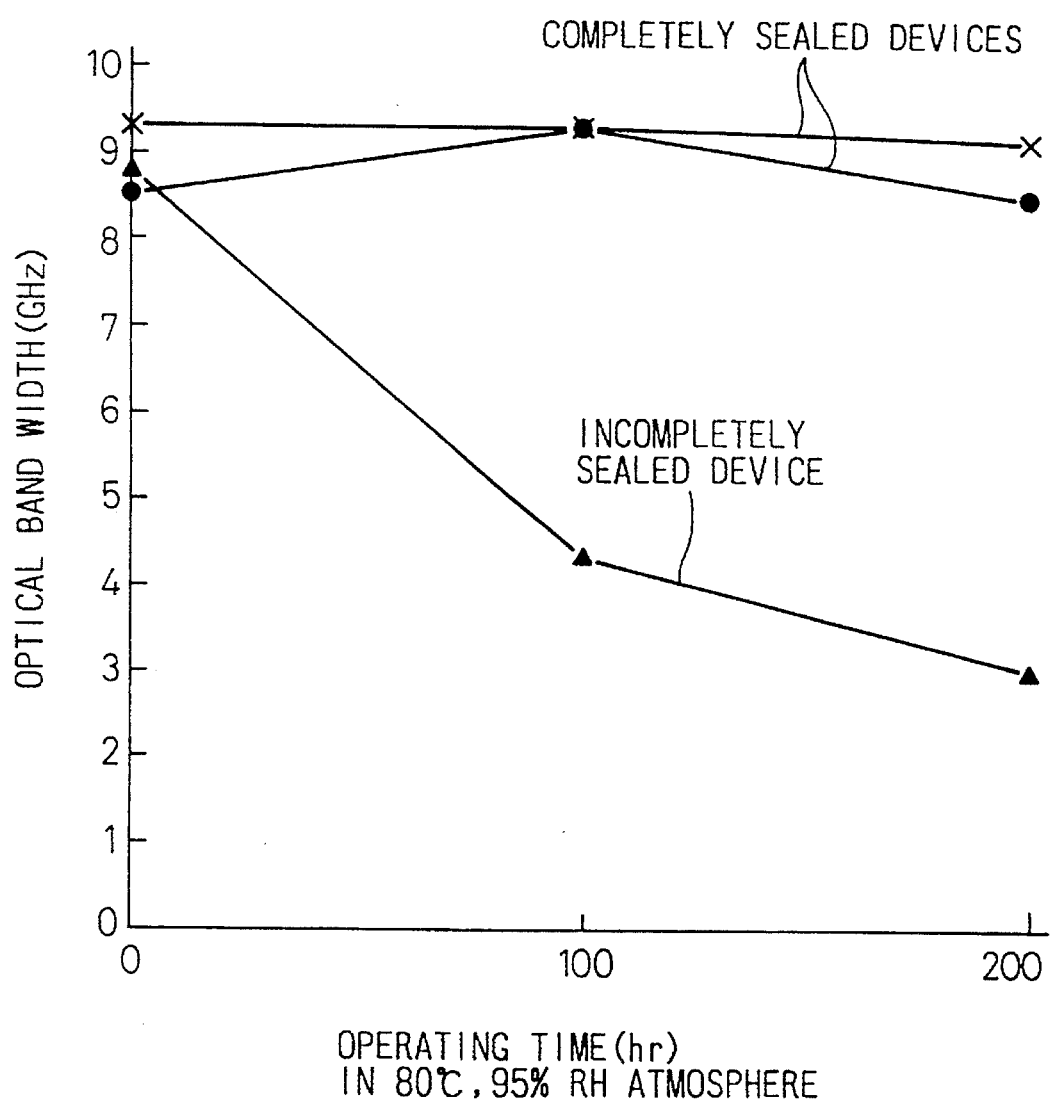
FIG. 29 is a graph showing a relationship between operating time and optical band width, of the same optical waveguide devices as in FIG. 28 under the same conditions as in FIG. 28.

FIG. 29 shows a relationship between the operating time of the completely sealed devices and the incompletely sealed device under the same conditions as mentioned above and optical band-width. FIG. 29 clearly shows that the optical band-width of the incompletely sealed device, which was exposed to a high temperature high humidity atmosphere, significantly reduced with the operating time.

Namely, if an optical waveguide device is incompletely sealed in a case or a leak in the case occurs for some reason, the performance of the device rapidly deteriorates with operating time, and thus the device appears to have a reduced reliability.

With respect to the incompletely sealed device having a reduced electrical resistance between the electrodes, it was found that on a surface of the electroconductive silicon layer formed in a width of few tens of μm between the electrodes, a foreign substance grew in a tree branch form. In the completely sealed device, no growth of a foreign substance was found.

FIG. 30 shows results of an Auger electron spectrometry of the surface of the foreign substance grown between the electrodes and the gold electrode surfaces itself of the incompletely sealed device.

In FIG. 30, on the gold electrode surface, only carbon was found as a surface-contaminating substance, whereas on the foreign substance surface between the electrodes, oxygen and silicon were found, in addition to carbon, as surface-contaminating substances. The deposited foreign substance was amorphous and was difficult to identify. Nevertheless, it is assumed that the deposited foreign substance includes electrochemically produced AuSi, and/or oxides and hydrates thereof. Usually, the optical waveguide device is expected to be employed over a long period of, for example, 20 years or more. Therefore, it is important to completely prevent the production of the foreign substance between the electrodes and the deterioration of the device performance during the employment of the device over a long period.

The short-circuit between the electrodes can be prevented by incompletely coating regions of the dielectric layer surface located between the electrodes adjacent to each other with electroconductive layers in such a manner that at least one portion of each of the dielectric layer surface regions is not coated with the electroconductive layer, and the non-coated portion of each dielectric layer surface region extends along the extended (longitudinal) direction of the branched portions of the optical waveguide and is exposed to the outside of the device, whereby an electrical connection between a pair of the electrodes adjacent to each other through the electroconductive layer is at least partially interrupted.

The electroconductive layers may be formed between each electrode and the dielectric layer. Alternatively, the electrodes may be arranged directly on the dielectric layer, and the electroconductive layers are formed only between the electrodes.

The electroconductive layer preferably comprises silicon and the electrodes comprise gold.

In an example of the above-mentioned device, each dielectric layer surface region has one non-coated portion formed between the electroconductive layer formed on the dielectric layer surface region and one of the electrodes adjacent to the electroconductive layer.

In another example of the above-mentioned device, each dielectric layer surface region has two non-coated portions formed between the electroconductive layer located on each dielectric layer surface region and two electrodes adjacent to the electroconductive layer.

In still another example of the device, at least one non-coated portion is located within each dielectric layer surface region.

In the optical waveguide device shown in FIGS. 31-(a) and 31-(b), on a front surface of a substrate 11 including the surface of an optical waveguide having a pair of branched portion 12a, 12b, a dielectric layer 13 is formed, electrodes 15a, 15b and 15c are formed directly on the dielectric layer 13, and electroconductive layers 14a and 14b are formed on the dielectric layer 13 and between the electrodes.

A hot (signal) electrode 15a faces the branched portion 12a of the optical waveguide, and a ground electrode 15b faces the other branched portion 12b of the optical waveguide. Another ground electrode 15c is arranged on the dielectric layer 13, on an opposite side of the hot electrode 15a from the ground electrode 15b. These electrodes are connected to a signal inputting means (not shown in FIGS. 31-(a) and 31-(b)). By applying a signal voltage between the electrodes, the optical waves being transmitted through the optical waveguide can be modulated. Referring to FIGS. 31-(a) and 31-(b), a non-coated portion 16a is formed between the electroconductive layer 14a connected to the hot electrode 15a and the ground electrode 15b. Also, another non-coated portion 16b is formed between the electroconductive layer 14b connected to the ground electrode 15c and the hot electrode 15a. The non-coated portions 16a, 16b of the dielectric layer 13 are exposed to the outside of the device. Accordingly, even if the electrodes and the electroconductive layers are brought into contact with moisture at a high temperature and an electrochemical reaction product is grown, between the electrodes and on the electroconductive layer adjacent to the electrode, the reaction product does not cause the electrodes to be shorted-circuit to each other.

Figure 32:
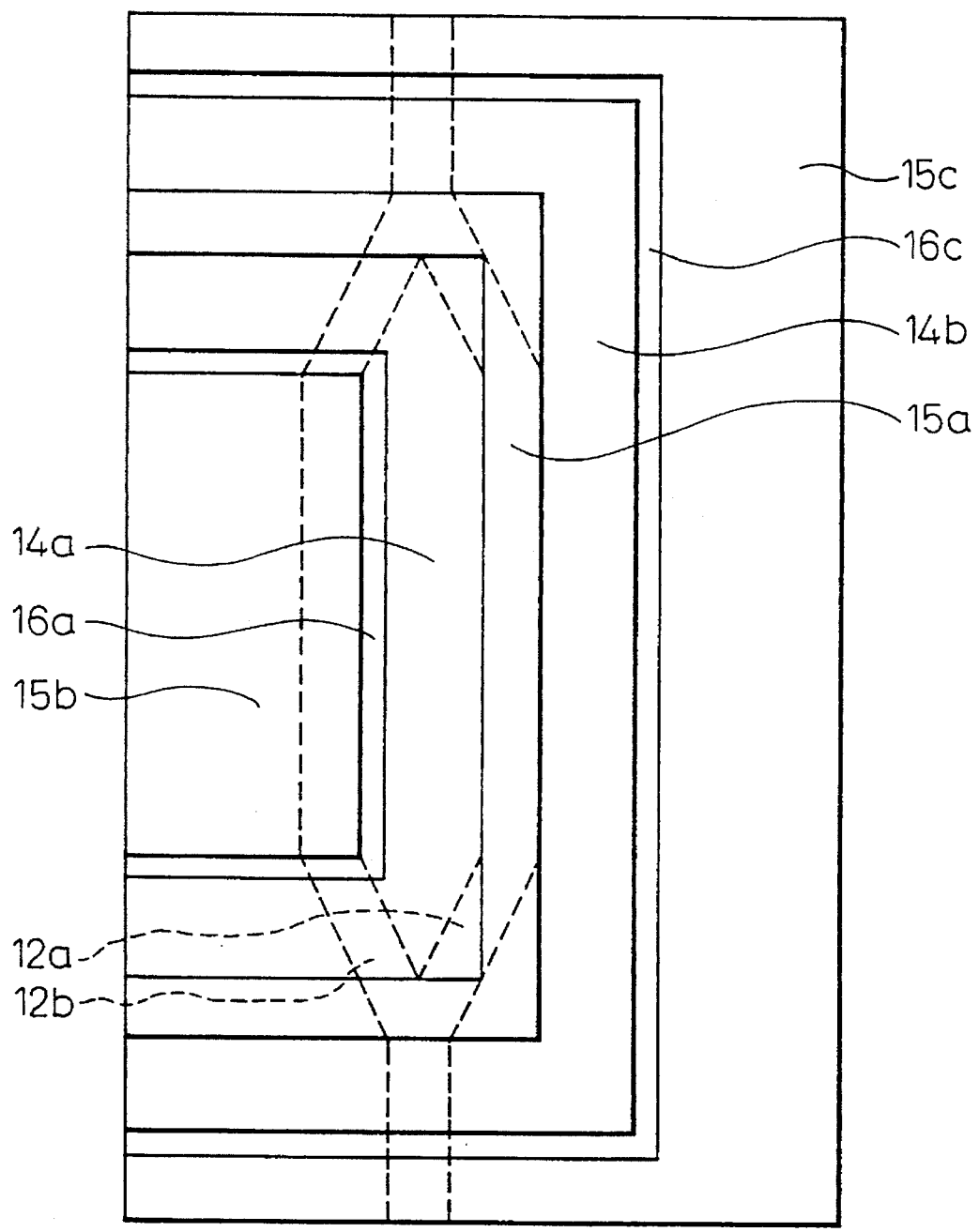
FIG. 32 shows an explanatory plan view of another preferable embodiment of the optical waveguide devices of the present invention.

The optical waveguide device shown in FIG. 32 has the same constitution as in FIGS. 31-(a) and 31-(b), except that a non-coated portion 16c of the dielectric layer surface is located between the electroconductive layer 14b and the ground electrode 15c. Accordingly, the electroconductive layer 14b is connected to the hot electrode 15a but not to the ground electrode 15c.

The non-coated portion 16c prevent the short-circuit between the hot electrode 15a and the ground electrode 15c.

Figure 33:
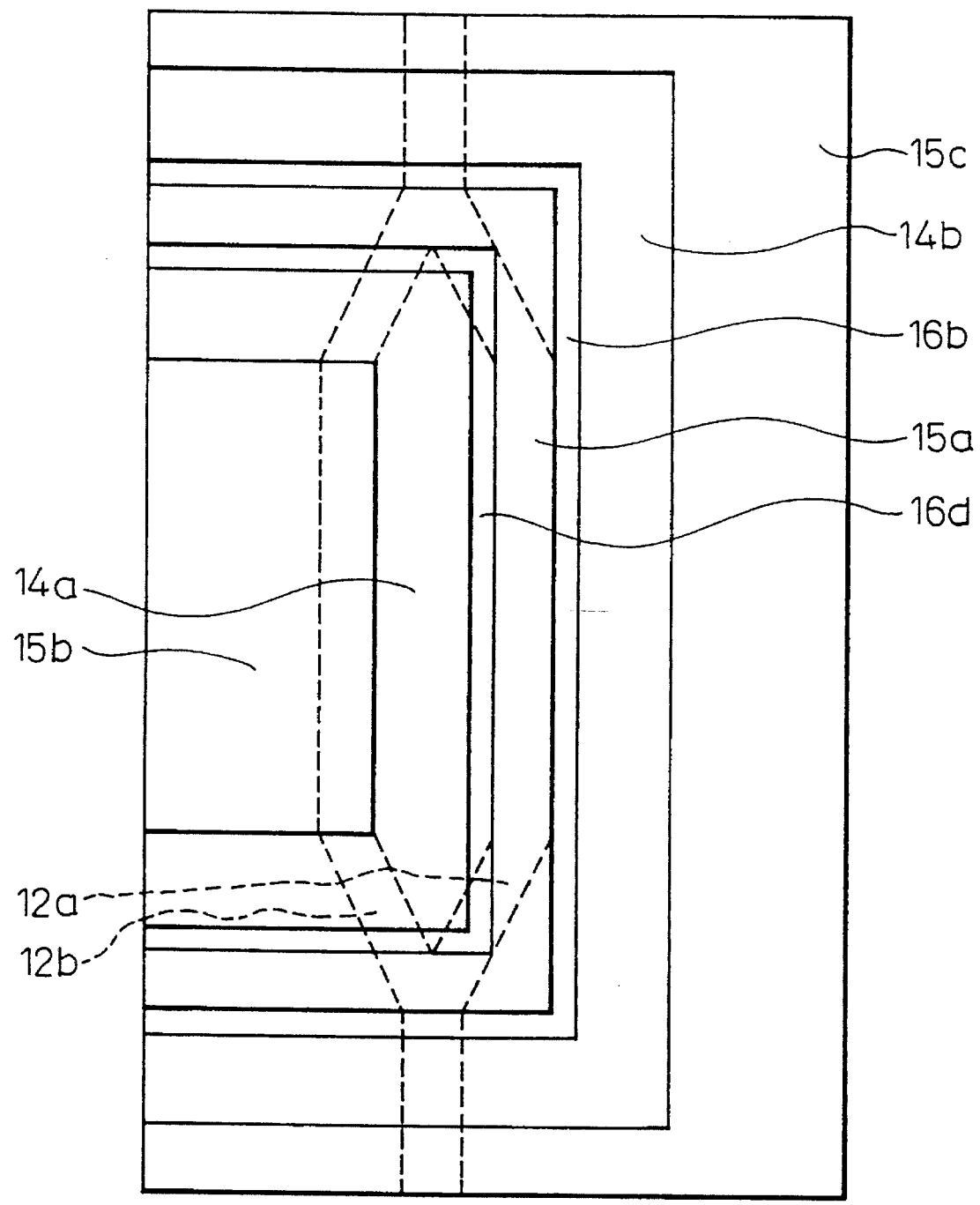
FIG. 33 shows an explanatory plan view of still another preferable embodiment of the optical waveguide devices of the present invention.

The optical waveguide device shown in FIG. 33 has the same constitution as in FIGS. 31-(a) and 31-(b), except that non-coated portions 16a and 16b of the dielectric layer surface are located between the hot electrode 15a and the electroconductive layer 14a and between the hot electrode 15a and the electroconductive layer 14b. Accordingly, the hot electrode 15a is not connected to both the electroconductive layers 14a and 14b and thus does not short-circuit with both the ground electrodes 15b and 15c.

Figure 34:
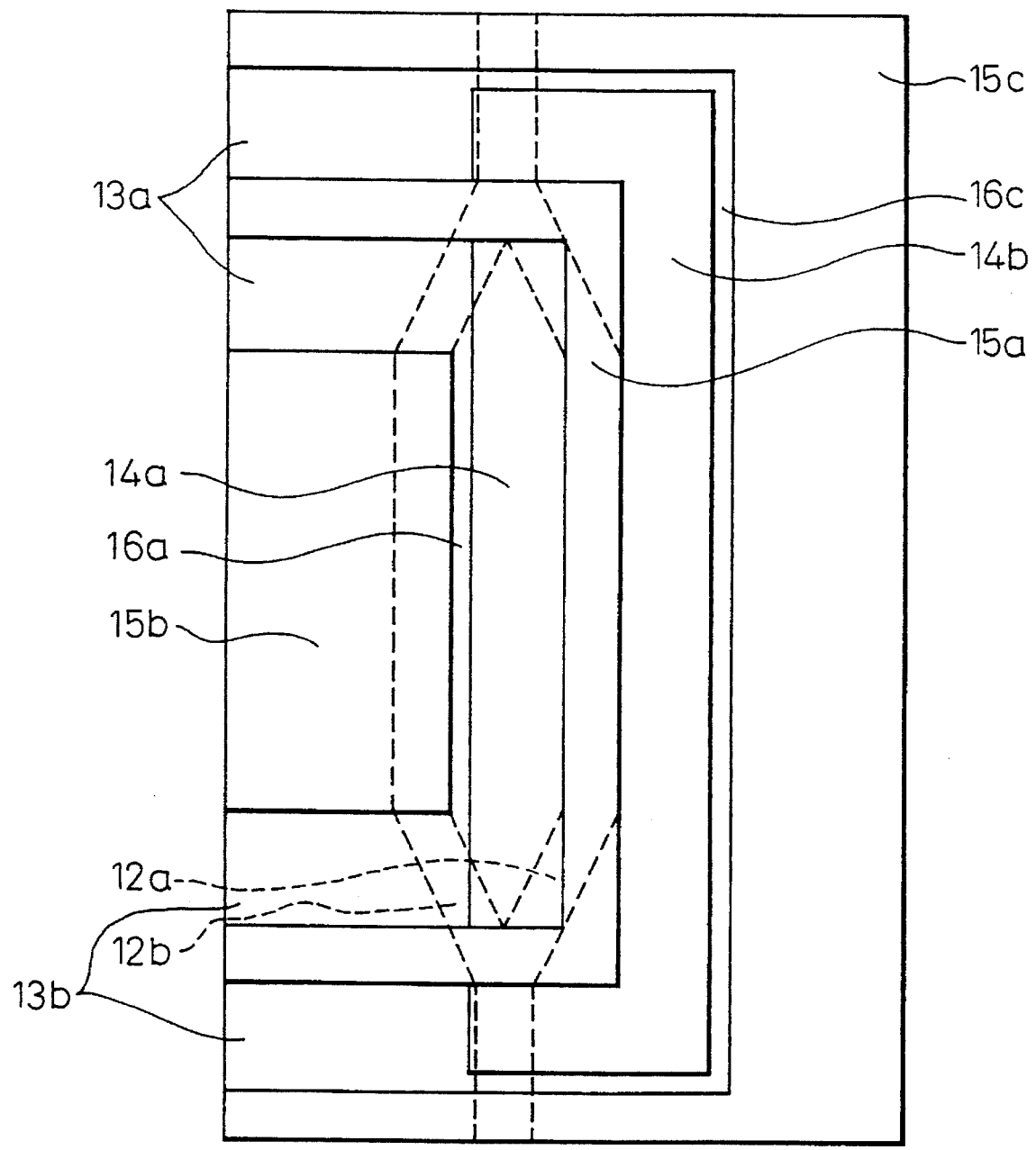
FIG. 34 shows an explanatory plan view of still another preferable embodiment of the optical waveguide devices of the present invention.

The optical waveguide device shown in FIG. 34 has the same constitution as in FIG. 32, except that the electroconductive layers 14a and 14b are formed together into a rectangular form on both longitudinal sides of the hot electrode 15a, and thus the dielectric layer 13 is further exposed to the outside in portions 13a and 13b on both transversal sides of the ground electrode 15b, between the hot electrode 15b, between the hot electrode 15a and the ground electrodes 15b and 15c.

Figure 35:
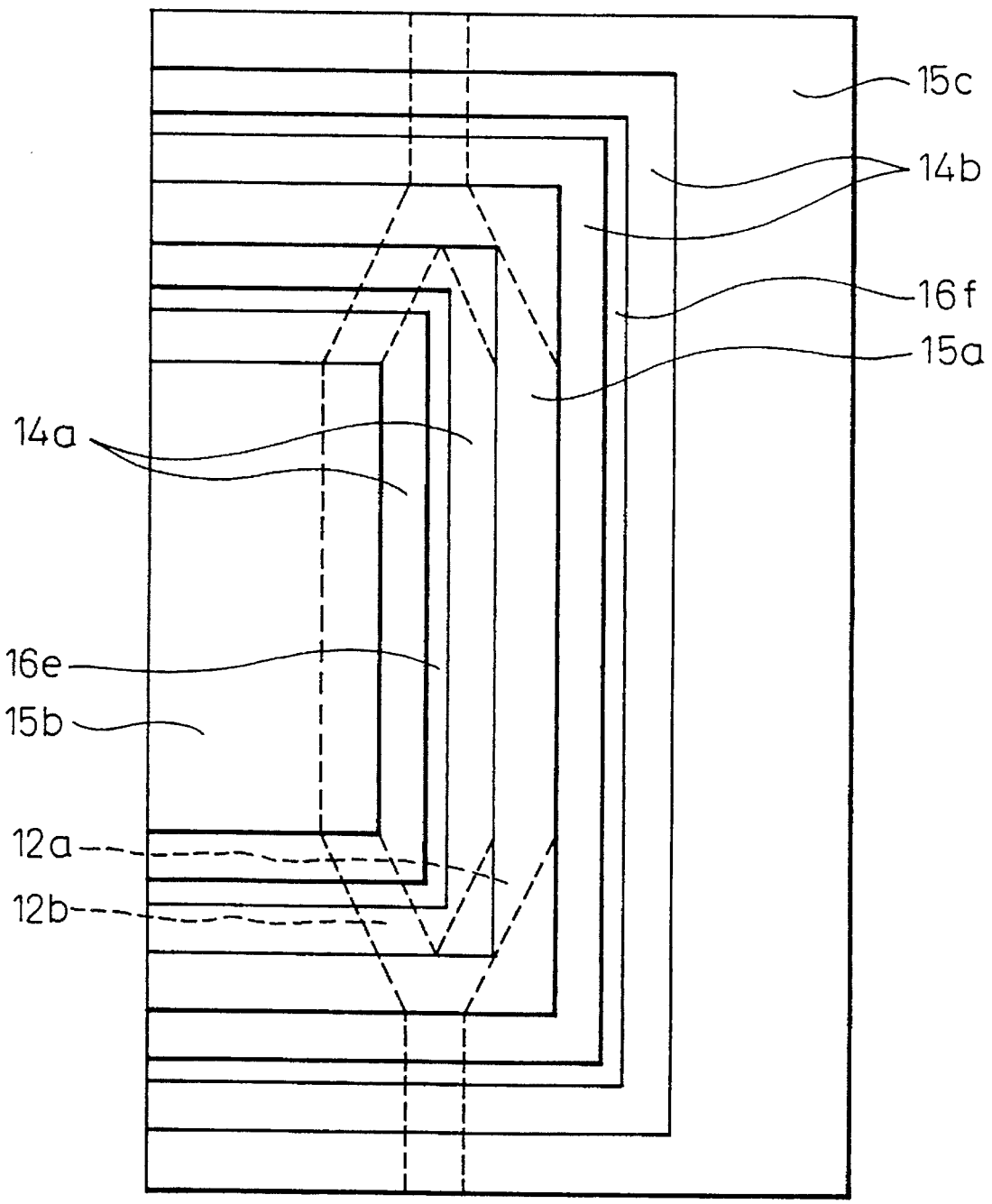
FIG. 35 shows an explanatory plan view of still another preferable embodiment of the optical waveguide devices of the present invention.

The optical waveguide device shown in FIG. 35 has the same constitution as in FIGS. 31-(a) and 31-(b) except that a non-coated portion 16e of the dielectric layer surface extends along the center line of the electroconductive layer 14a so as to separate the electroconductive layer 14 into two parts, and a noncoated portion 16f of the dielectric layer extends along the center line of the electroconductive layer 14b so as to separate the electroconductive layer 14a into two parts.

Accordingly, the electrical connections of the hot electrode 15a to both the ground electrodes 15b and 15c are interrupted.

The optical waveguide device shown in FIGS. 36-(a) and 36-(b) has the same constitution as in FIGS. 31-(a) and 31-(b) except that a surface region 13c of the dielectric layer 13 is partially coated with an electroconductive layer 14a in a rectangular form extending along the longitudinal direction A of the optical waveguide branch portions 12a and 12b so as to form non-coated portions 16a and 16d located on both longitudinal sides of the rectangular electroconductive layer 14a, and a surface region 13d of the dielectric layer 13 is partially coated with an electroconductive layer 14b in a rectangular form extending along the longitudinal direction A of the optical waveguide branch portions 12a and 12b so as to form non-coated portions 16b and 16c located on both longitudinal sides of the rectangular electroconductive layer 14b.

Namely, all the electrodes 15a, 15b and 15c do not directly contact the electroconductive layers 14a and 14b. In other words, the electroconductive layers 14a and 14b are spaced and isolated from all the electrodes 15a, 15b and 15c.

Figure 37:
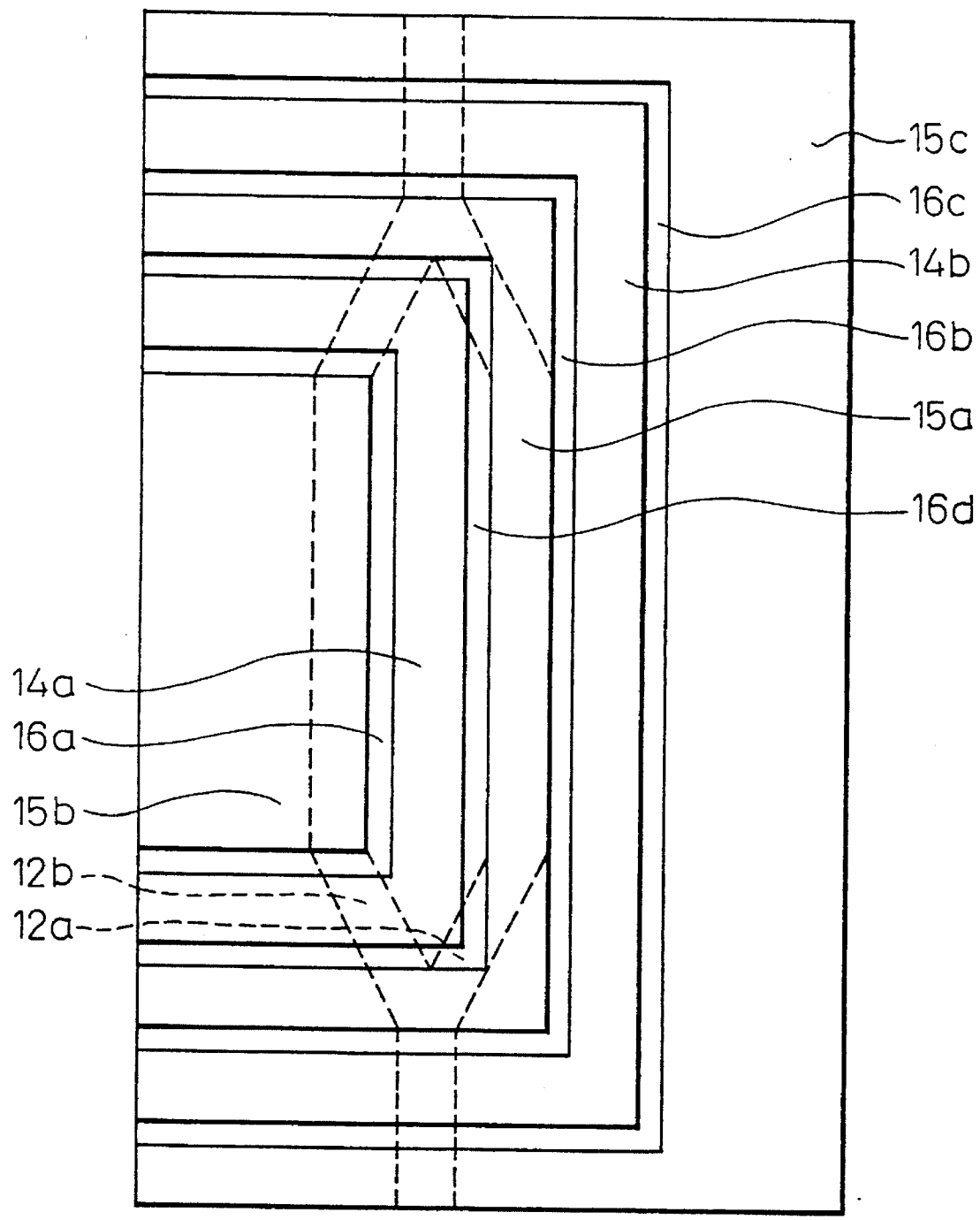
FIG. 37 shows an explanatory plan view of still another preferable embodiment of the optical waveguide devices of the present invention.

The optical waveguide device shown in FIG. 37 has the same constitution as in FIGS. 36-(a) and 36-(b), except that the total area of the non-coated portions of the dielectric layer surface of FIG. 37 is smaller than that of FIGS. 36-(a) and 36-(b). In this case, the electric charge generated in the dielectric layers under the electroconductive layers can be removed by grounding the end portions of the electroconductive layers located in the edge portions of the device, even when the electrodes are not connected to the electroconductive layers, and prevent the floating of the charge; so as to enhance the restriction effect for the generation of thermal drift due to a change in the operating temperature.

Figure 38:
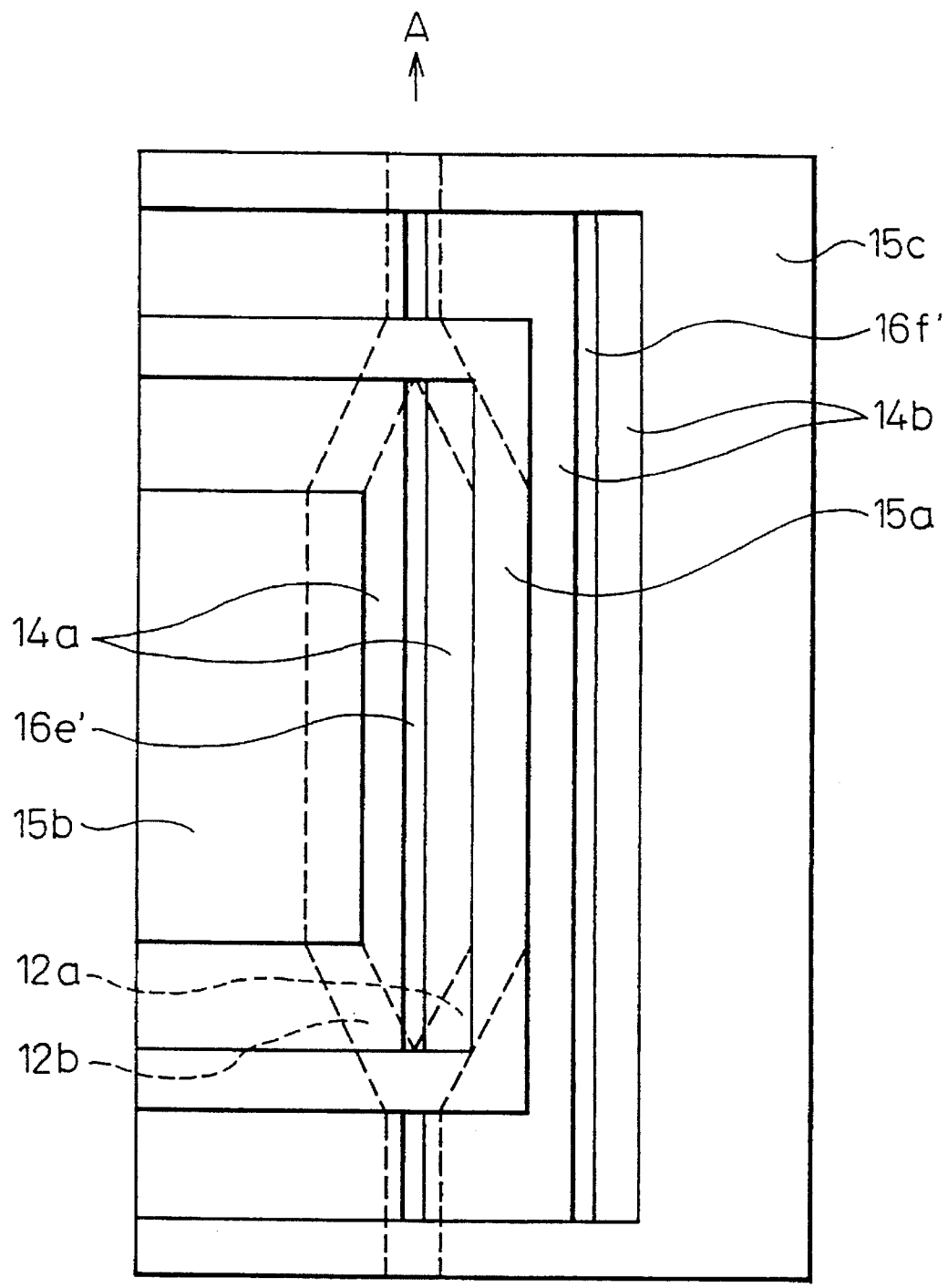
FIG. 38 shows an explanatory plan view of still another embodiment of the optical waveguide devices of the present invention.

The optical waveguide device shown in FIG. 38 has the same constitution as in FIG. 35 except that the noncoated portion 16e' and 16f' of the dielectric layer extends in a straight line as shown in FIG. 38, so as to separate the longitudinally extending portion of each of the electroconductive layer 14a and 14b into two portions thereof, which are separated from each other. In this case, the longitudinally extending portions of the electrode 15a, 15b, and 15c are prevented from directly short-circuiting each other. Also, the device of FIG. 38 has a relatively small area of the non-coated surface regions of the dielectric layer and thus exhibits an enhanced thermal drift-restricting effect.

Figure 39:
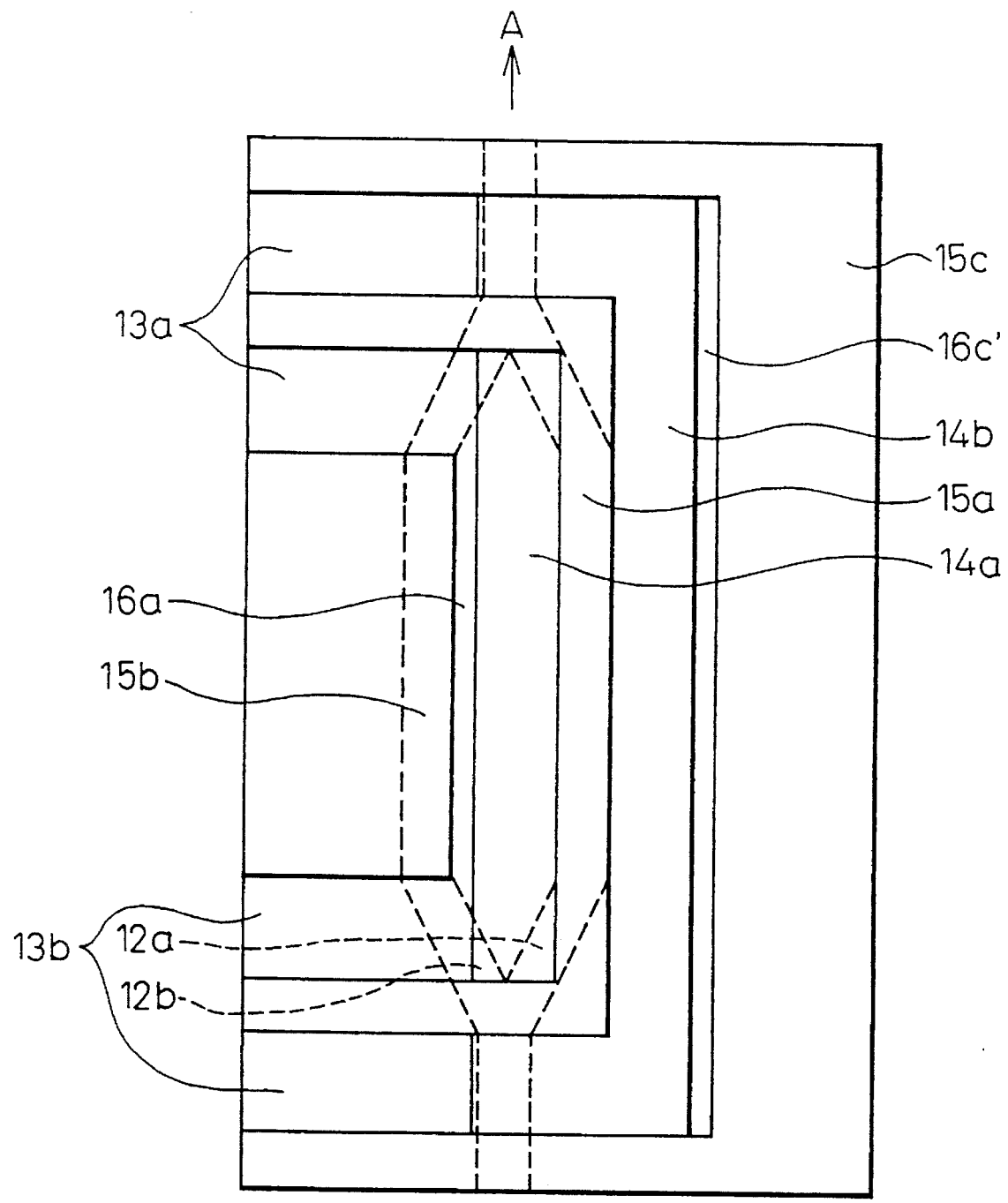
FIG. 39 shows an explanatory plan view of still another embodiment of the optical waveguide devices of the present invention.

The optical waveguide device shown in FIG. 39 has the same constitution as in FIG. 34, except that a noncoated portion 16c' of the dielectric layer surface extends in a straight line form between the electroconductive layer 14b and the ground electrode 15c and along the longitudinal direction A of the optical waveguide. Due to the above-mentioned constitution, the direct short-circuit between the portions of the electrodes 15a and 15b extending in parallel to the longitudinal direction A of the optical waveguide branched portions 12a and 12b, by the growth of the electrochemical reaction product, can be effectively prevented.

Also, the device of FIG. 39 has a smaller total area of the non-coated portions of the dielectric layer surface regions than that in FIG. 34 and thus exhibits an enhanced effect for preventing the thermal drift generated due to the change of the operating temperature.

In the devices as mentioned above, the direct short-circuit between the electrodes due to the electrochemical reaction product of the electrode-forming material, for example, gold, with the electroconductive layer-forming material, for example, silicon can be prevented by the provision of the non-coated portions of the dielectric layer surface regions. However, the optical waveguide device should be packed and completely sealed in a case to prevent the production of the electrochemical reaction product.

In another embodiment of the optical waveguide device of the present invention, the substrate and the optical waveguide formed in the surface portion of the substrate are curve-deformed together with the dielectric layer in an arc form curving around a curvature center located on a straight line perpendicular to the substrate surface due to an internal stress effect generated in the dielectric layer, whereby a distortion is generated in the optical waveguide and renders the refractive index of the optical waveguide to be slightly-changed, and the slight change in refractive index of the optical waveguide renders together with a photoelastic effect of the optical waveguide to control the phase of the optical waves being transmitted through the optical waveguide to a desired phase.

In this embodiment, the dielectric layer is preferably formed by a physical vapor deposition method in a gas atmosphere, and the strength of the internal stress generated in the dielectric layer is controlled by controlling the pressure of the gas atmosphere.

Also, the strength of the internal stress in the dielectric layer is preferably controlled by adjusting the thickness of the dielectric layer.

Further, it is preferable that an additional dielectric layer is formed on a back surface of the substrate, and the degree of curl-deformation of the substrate is controlled by controlling the balance between the internal stress generated in the front dielectric layer and the internal stress generated in the back dielectric layer.

Still further, the phase of optical waves transmitting through the optical waveguide is preferably adjusted by controlling the degree of the curl-deformation of the substrate.

In the above-mentioned embodiment, the operating point of the device can be controlled by curve-deforming the substrate, the optical waveguide and the dielectric layers altogether, without applying a specific DC controlling electric field. This embodiment of the optical waveguide device of the present invention is advantageous in that the change in operating point due to a DC drift can be prevented and since no DC control electric field is employed, the control of the operating point of the device, for example an electric field senser, can be easily effected.

The embodiment of the optical waveguide device of the present invention can be produced by the following method.

An optical waveguide comprising a ferroelectric material, for instance, $LiNbO_3$, having at least a photoelastic effect is formed in the front surface portion of a substrate, and a dielectric material different from the optical waveguide-forming material is deposited on at least one surface of the substrate to form a dielectric layer having an internal stress and the laminate of the substrate including the optical waveguide and the dielectric layer is allowed to be curve-deformed in an arc form curving around a curvature center located on a straight line perpendicular to the substrate surface, by utilizing the effect of the internal stress generated in the dielectric layer. The curve-deformation of the optical waveguide causes a strain to be generated therein. This strain renders the refractive index of the optical waveguide to be slightly changed. By controlling the degree of the curve-deformation, the phase of the optical waves being transmitted through the optical waveguide can be controlled to a desired phase, without applying the DC control electric field.

The curve-deformation can be controlled by controlling the strength of the internal stress generated in the dielectric layer.

Figure 40:
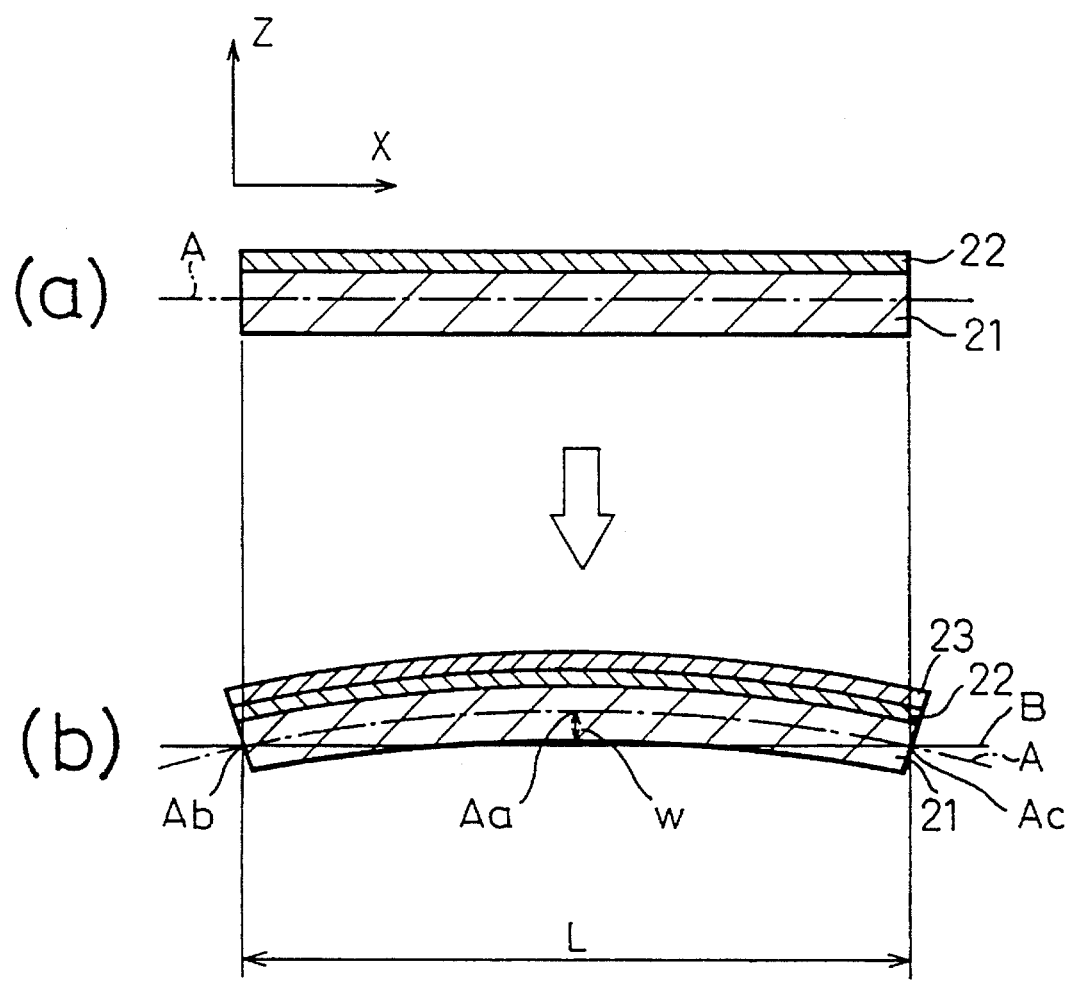
FIG. 40(a) and (b) are diagrams showing a process for producing a preferable embodiment of the optical waveguide devices of the present invention, and an explanatory cross-sectional constitution of the resultant curve-deformed optical waveguide device.

In the process shown in FIG. 40, for producing a curve-deformed optical waveguide device, in step (A), an optical waveguide 22 is formed in a front surface portion of a Z cut $LiNbO_3$ substrate 21 having a diameter of 76.2 mm in the direction X, and a thickness of 0.5 mm in the direction Z by thermally diffusing titanium in a desired form and dimensions, and in step (B), as dielectric layer 23 is formed on the substrate surface including the optical waveguide surface by depositing $SiO_2$ by a non-equilibrium film-forming method, for example, a vacuum evaporation deposition method or sputtering method. Then an electrode system (not shown in FIG. 40) is formed on the surface of the dielectric layer 23 into a desired form and dimensions by, for example, a gold plating method. The resultant wafer is cut to form a desired optical element chip having a thickness of about 0.5 mm, a width of 0.8 mm and a length of 60 mm.

In the step (B), the resultant laminate is curve-deformed as shown in FIG. 40, due to the internal stress generated in the dielectric layer 23.

In FIG. 40, "A" represents a central plane of the substrate 21.

The curve-deformation of the laminate causes a strain tensor $S_i$ to be generated in the waveguide 22 in parallel to the axis direction of the waveguide 22, namely X direction.

In FIG. 40, Aa represents a center point of the center plan A of the substrate, Ab and Ac respectively represent end points of the central plane A, B represents a straight line connecting the end point Ab to the end point Ac, W represents an deflection of curve-deformation of the substrate 21 and L represents a length of the optical waveguide 22.

Figure 41:
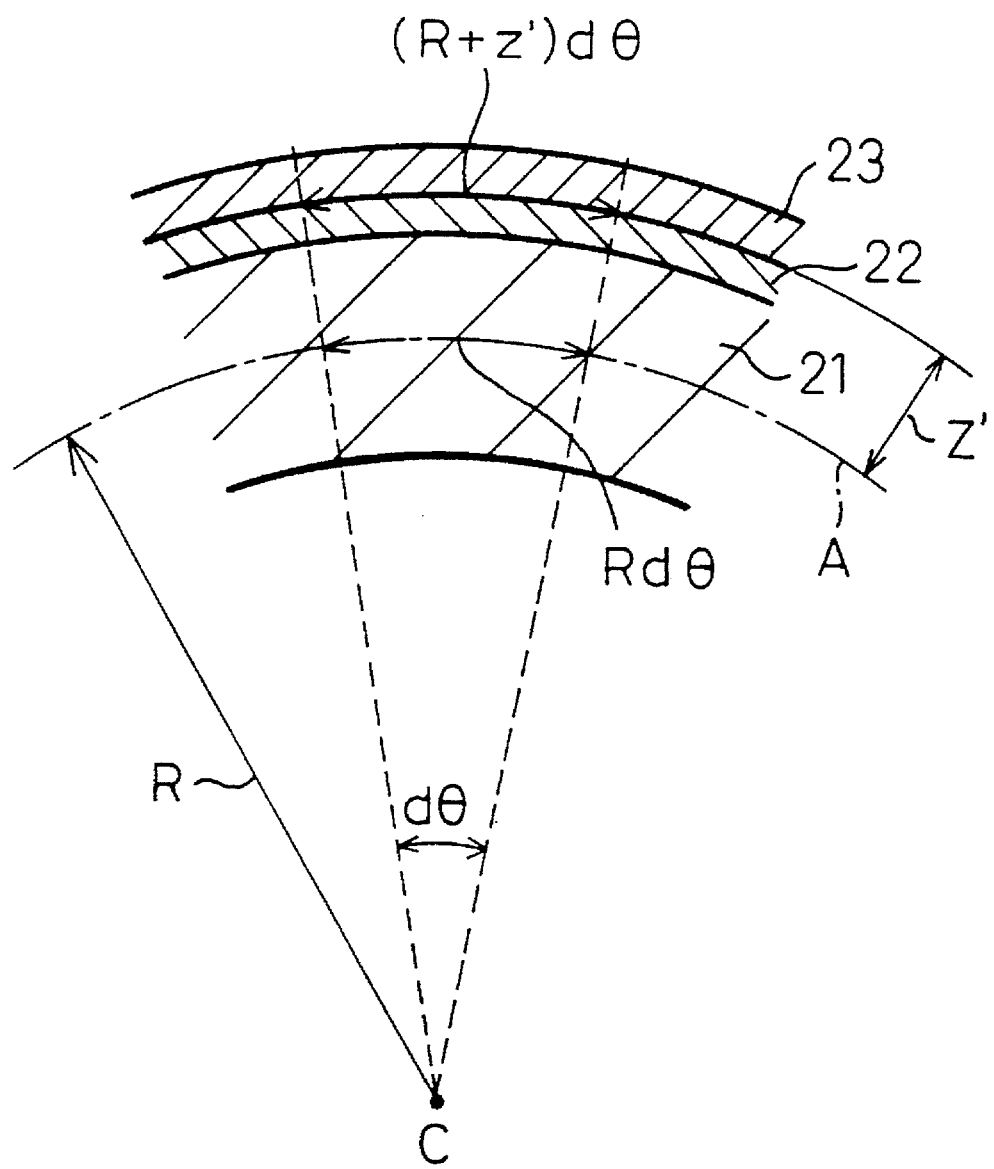
FIG. 41 shows an explanatory cross-sectional profile of a portion of a preferable embodiment of the optical waveguide devices of the present invention.

Referring to FIG. 41, the strain tensor $S_i$ is defined by the following equations:

$$S_i = Z'd\theta/Rd\theta = Z'/R$$

$$R = L^2/8W$$

wherein R represents a radius of curvature of the curve-deformed substrate 21 in an arc form, namely a distance between a center C of curvature to the central plane A of the substrate 21, Z' represents a distance between the central plane A of the substrate 21 and the front surface of the optical waveguide 22 which is the same as the front surface of the substrate 21, for example, about 0.25 mm, L represents a length of the optical waveguide 22, for example, 60 mm, W represents an amount of curve-deformation of the substrate 21, namely a distance between a center point Aa of the central plane A of the substrate 21 and a straight line B drawn from an end point Ab of the central plane A of the substrate 21 to an opposite end point Ac thereof, and dθ represents an angle of a certain small portion of the arc-deformed laminate.

Referring to FIG. 41, Rdθ represents a length of a certain small portion of the arc-deformed central plane of the substrate 21 corresponding the small angle dθ, (R+Z')dθ represents a length of a small portion of the arc-deformed optical waveguide front surface C substrate front surface corresponding to the small angle dθ and Z'dθ is a difference between (R+Z')dθ and Rdθ.

Provided that the physical properties of the optical waveguide consisting of titanium-diffused $LiNbO_3$ is approximately similar to those of $LiNbO_3$, a small change $\Delta n_e$ in refractive index of the optical waveguide for extraordinary waves, generated due the strain tensor $S_i$ can be defined by the following equation:

$$\Delta n_e = -(½)n_e^3 P_{31} S_i$$

wherein $n_e$ represents a refractive index of the optical waveguide for extraordinary waves and is, for example, 2.14, and $P_{31}$ represents a piezooptic constant of the optical waveguide, and is, for example, 0.178.

Where X' represents a length of the optical waveguide (X'=L=60 mm), λ and X represents a wavelength of optical waves transmitting through the optical waveguide (λ=1.55 μm), and provided that the refractive index of the optical waveguide for the optical waves being transmitted therethrough changes slightly ($\Delta n_e < 0$), it results in a phase retardation Δφ of the optical waves output from the optical waveguide. The phase retardation Δφ is defined by the following equation:

$$\Delta \phi = (2\pi/\lambda) \Delta n_e X'.$$

Namely, an adjustment of the operating point of an optical waveguide device can be effected by controlling the strain tensor $S_i$ of the optical waveguide. The adjustment of the strain tensor $S_i$ can be effected by controlling the amount W of the curve-deformation of the optical waveguide.

In an example of the present invention, a $SiO_2$ dielectric layer was formed on a $LiNbO_3$ wafer including an optical waveguide by a sputtering method, to prepare a sample. The thickness of the dielectric layer was set to 0.45 μm, 1.20 μm or 1.75 μm.

The radius R of curvature and the strain tensor $S_i$ of the sample were calculated from the amount W of curve-deformation of the sample. Also the change in refractive index of the optical waveguide and the phase retardation of optical waves being transmitted through the optical waveguide were measured. The curve-deformation amount W was measured by a stylus method and the length L of the optical waveguide was 60 mm. The results are shown in Table 2.

modulation in which portion the intensity of the optical waves easily changes, comes to a position of an external voltage of zero, and therefore, the optical waves being transmitted through the optical waveguide can be modulated by applying an AC voltage, without applying a DC voltage.

Accordingly, by previously establishing a relationship between the thickness of the dielectric layer and the curve-deformation amount of the substrate and a relationship between the parameters (for example, atmospheric temperature and pressure) of the dielectric layer-forming process and the curve-deformation amount of the substrate, an optical waveguide device having a desired phase retardation can be obtained and also, the operating point of the device can be controlled to a desired position.

Figure 43:
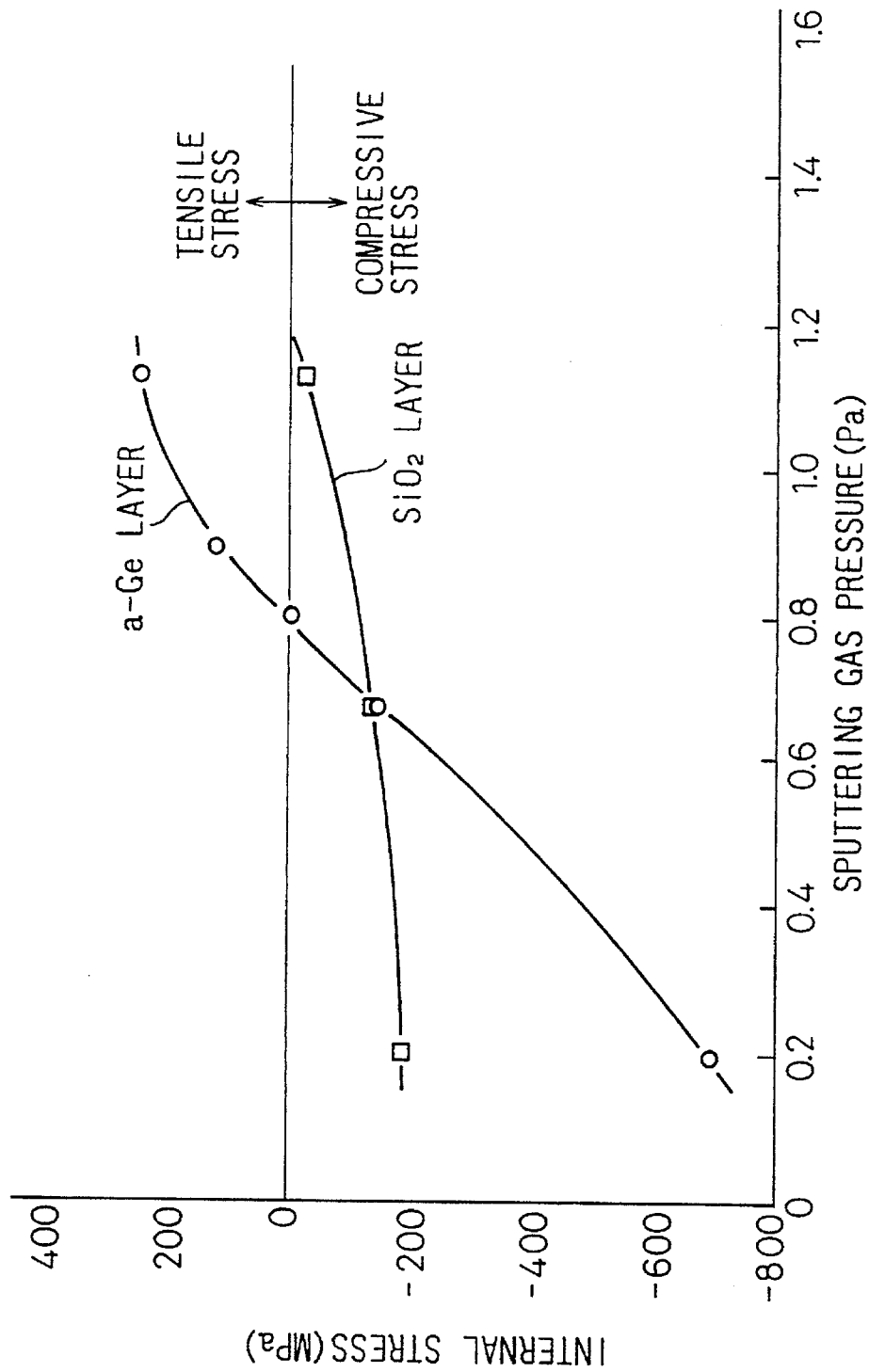
FIG. 43 is a graph showing a relationship between gas pressure under which a dielectric layer is formed by a sputtering deposition method, and an internal stress generated in the optical waveguide of the resultant optical waveguide device of the present invention.

FIG. 43 shows examples of controlling internal stress of the film as a relationship between gas pressure for forming a layer of $SiO_2$ or a-Ge by a sputtering method, and strength of internal stress generated in the resultant layer. In FIG. 43, a positive internal stress shows that a tensile stress is generated in the layer and a negative internal stress indicates that a compressive stress is generated in the layer.

Figure 44:
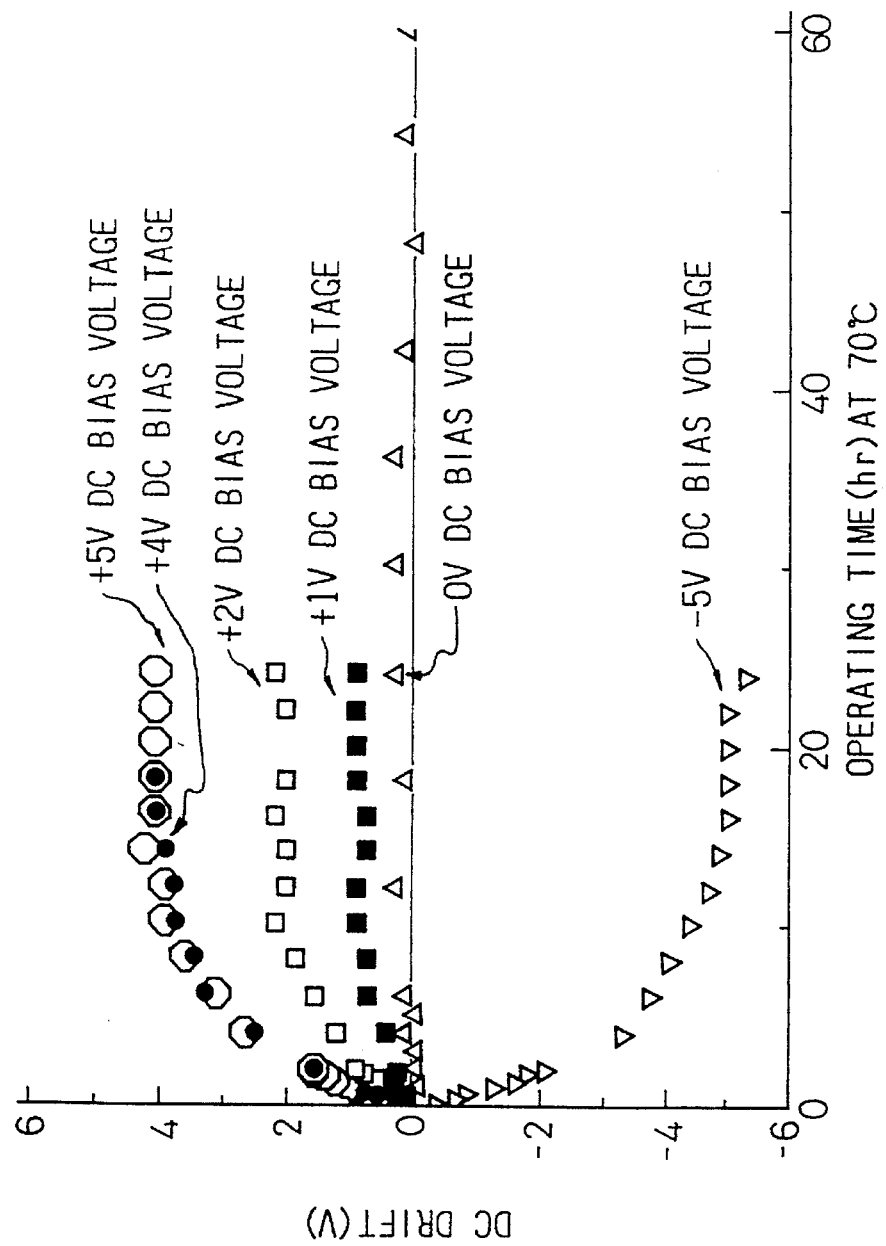
FIG. 44 is a graph showing a dependency in DC drift of various optical waveguide devices on DC voltage applied to the devices at a temperature of 70° C.

FIG. 44 shows a dependency in DC drift of a device on DC voltage applied to the device. A DC bias voltage was applied at a level of +5 V, +2 V, +1 V, or −5 V to the optical waveguide device.

In the desirably curve-deformed optical waveguide device of the present invention, no DC voltage was to be applied. When the curve-deformed optical waveguide device was employed, substantially no drift phenomenon was formed. The DC voltage drift measurement was carried out under accelerating conditions at a temperature of 70° C.

FIG. 44 is a graph showing a dependency in DC drift of various optical waveguide devices on DC voltage applied to the devices at a temperature of 70° C.

In a first example of the curve-deformed optical waveguide device of the present invention, four Mach Zehnder type optical wave-intensity modulators each having a $LiNbO_3$ substrate with a length of 60 mm and a width of 0.5 mm, a dielectric $SiO_2$ layer with a thickness of 0.45 μm, and Au electrodes having a thickness of 10 μm, were produced.

In each device, an optical waveguide was formed by the above-mentioned Ti-diffusion method, and the dielectric $SiO_2$ layer was formed by an rf magnetron sputtering method using a $SiO_2$ target with a rf power of 500 W, under a pressure of 0.20 Pa of a $Ar/O_2$ mixed gas, without heating the substrate. After the sputtering procedure was completed, the resultant dielectric layer was heat treated at a temperature of 600° C. in an oxygen gas atmosphere.

TABLE 2

| Thickness of dielective layer (μm) | Curve-deformation amount (W) (mm) | Radius (R) of curvature (× 10³) | Distortion tensor ($S_i$) (× 10⁻⁵) | Change in refractive index ($\Delta n_e$) (× 10⁻⁵) | Phase Retardation (Δφ) |
|---|---|---|---|---|---|
| 0.45 | 0.040 | 11 | 2.3 | −2.0 | 1.5π |
| 1.20 | 0.084 | 5.4 | 4.6 | −4.0 | 3.1π |
| 1.75 | 0.100 | 4.5 | 5.6 | −4.9 | 3.8π |

Figure 42:
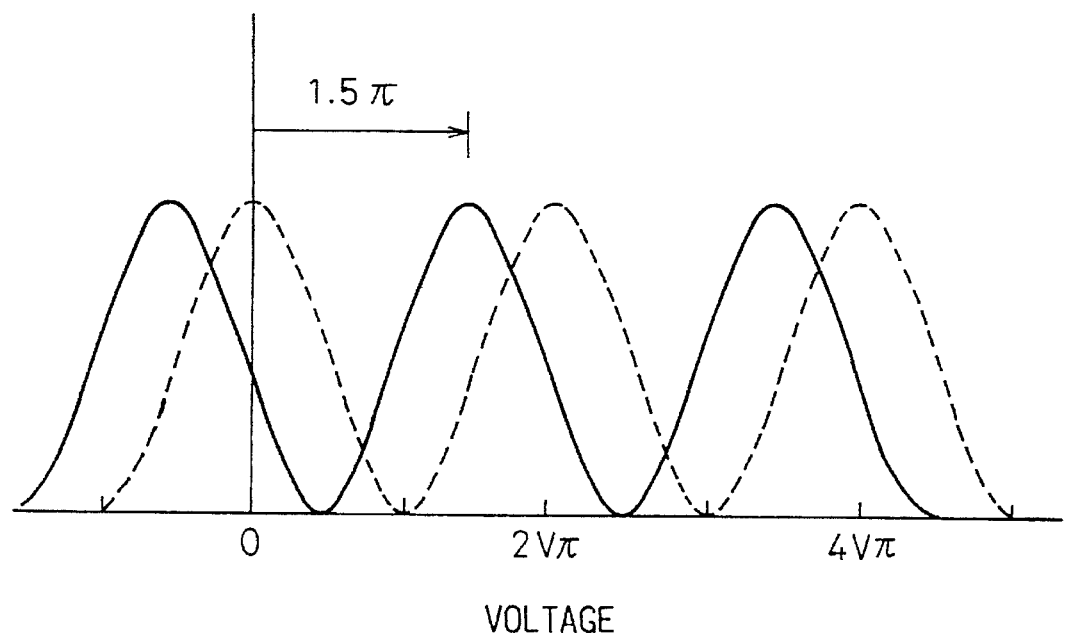
FIG. 42 is a graph showing optical wave output modulation of an optical phase-adjusted embodiment and a non-adjusted embodiment of the optical waveguide devices of the present invention.

In FIG. 42, a modulated optical waves output from the curve-deformed optical waveguide of the sample in which the thickness of the dielectric $SiO_2$ layer was 0.45 μm, the phase retardation Δφ was 1.5π, is shown by a solid line. Also, in FIG. 42, an ideal modulated optical wave is indicated by a broken line.

The solid line of FIG. 42 clearly shows that when the operating point is shifted, a portion of the optical waves In the resultant device, the expected phase retardation was 1.5π in view of Table 2.

The resultant two devices (a) each having a modulating electrode length of 20 mm exhibited phase retardations of 1.3π and 1.1π.

The resultant two devices (b) each having a modulating electrode length of 40 mm exhibited phase lags of 1.3 π and 1.4 π. These practical phase retardation are very close to the expected phase retardation. Namely, the operating point could be modulated as desired.

In a second example, four modulators were produced in the same manner as in the first example, except that the thickness of the dielectric $SiO_2$ layer was changed to 1.20 µm. The phase retardations of the modulators were $0.72\pi$, $0.71\pi$, $0.92\pi$ and $1.4\pi$. The expected phase retardations from Table 2 was $3.1\pi-2\pi=1.1\pi$. The resultant phase retardations were close to the expected value.

To bring the resultant phase retardation value close to the expected value, it is preferable to estimate the relationship among the curve-deformation amount of the substrate, the strain tensor amount of the optical waveguide, the dielectric layer thickness and the electrode thickness and to provide a data base containing those data.

Generally, the strain tensor amount can be controlled by controlling the dielectric layer-forming conditions, for example, an atmosphere pressure for the sputtering method. The internal stress of the dielectric layer can be controlled by controlling the gas pressure for the sputtering method.

FIG. 43 shows a relationship between sputtering gas pressure and internal stress generated in a resultant layer consisting of $SiO_2$ or a-Ge.

In a third example, a laminate was prepared as a model of a curve-deformed optical waveguide device for the purpose of easy measurement of the internal stress, by forming a dielectric layer with a thickness of 1 µm on a substrate consisting of a {100} Si wafer. When a $SiO_2$ dielectric layer was formed, the sputtering gas consisted of an $Ar/O_2$ mixed gas, and the rf power was 750 W. For the formation of a a-Ge dielectric layer, the sputtering gas consisted of argon and the rf power was 250 W.

When a compressive stress is generated, the resultant laminate is curve-deformed outwardly. When a tensile stress is generated, the resultant laminate is curve-deformed inwardly. The internal stress generated in the (dielectric) layer caused the (dielectric) layer and the substrate to be curve-deformed. When the deformation is simple, the amount of the deformation is proportional to the elasticity parameter thereof.

FIG. 43 shows that the strain introduced into the substrate can be continuously controlled by changing the type of the (dielectric) layer-forming material and the sputtering gas pressure.

In the following fourth example, it will be illustrated that the distortion amount of the substrate can be controlled by attaching front and back layers on the front and back surfaces of the substrate. However, in this method, since two stresses are applied to the two surfaces of the substrate, the calculation of the strain amount is difficult. To obtain an accurate design value, it is necessary to accumulate various data and establish a data base.

A front surface or both front and back surfaces of a $LiNbO_3$ substrate having a thickness of 0.5 mm were coated with a $SiO_2$ layer or layers, and the amount of curve-deformation of the substrate was measured. The deformation amount was measured at around a center point within a range of 60 mm length along the diameter of the substrate, by a stylus method.

The results are indicated in Table 3.

TABLE 3

| Coated surface or surfaces | Coating layer-forming method | Thickness of coating layer (µm) | Amount of curve-deformation (µm) |
| --- | --- | --- | --- |
| Front surface | Ar Ion-assist vapor deposition method | 1.3 | 32 |
| Both front and back surfaces | | 1.3/1.3 | 8 |
| Front surface | Ar ion-assist vapor deposition and sputtering method | 1.6 | 63 |
| Both front and back surfaces | | 1.6/1.6 | 13 |

As mentioned above, in an optical waveguide device made from materials exhibiting at least a photoelastic property, the control of the operating point can be effected by utilizing the curve-deformation of the device derived from an internal stress generated in the device, without using electrical means. Also, the utilization of the curve-deformation effectively reduces the DC voltage drift of the device generated by using electric means and enables the operating point control of the device, for example, an electric field sensor, to be possible.

We claim:

1. An optical waveguide device comprising a substrate comprising lithium niobate;

an optical waveguide formed in a front surface portion of the substrate;

a dielectric layer formed on the front surface of the substrate and covering the surface of the optical waveguide; and an electrode system comprising a plurality of electrodes arranged on the dielectric layer, said dielectric layer comprising a matrix component consisting of an amorphous silicon dioxide and a doping element component comprising at least one member selected from the group consisting of lithium and niobium, and having a refractive index lower than that of the amorphous silicon dioxide matrix free from the doping element component.

2. The optical waveguide device as claimed in claim 1, wherein the doping element component contained in the dielectric layer is in a total amount of $10^{15}$ atoms/cm$^3$ or more but not more than $10^{20}$ atoms/cm$^3$.

3. The optical waveguide device as claimed in claim 1, wherein the dielectric layer has a refractive index of 1.44 or less with respect to an optical wave having a wavelength of 0.633 µm, while the amorphous silicon dioxide matrix free from the doping element component has a refractive index of 1.457 with respect to the same optical wave having a wavelength of 0.633 µm as mentioned above.

4. The optical waveguide device as claimed in claim 1, wherein the dielectric layer further contains a hydrogenated compound or ion.

5. The optical waveguide device as claimed in claim 4, wherein the hydrogenated compound or ion contained in the dielectric layer is in a total amount of $10^{21}$ atoms/cm$^3$ or more, in terms of hydrogen atoms.

6. The optical waveguide device as claimed in claim 1, wherein at least one member of the doping element component contained in the dielectric layer is one diffused from the lithium niobate substrate into the dielectric layer.

7. The optical waveguide device as claimed in claim 1, wherein the optical waveguide is one prepared by thermal-diffusing titanium into the surface portion of the lithium niobate substrate in a dry gas atmosphere.

8. The optical waveguide device as claimed in claim 1, wherein the dielectric layer is one heat treated in a dry gas atmosphere.

9. The optical waveguide device as claimed in claim 7 or 8, wherein the dry gas atmosphere contains oxygen.

10. The optical waveguide device as claimed in claim 1, exhibiting a drift of direct current bias voltage of the device controlled to such an extent that when optical waves are input into the device, while maintaining the temperature of the device at a level equal to or higher than room temperature and continuously applying a direct current bias voltage to the electrode system, and a change in the operating point of the optical waves output from the device with time is monitored, a ratio A which is defined as the ratio of a saturated drift voltage VC to the applied direct current bias voltage VB is less than 1.

11. The optical waveguide device as claimed in claim 10, wherein the ratio A is 0.5 or less.

12. The optical waveguide device as claimed in claim 1, wherein the optical waveguide has two branch portions thereof converged into an input and into an output portion thereof and extending in parallel to each other, the electrode system comprises a hot electrode and a pair of ground electrodes arranged on both sides of the hot electrode and spaced from the hot electrode, one of the branch portions of the optical waveguide faces the hot electrode through the dielectric layer, the other branch portion of the optical waveguide faces one of the ground electrodes through the dielectric layer, and the branch portion of the optical waveguide facing the hot electrode has a width larger than that of the other branch portion of the optical waveguide facing one of the ground electrodes.

13. The optical waveguide device as claimed in claim 12, wherein the branch portion of the optical waveguide facing the hot electrode has a width of about 7 μm, and the other branch portion of the optical waveguide facing one of the ground electrodes has a width of about 6 μm.

14. The optical waveguide device as claimed in claim 1, wherein the optical waveguide has two branch portions thereof converged into an input portion and into an output portion thereof and extending in parallel to each other, the electrode system comprises a hot electrode facing one of the branch portions of the optical waveguide through the dielectric layer and a pair of ground electrodes one of which faces the other branch portion of the optical waveguide through the dielectric layer, and regions of the dielectric layer surface located between the electrodes adjacent to each other are coated with electroconductive layers in such a manner that at least one portion of each of the dielectric layer surface regions is not coated with the electroconductive layer, and the non-coated portion of each dielectric layer surface region extends along the extended direction of the branch portions of the optical waveguide and is exposed to the outside of the device, whereby an electrical connection between the electrodes adjacent to each other through the electroconductive layer is at least partially interrupted.

15. The optical waveguide device as claimed in claim 14, wherein an electroconductive layer is formed between the dielectric layer and each electrode.

16. The optical waveguide device as claimed in claim 14 or 15, wherein the electroconductive layer comprises silicon and the electrodes comprise gold.

17. The optical waveguide device as claimed in claim 14, wherein in each dielectric layer surface region, one non-coated portion is formed between the electroconductive layer formed on the dielectric layer surface region and one of the electrodes adjacent to the electroconductive layer.

18. The optical waveguide device as claimed in claim 14, wherein in each dielectric layer surface region, two non-coated portions are formed between the electroconductive layer located on each dielectric layer surface region and two electrodes adjacent to the electroconductive layer.

19. The optical waveguide device as claimed in claim 14, wherein at least one non-coated portion is located within each dielectric layer surface region.

20. The optical waveguide device as claimed in claim 1, wherein the substrate and the optical waveguide formed in the surface portion of the substrate are curve-deformed together with the dielectric layer in an arc form curving around a curvature center located on a straight line perpendicular to the substrate surface due to an internal stress effect generated in the dielectric layer, whereby a strain is generated in the optical waveguide and renders the refraction index of the optical waveguide to be slightly changed, and the slight change in refractive index of the optical waveguide renders, together with a photoelastic effect of the optical waveguide, the phase retardation of the optical waves being transmitted through the optical waveguide to be controlled to a desired ones.

21. The optical waveguide device as claimed in claim 20, wherein the dielectric layer is formed by a physical vapor deposition method in a gas atmosphere, and the strength of the internal stress generated in the dielectric layer is controlled by controlling the pressure of the gas atmosphere.

22. The optical waveguide device as claimed in claim 20, wherein the strength of the internal stress in the dielectric layer is controlled by adjusting the thickness of the dielectric layer.

23. The optical waveguide device as claimed in claim 20, wherein an additional dielectric layer is formed on a back surface of the substrate, and the degree of curl-deformation of the substrate is controlled by controlling the balance between the internal stress generated in the front dielectric layer and the internal stress generated in the back dielectric layer.

24. The optical waveguide device as claimed in claim 20, wherein the phase retardation of optical waves being transmitted through the optical waveguide is adjusted by controlling the degree of the curl-deformation of the substrate.

* * * * *